US012810648B2

(12) United States Patent
Tamura et al.

(10) Patent No.: US 12,810,648 B2
(45) Date of Patent: Nov. 24, 2026

(54) IMAGE PROCESSING APPARATUS, IMAGE PROCESSING METHOD, AND PROGRAM FOR OUTPUTTING SECOND IMAGE WHEN FIRST IMAGE TRANSITIONS FROM DETECTION STATE TO NON-DETECTION STATE

(71) Applicant: FUJIFILM Corporation, Tokyo (JP)

(72) Inventors: Kazunori Tamura, Saitama (JP); Fuminori Irie, Saitama (JP); Takashi Aoki, Saitama (JP); Masahiko Miyata, Saitama (JP); Yasunori Murakami, Saitama (JP)

(73) Assignee: FUJIFILM Corporation, Tokyo (JP)

(*) Notice: Subject to any disclaimer, the term of this patent is extended or adjusted under 35 U.S.C. 154(b) by 317 days.

(21) Appl. No.: 18/049,618

(22) Filed: Oct. 25, 2022

(65) Prior Publication Data

US 2023/0071355 A1 Mar. 9, 2023

Related U.S. Application Data

(63) Continuation of application No. PCT/JP2021/016070, filed on Apr. 20, 2021.

(30) Foreign Application Priority Data

Apr. 27, 2020 (JP) ................................ 2020-078678

(51) Int. Cl.
*G06V 40/16* (2022.01)
*G06V 20/40* (2022.01)

(52) U.S. Cl.
CPC ............ *G06V 40/161* (2022.01); *G06V 20/42* (2022.01)

(58) Field of Classification Search
None
See application file for complete search history.

(56) References Cited

U.S. PATENT DOCUMENTS 10,628,993 B2 4/2020 Yoshimura et al.
11,017,588 B2 5/2021 Yoshimura et al.
(Continued)

FOREIGN PATENT DOCUMENTS

JP 2018055279 4/2018
JP 2018055644 4/2018
(Continued)

OTHER PUBLICATIONS

English language machine translation of KR 101703317 B1 to Kim et al (Year: 2017).*
(Continued)

*Primary Examiner* — Bernard Krasnic
(74) *Attorney, Agent, or Firm* — JCIPRNET

(57) ABSTRACT

An image processing apparatus performs a detection process of detecting a target object image showing a target object from a plurality of images obtained by imaging an imaging region with a plurality of cameras having different positions, outputs a first image among the plurality of images, and outputs, in a case where a state transitions from a detection state in which the target object image is detected from the first image through the detection process to a non-detection state in which the target object image is not detected from the first image through the detection process, a second image from which the target object image is detected through the detection process among the plurality of images.

20 Claims, 34 Drawing Sheets

(56) References Cited

U.S. PATENT DOCUMENTS

| | | | | |
|---|---|---|---|---|
| 12,143,674 | B2 * | 11/2024 | Irie | H04N 21/47217 |
| 2009/0052783 | A1 * | 2/2009 | Aoki | H04N 5/147 382/209 |
| 2018/0048810 | A1 * | 2/2018 | Matsushita | G06T 15/00 |
| 2018/0089842 | A1 * | 3/2018 | Mizuno | G06T 15/503 |
| 2018/0260650 | A1 | 9/2018 | Kawaguchi et al. | |
| 2019/0132529 | A1 * | 5/2019 | Ito | G06T 1/0007 |
| 2019/0199992 | A1 | 6/2019 | Shikata et al. | |
| 2020/0265633 | A1 * | 8/2020 | Okutani | G06F 3/012 |
| 2021/0258560 | A1 * | 8/2021 | Adachi | G06F 3/011 |

FOREIGN PATENT DOCUMENTS

| | | | | | |
|---|---|---|---|---|---|
| JP | 2018148483 | | | 9/2018 | |
| JP | 2019012533 | | | 1/2019 | |
| JP | 2019021333 | A | * | 2/2019 | |
| JP | 2019114147 | | | 7/2019 | |
| JP | 2019118136 | | | 7/2019 | |
| KR | 101703317 | B1 | * | 2/2017 | G06Q 50/10 |
| WO | WO-2019216087 | A1 | * | 11/2019 | H04N 7/18 |
| WO | WO-2020013077 | A1 | * | 1/2020 | H04N 13/243 |

OTHER PUBLICATIONS

"International Search Report (Form PCT/ISA/210) of PCT/JP2021/016070," mailed on Aug. 3, 2021, with English translation thereof, pp. 1-5.

"Written Opinion of the International Searching Authority (Form PCT/ISA/237)" of PCT/ JP2021/016070, mailed on Aug. 3, 2021, with English translation thereof, pp. 1-12.

Office Action of Japan Counterpart Application, with English translation thereof, issued on Jan. 9, 2024, pp. 1-10.

"Notice of Reasons for Refusal of Japan Counterpart Application", issued on Jun. 25, 2024, with English translation thereof, p. 1-p. 5.

"Office Action of Japan Counterpart Application", issued on Dec. 3, 2024, with English translation thereof, p. 1- p. 10.

"Notice of Reasons for Refusal of Japan Counterpart Application", issued on Jan. 6, 2026, with English translation thereof, p. 1-p. 8.

"Notice of Reasons for Refusal of Japan Counterpart Application", issued on Jul. 7, 2026, with English translation thereof, p. 1-p. 6.

* cited by examiner

【 IN CASE WHERE SHORTEST CAMERA DISTANCE ≤ THRESHOLD VALUE 】
【 IN CASE WHERE NON-DETECTION DURATION ≥ PREDETERMINED TIME AND TARGET PERSON IMAGE IS DETECTED THROUGH FOURTH DETECTION PROCESS 】

IMAGE PROCESSING APPARATUS, IMAGE PROCESSING METHOD, AND PROGRAM FOR OUTPUTTING SECOND IMAGE WHEN FIRST IMAGE TRANSITIONS FROM DETECTION STATE TO NON-DETECTION STATE

CROSS-REFERENCE TO RELATED APPLICATIONS

This application is a continuation application of International Application No. PCT/JP2021/016070, filed Apr. 20, 2021, the disclosure of which is incorporated herein by reference in its entirety. Further, this application claims priority under 35 USC 119 from Japanese Patent Application No. 2020-078678 filed Apr. 27, 2020, the disclosure of which is incorporated by reference herein.

BACKGROUND

1. Technical Field

The techniques of the present disclosure relate to an image processing apparatus, an image processing method, and a program.

2. Related Art

JP2019-114147A discloses an information processing apparatus that determines a position of a viewpoint related to a virtual viewpoint image generated by using a plurality of images captured by a plurality of imaging devices. The information processing apparatus described in JP2019-114147A includes a first acquisition unit that acquires position information indicating a position within a predetermined range from an imaging target of a plurality of imaging devices, and a determination unit that determines a position of a viewpoint related to a virtual viewpoint image for capturing the imaging target with a position different from the position indicated by the position information acquired by the first acquisition unit as a viewpoint on the basis of the position information acquired by the first acquisition unit.

JP2019-118136A discloses an information processing apparatus including a storage unit that stores a plurality of pieces of captured video data, and an analysis unit that detects a blind spot from the plurality of pieces of captured video data stored in the storage unit, generates a command signal, and outputs the command signal to a camera that generates the captured video data.

SUMMARY

One embodiment according to the technique of the present disclosure is to provide an image processing apparatus, an image processing method, and a program capable of continuously providing an image from which a target object in an imaging region can be observed to a viewer of the image obtained by imaging the imaging region.

According to a first aspect according to the technique of the present disclosure, there is provided an image processing apparatus including a processor; and a memory built in or connected to the processor, in which the processor performs a detection process of detecting a target object image showing a target object from a plurality of images obtained by imaging an imaging region with a plurality of cameras having different positions, outputs a first image among the plurality of images, and outputs, in a case where a state transitions from a detection state in which the target object image is detected from the first image through the detection process to a non-detection state in which the target object image is not detected from the first image through the detection process, a second image from which the target object image is detected through the detection process among the plurality of images.

A second aspect according to the technique of the present disclosure is the image processing apparatus according to the first aspect in which at least one of the first image or the second image is a virtual viewpoint image.

A third aspect according to the technique of the present disclosure is the image processing apparatus according to the first aspect or the second aspect in which the processor switches from output of the first image to output of the second image in a case where a state transitions from the detection state to the non-detection state under a situation in which the first image is output.

A fourth aspect according to the technique of the present disclosure is the image processing apparatus according to according to any one of the first aspect to the third aspect in which the image is a multi-frame image consisting of a plurality of frames.

A fifth aspect according to the technique of the present disclosure is the image processing apparatus according to the fourth aspect in which the multi-frame image is a motion picture.

A sixth aspect according to the technique of the present disclosure is the image processing apparatus according to a fourth aspect in which the multi-frame image is a consecutively captured image.

A seventh aspect according to the technique of the present disclosure is the image processing apparatus according to any one of the fourth aspect to the sixth aspect in which the processor outputs the multi-frame image as the second image, and starts to output the multi-frame image as the second image at a timing before a timing of reaching the non-detection state.

An eighth aspect according to the technique of the present disclosure is the image processing apparatus according to any one of the fourth aspect to the seventh aspect in which the processor outputs the multi-frame image as the second image, and ends the output of the multi-frame image as the second image at a timing after a timing of reaching the non-detection state.

A ninth aspect according to the technique of the present disclosure is the image processing apparatus according to any one of the fourth aspect to the eighth aspect in which the plurality of images include a third image from which the target object image is detected through the detection process, and, in a case where the multi-frame image as the second image includes a detection frame in which the target object image is detected through the detection process and a non-detection frame in which the target object image is not detected through the detection process, the processor selectively outputs the non-detection frame and the third image according to a distance between a position of a second image camera used in imaging for obtaining the second image among the plurality of cameras and a position of a third image camera used for imaging for obtaining the third image among the plurality of cameras, and a time of the non-detection state.

A tenth aspect according to the technique of the present disclosure is the image processing apparatus according to the ninth aspect in which the processor outputs the non-detection frame in a case where a non-detection frame output condition that the distance exceeds a threshold value and the time of the non-detection state is less than a predetermined time is satisfied, and outputs the third image instead of the non-detection frame in a case where the non-detection frame output condition is not satisfied.

An eleventh aspect according to the technique of the present disclosure is the image processing apparatus according to any one of the first aspect to the tenth aspect in which the processor restarts the output of the first image on condition that the non-detection state returns to the detection state.

A twelfth aspect according to the technique of the present disclosure is the image processing apparatus according to any one of the first aspect to the eleventh aspect in which the plurality of cameras include at least one virtual camera and at least one physical camera, and the plurality of images include a virtual viewpoint image obtained by imaging the imaging region with the virtual camera and a captured image obtained by imaging the imaging region with the physical camera.

A thirteenth aspect according to the technique of the present disclosure is the image processing apparatus according to any one of the first aspect to the twelfth aspect in which, during a period of switching from the output of the first image to the output of the second image, the processor outputs a plurality of virtual viewpoint images obtained by being captured by a plurality of virtual cameras that continuously connect a position, an orientation, and an angle of view of the camera used for imaging for obtaining the first image to a position, an orientation, and an angle of view of the camera used for imaging for obtaining the second image.

A fourteenth aspect according to the technique of the present disclosure is the image processing apparatus according to any one of the first aspect to the thirteenth aspect in which the target object is a person.

A fifteenth aspect according to the technique of the present disclosure is the image processing apparatus according to the fourteenth aspect in which the processor detects the target object image by detecting a face image showing a face of the person.

A sixteenth aspect according to the technique of the present disclosure is the image processing apparatus according to any one of the first aspect to the fifteenth aspect in which, among the plurality of images, the processor outputs an image in which at least one of a position or a size of the target object image satisfies a predetermined condition and from which the target object image is detected through the detection process, as the second image.

A seventeenth aspect according to the technique of the present disclosure is the image processing apparatus according to any one of the first to sixteenth aspects in which the second image is a bird's-eye view image showing an aspect of a bird's-eye view of the imaging region.

An eighteenth aspect according to the technique of the present disclosure is the image processing apparatus according to any one of the first aspect to the seventeenth aspect in which the first image is an image for television broadcasting.

A nineteenth aspect according to the technique of the present disclosure is the image processing apparatus according to any one of the first aspect to the eighteenth aspect in which the first image is an image obtained by being captured by a camera installed at an observation position where the imaging region is observed or installed near the observation position among the plurality of cameras.

According to a twentieth aspect according to the technique of the present disclosure, there is provided an image processing method including performing a detection process of detecting a target object image showing a target object from a plurality of images obtained by imaging an imaging region with a plurality of cameras having different positions; outputting a first image among the plurality of images; and outputting, in a case where a state transitions from a detection state in which the target object image is detected from the first image through the detection process to a non-detection state in which the target object image is not detected from the first image through the detection process, a second image from which the target object image is detected through the detection process among the plurality of images.

According to a twenty-first aspect according to the technique of the present disclosure, there is provided a program causing a computer to execute performing a detection process of detecting a target object image showing a target object from a plurality of images obtained by imaging an imaging region with a plurality of cameras having different positions; outputting a first image among the plurality of images; and outputting, in a case where a state transitions from a detection state in which the target object image is detected from the first image through the detection process to a non-detection state in which the target object image is not detected from the first image through the detection process, a second image from which the target object image is detected through the detection process among the plurality of images.

BRIEF DESCRIPTION OF THE DRAWINGS

Exemplary embodiments of the technology of the disclosure will be described in detail based on the following figures, wherein.

DETAILED DESCRIPTION

An example of an image processing apparatus, an image processing method, and a program according to embodiments of the technique of the present disclosure will be described with reference to the accompanying drawings.

First, the technical terms used in the following description will be described.

CPU stands for "Central Processing Unit". RAM stands for "Random Access Memory". SSD stands for "Solid State Drive". HDD stands for "Hard Disk Drive". EEPROM stands for "Electrically Erasable and Programmable Read Only Memory". OF stands for "Interface". IC stands for "Integrated Circuit". ASIC stands for "Application Specific Integrated Circuit". PLD stands for "Programmable Logic Device". FPGA stands for "Field-Programmable Gate Array". SoC stands for "System-on-a-chip". CMOS stands for "Complementary Metal Oxide Semiconductor". CCD stands for "Charge Coupled Device". EL stands for "Electro-Luminescence". GPU stands for "Graphics Processing Unit". WAN stands for "Wide Area Network". LAN stands for "Local Area Network". 3D stands for "3 Dimensions". USB stands for "Universal Serial Bus". 5G stands for "5th Generation". LTE stands for "Long Term Evolution". WiFi stands for "Wireless Fidelity". RTC stands for "Real Time Clock". SNTP stands for "Simple Network Time Protocol". NTP stands for "Network Time Protocol". GPS stands for "Global Positioning System". Exif stands for "Exchangeable image file format for digital still cameras". fps stands for "frame per second". GNSS stands for "Global Navigation Satellite System". In the following description, for convenience of description, a CPU is exemplified as an example of a "processor" according to the technique of the present disclosure, but the "processor" according to the technique of the present disclosure may be a combination of a plurality of processing devices such as a CPU and a GPU. In a case where a combination of a CPU and a GPU is applied as an example of the "processor" according to the technique of the present disclosure, the GPU operates under the control of the CPU and executes image processing.

In the following description, the term "match" refers to, in addition to perfect match, a meaning including an error generally allowed in the technical field to which the technique of the present disclosure belongs (a meaning including an error to the extent that the error does not contradict the concept of the technique of the present disclosure). In the following description, the "same imaging time" refers to, in addition to the completely same imaging time, a meaning including an error generally allowed in the technical field to which the technique of the present disclosure belongs (a meaning including an error to the extent that the error does not contradict the concept of the technique of the present disclosure).

First Embodiment

Figure 1:
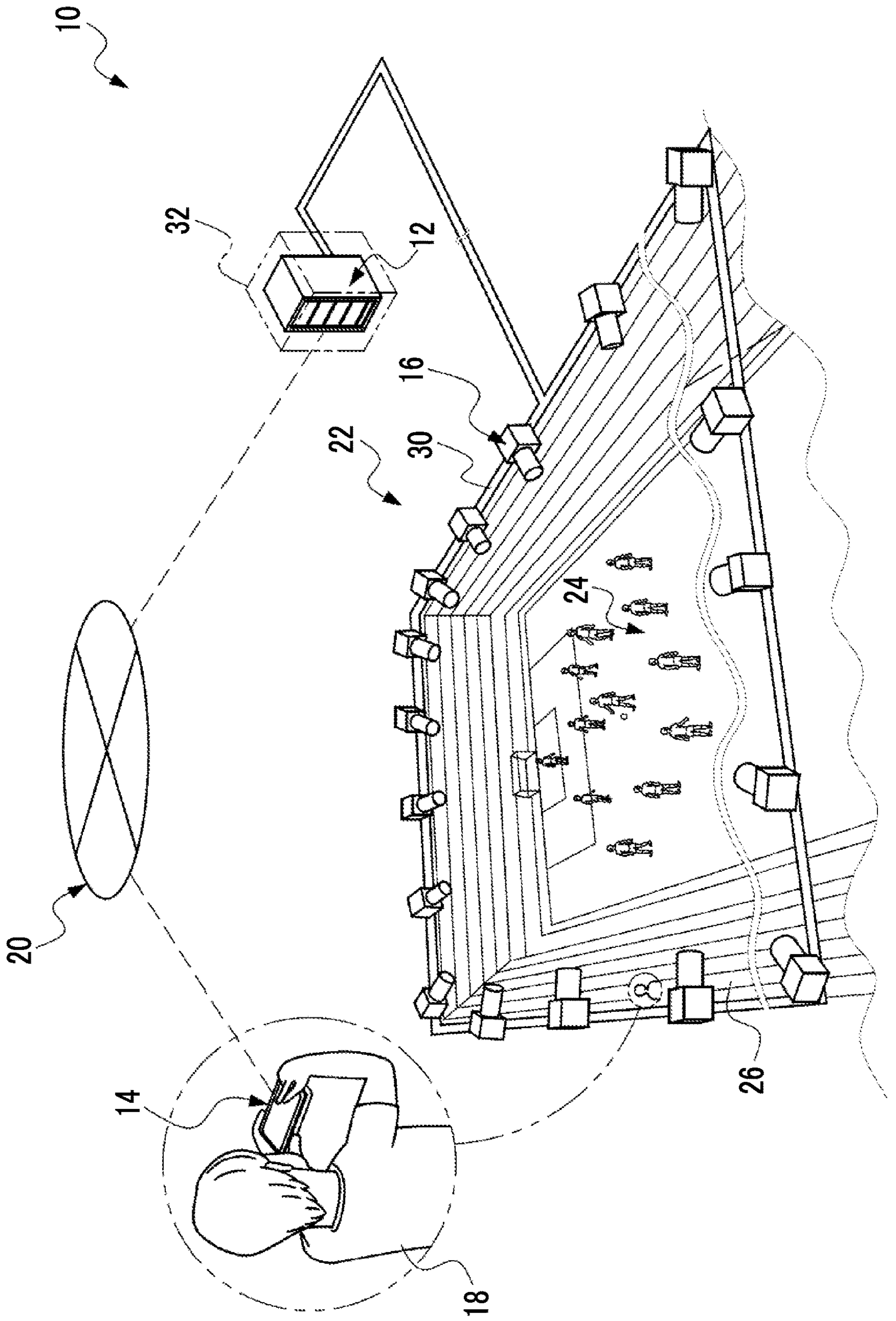
FIG. 1 is a schematic perspective view showing an example of an external configuration of an image processing system according to first and second embodiments.

As an example, as shown in FIG. 1, an image processing system 10 includes an image processing apparatus 12, a user device 14, and a plurality of physical cameras 16. The user device 14 is used by a user 18.

In the first embodiment, a smartphone is applied as an example of the user device 14. However, the smartphone is only an example, and may be, for example, a personal computer, a tablet terminal, or a portable multifunctional terminal such as a head-mounted display. In the first embodiment, a server is applied as an example of the image processing apparatus 12. The number of servers may be one or a plurality. The server is only an example, and may be, for example, at least one personal computer, or may be a combination of at least one server and at least one personal computer. As described above, the image processing apparatus 12 may be at least one device capable of executing image processing.

A network 20 includes, for example, a WAN and/or a LAN. In the example shown in FIG. 1, although not shown, the network 20 includes, for example, a base station. The number of base stations is not limited to one, and there may be a plurality of base stations. The communication standards used in the base station include wireless communication standards such as 5G standard, LTE standard, WiFi (802.11) standard, and Bluetooth (registered trademark) standard. The network 20 establishes communication between the image processing apparatus 12 and the user device 14, and transmits and receives various types of information between the image processing apparatus 12 and the user device 14. The image processing apparatus 12 receives a request from the user device 14 via the network 20 and provides a service corresponding to the request to the user device 14 that is a request source via the network 20.

In the first embodiment, a wireless communication method is applied as an example of a communication method between the user device 14 and the network 20 and a communication method between the image processing apparatus 12 and the network 20, but this is a only an example, and a wired communication method may be used.

A physical camera 16 actually exists as an object and is a visually recognizable imaging device. The physical camera 16 is an imaging device having a CMOS image sensor, and has an optical zoom function and/or a digital zoom function. Instead of the CMOS image sensor, another type of image sensor such as a CCD image sensor may be applied. In the first embodiment, the zoom function is provided to a plurality of physical cameras 16, but this is only an example, and the zoom function may be provided to some of the plurality of physical cameras 16, or the zoom function does not have to be provided to the plurality of physical cameras 16.

The plurality of physical cameras 16 are installed in a soccer stadium 22. The plurality of physical cameras 16 have different imaging positions (hereinafter, also simply referred to as "positions"), and imaging direction (hereinafter, simply referred to as "orientation") of each physical camera 16 can be changed. In the example shown in FIG. 1, each of the plurality of physical cameras 16 is disposed to surround the soccer field 24, and a region including the soccer field 24 is imaged as an imaging region. The imaging by the physical camera 16 refers to, for example, imaging at an angle of view including an imaging region. Here, the concept of "imaging region" includes the concept of a region showing a part of the soccer stadium 22 in addition to the concept of a region showing the whole in the soccer stadium 22. The imaging region is changed according to an imaging position, an imaging direction, and an angle of view.

Here, although a form example in which each of the plurality of physical cameras 16 is disposed to surround the soccer field 24 is described, the technique of the present disclosure is not limited to this, and, for example, a plurality of physical cameras 16 may be disposed to surround a specific part in the soccer field 24. Positions and/or orientations of the plurality of physical cameras 16 can be changed, and it is determined to be generated according to a virtual viewpoint image requested by the user 18 or the like.

Although not shown, at least one physical camera 16 may be installed in an unmanned aerial vehicle (for example, a multi-rotorcraft unmanned aerial vehicle), and a bird's-eye view of a region including the soccer field 24 as an imaging region may be imaged from the sky.

The image processing apparatus 12 is installed in a control room 32. The plurality of physical cameras 16 and the image processing apparatus 12 are connected via a LAN cable 30, and the image processing apparatus 12 controls the plurality of physical cameras 16 and acquires an image obtained through imaging in each of the plurality of physical cameras 16. Although the connection using the wired communication method by the LAN cable 30 is exemplified here, the connection is not limited to this, and connection using a wireless communication method may be used.

The soccer stadium 22 is provided with spectator seats 26 to surround the soccer field 24, and the user 18 is seated in the spectator seat 26. The user 18 possesses the user device 14, and the user device 14 is used by the user 18. Here, a form example in which the user 18 is present in the soccer stadium 22 is described, but the technique of the present disclosure is not limited to this, and the user 18 may be present outside the soccer stadium 22.

Figure 2:
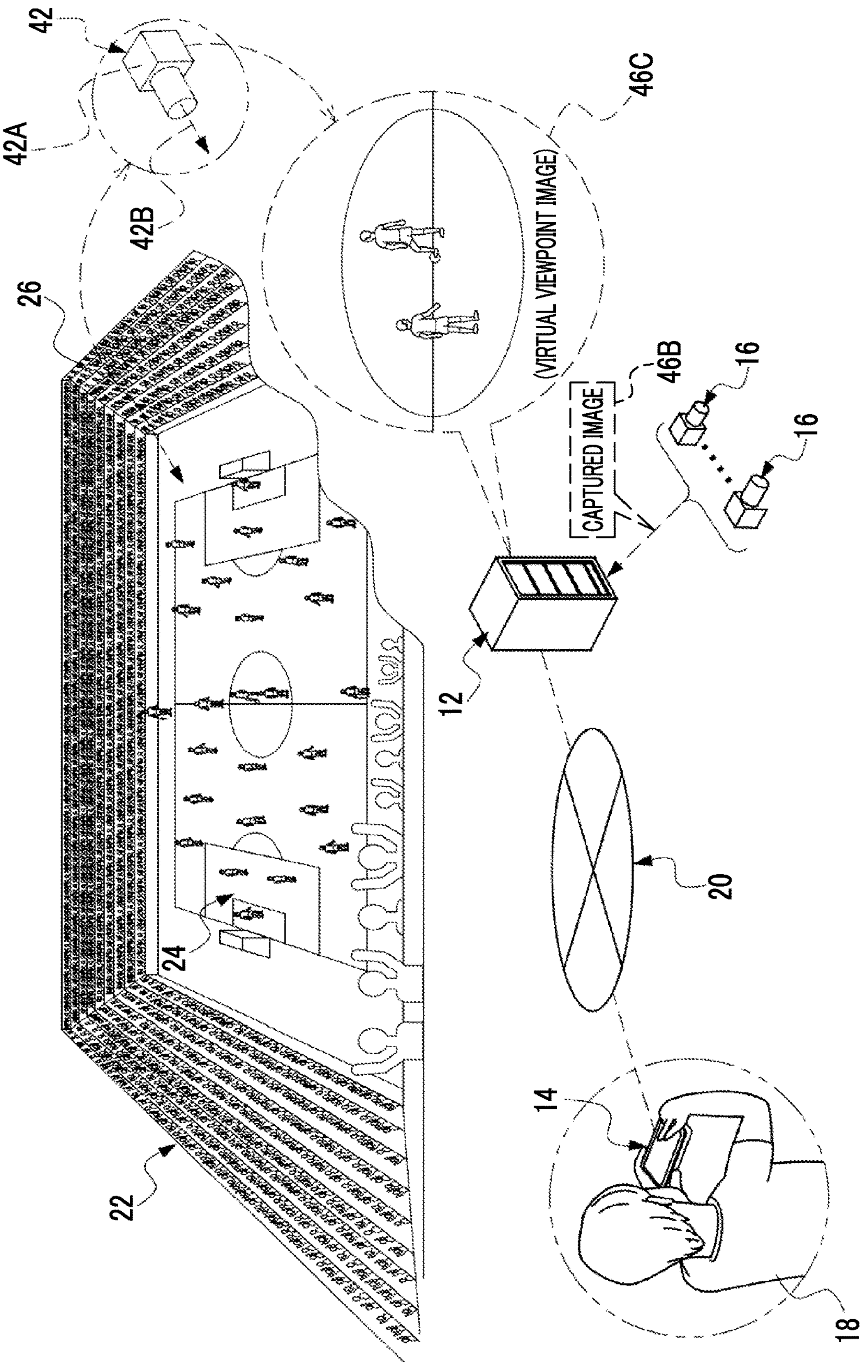
FIG. 2 is a conceptual diagram showing an example of a virtual viewpoint image generated by the image processing system according to the first and second embodiments.

As an example, as shown in FIG. 2, the image processing apparatus 12 acquires a captured image 46B showing an imaging region in a case where the imaging region is observed from each position of the plurality of physical cameras 16, from each of the plurality of physical cameras 16. The captured image 46B is a frame image showing an imaging region in a case where the imaging region is observed from the position of the physical camera 16. That is, the captured image 46B is obtained by each of the plurality of physical cameras 16 imaging the imaging region. In the captured image 46B, physical camera specifying information that specifies the physical camera 16 used for imaging and a time point at which an image is captured by the physical camera 16 (hereinafter, also referred to as a "physical camera imaging time") are added for each frame. In the captured image 46B, physical camera installation position information capable of specifying an installation position (imaging position) of the physical camera 16 used for imaging is also added for each frame.

The image processing apparatus 12 generates an image using 3D polygons by combining a plurality of captured images 46B obtained by the plurality of physical cameras 16 imaging the imaging region. The image processing apparatus 12 generates a virtual viewpoint image 46C showing the imaging region in a case where the imaging region is observed from any position and any direction, frame by frame, on the basis of the image using the generated 3D polygons.

Here, the captured image 46B is an image obtained by being captured by the physical camera 16, whereas the virtual viewpoint image 46C may be considered to be an image obtained by being captured by a virtual imaging device, that is, a virtual camera 42 from any position and any direction. The virtual camera 42 is a virtual camera that does not actually exist as an object and is not visually recognized. In the present embodiment, virtual cameras are installed at a plurality of locations in the soccer stadium 22 (refer to FIG. 3). All virtual cameras 42 are installed at different positions from each other. All the virtual cameras 42 are installed at different positions from all the physical cameras 16. That is, all the physical cameras 16 and all the virtual cameras 42 are installed at different positions from each other.

In the virtual viewpoint image 46C, virtual camera specifying information that specifies the virtual camera 42 used for imaging and a time point at which an image is captured by the virtual camera 42 (hereinafter, also referred to as a "virtual camera imaging time") are added for each frame. In the virtual viewpoint image 46C, virtual camera installation position information capable of specifying an installation position (imaging position) of the virtual camera 42 used for imaging is added.

In the following description, for convenience of the description, in a case where it is not necessary to distinguish between the physical camera 16 and the virtual camera 42, the physical camera 16 and the virtual camera 42 will be simply referred to as a "camera". In the following description, for convenience of the description, in a case where it is not necessary to distinguish between the captured image 46B and the virtual viewpoint image 46C, the captured image 46B and the virtual viewpoint image 46C will be referred to as a "camera image". In the following description, for convenience of the description, in a case where it is not necessary to distinguish between the physical camera specifying information and the virtual camera specifying information, the information will be referred to as "camera specifying information". In the following description, for convenience of the description, in a case where it is not necessary to distinguish between the physical camera imaging time and the virtual camera imaging time, the physical camera imaging time and the virtual camera imaging time will be referred to as an "imaging time". In the following description, for convenience of the description, in a case where it is not necessary to distinguish between the physical camera installation position information and the virtual camera installation position information, the information will be referred to as "camera installation position information". The camera specifying information, the imaging time, and the camera installation position information are added to each camera image in, for example, the Exif method.

The image processing apparatus 12 stores, for example, camera images for a predetermined time (for example, several hours to several tens of hours). Therefore, for example, the image processing apparatus 12 acquires a camera image at a specified imaging time from a group of camera images for a predetermined time, and processes the acquired camera image.

A position (hereinafter, also referred to as a "virtual camera position") 42A and an orientation (hereinafter, also referred to as a "virtual camera orientation") 42B of the virtual camera 42 can be changed. An angle of view of the virtual camera 42 can also be changed.

In the first embodiment, the virtual camera position 42A is referred to, but in general, the virtual camera position 42A is also referred to as a viewpoint position. In the first embodiment, the virtual camera orientation 42B is referred to, but in general, the virtual camera orientation 42B is also referred to as a line-of-sight direction. Here, the viewpoint position means, for example, a position of a viewpoint of a virtual person, and the line-of-sight direction means, for example, a direction of a line of sight of a virtual person.

That is, in the present embodiment, the virtual camera position 42A is used for convenience of description, but it is not essential to use the virtual camera position 42A. "Installing a virtual camera" means determining a viewpoint position, a line-of-sight direction, and/or an angle of view for generating the virtual viewpoint image 46C. Therefore, for example, the present disclosure is not limited to an aspect in which an object such as a virtual camera is installed in an imaging region on a computer, and another method such as numerically specifying coordinates and/or a direction of a viewpoint position may be used. "Imaging with a virtual camera" means generating the virtual viewpoint image 46C corresponding to a case where the imaging region is viewed from a position and a direction in which the "virtual camera is installed".

In the example shown in FIG. 2, as an example of the virtual viewpoint image 46C, a virtual viewpoint image showing an imaging region in a case where the imaging region is observed from the virtual camera position 42A in the spectator seat 26 and the virtual camera orientation 42B is shown. The virtual camera position and virtual camera orientation are not fixed. That is, the virtual camera position and the virtual camera orientation can be changed according to an instruction from the user 18 or the like. For example, the image processing apparatus 12 may set a position of a person designated as a target subject (hereinafter, also referred to as a "target person") among soccer players, referees, and the like in the soccer field 24 as a virtual camera position, and set a line-of-sight direction of the target person as a virtual camera direction.

Figure 3:
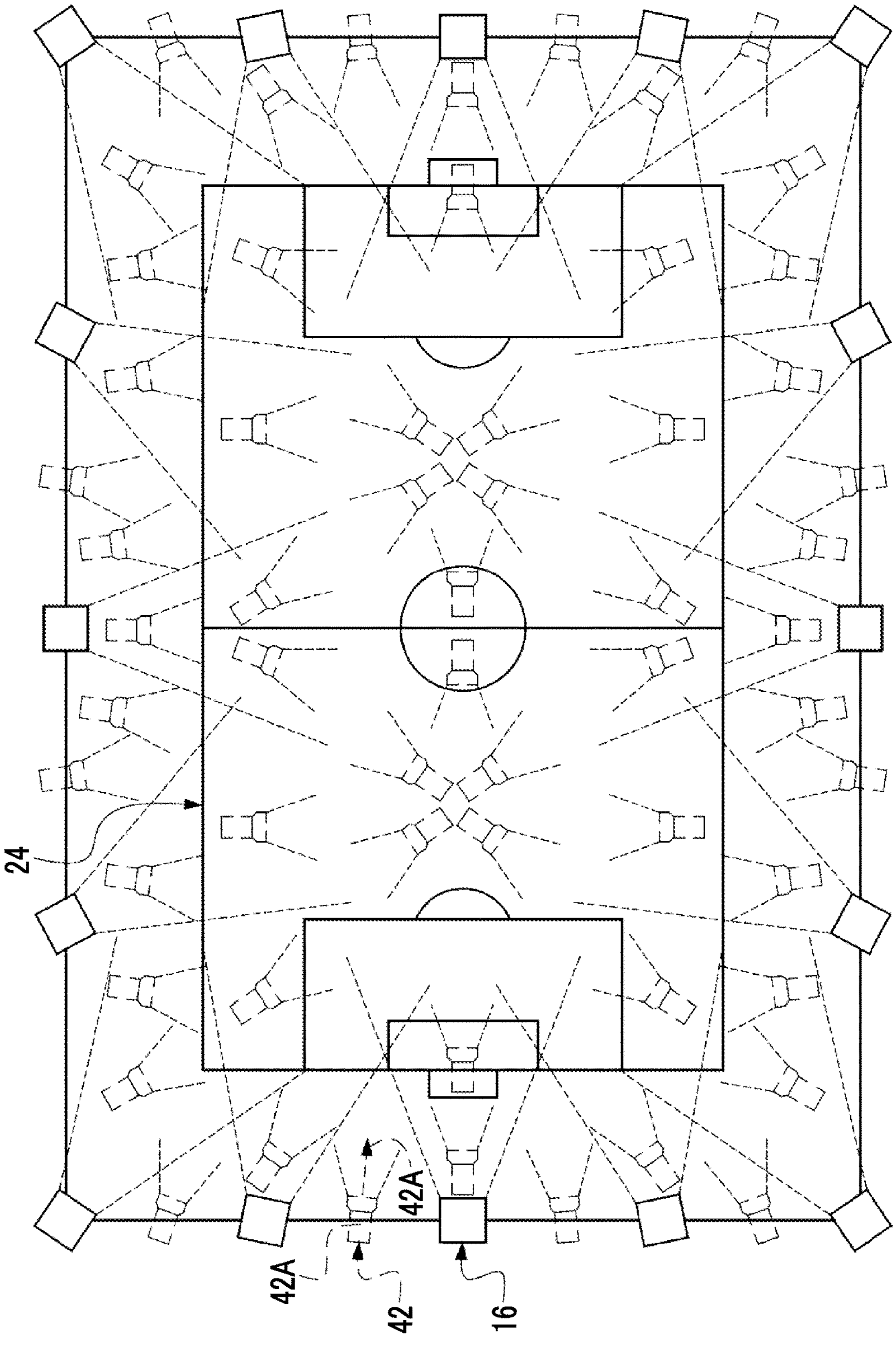
FIG. 3 is a schematic plan view showing an example of a mode in which a plurality of physical cameras and a plurality of virtual cameras used in the image processing system according to the first and second embodiments are installed in a soccer stadium.

As an example, as shown in FIG. 3, virtual cameras 42 are installed at a plurality of locations in the soccer field 24 and at a plurality of locations around the soccer field 24. The installation aspect of the virtual camera 42 shown in FIG. 3 is only an example. For example, there may be a configuration in which the virtual camera 42 is not installed in the soccer field 24 and the virtual camera 42 is installed only around the soccer field 24, or the virtual camera 42 is not installed around the soccer field 24 and the virtual camera 42 is installed only in the soccer field 24. The number of virtual cameras 42 installed may be larger or smaller than the example shown in FIG. 3. The virtual camera position 42A and the virtual camera orientation 42B of each of the virtual cameras 42 can also be changed.

Figure 4:
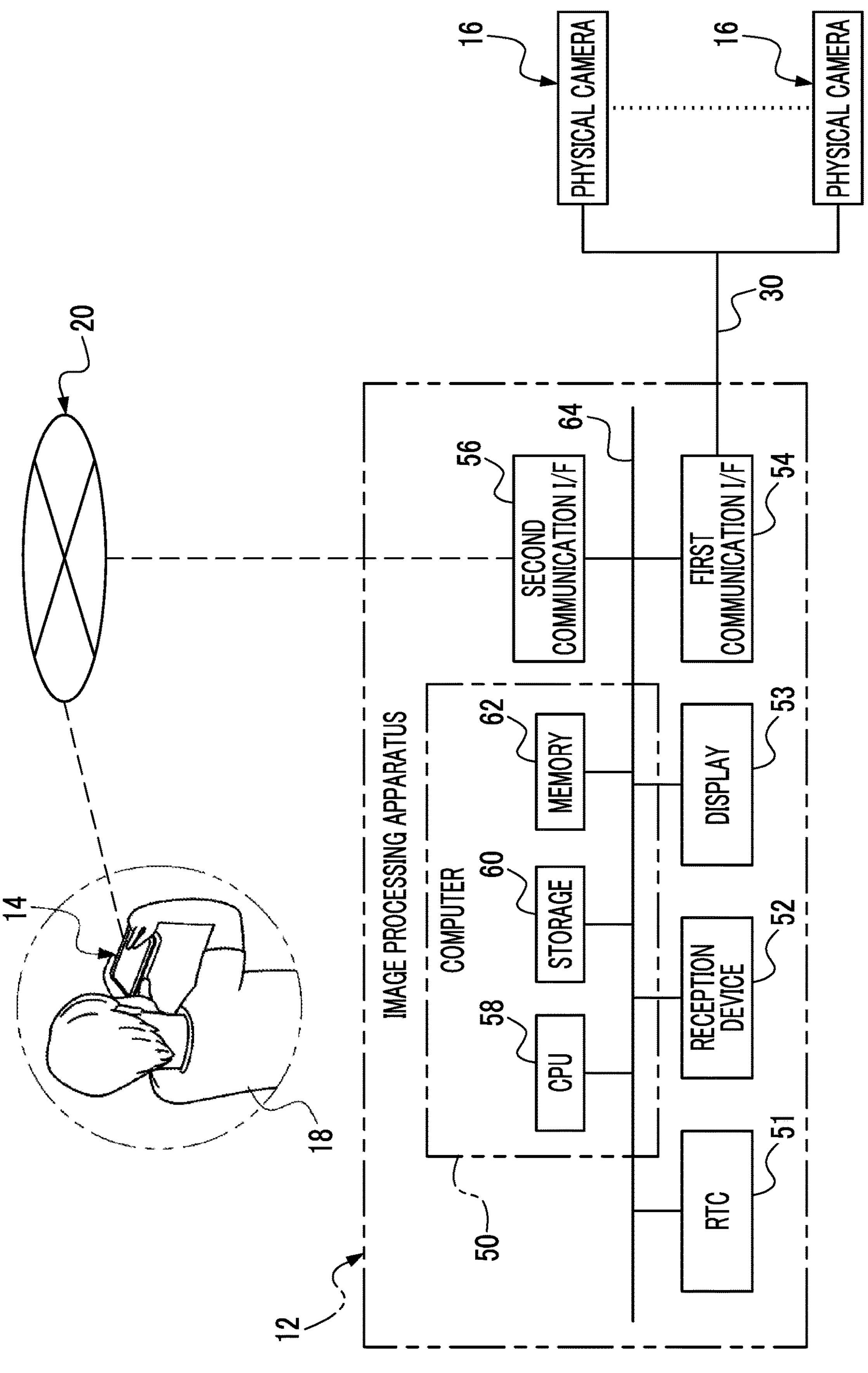
FIG. 4 is a block diagram showing an example of a hardware configuration of an electrical system of an image processing apparatus according to the first and second embodiments.

As an example, as shown in FIG. 4, the image processing apparatus 12 includes a computer 50, an RTC 51, a reception device 52, a display 53, a first communication I/F 54, and a second communication I/F 56. The computer 50 includes a CPU 58, a storage 60, and a memory 62. The CPU 58 is an example of a "processor" according to the technique of the present disclosure. The memory 62 is an example of a "memory" according to the technique of the present disclosure. The computer 50 is an example of a "computer" according to the technique of the present disclosure.

The CPU 58, the storage 60, and the memory 62 are connected via a bus 64. In the example shown in FIG. 4, one bus is shown as the bus 64 for convenience of illustration, but a plurality of buses may be used. The bus 64 may include a serial bus or a parallel bus configured with a data bus, an address bus, a control bus, and the like.

The CPU 58 controls the entire image processing apparatus 12. The storage 60 stores various parameters and various programs. The storage 60 is a non-volatile storage device. Here, an EEPROM is applied as an example of the storage 60. However, this is only an example, and may be an SSD, an HDD, or the like. The memory 62 is a storage device. Various types of information is temporarily stored in the memory 62. The memory 62 is used as a work memory by the CPU 58. Here, a RAM is applied as an example of the memory 62. However, this is only an example, and other types of storage devices may be used.

The RTC 51 receives drive power from a power supply system disconnected from a power supply system for the computer 50, and continues to count the current time (for example, year, month, day, hour, minute, second) even in a case where the computer 50 is shut down. The RTC 51 outputs the current time to the CPU 58 each time the current time is updated. The CPU 58 uses the current time input from the RTC 51 as an imaging time. Here, a form example in which the CPU 58 acquires the current time from the RTC 51 is described, but the technique of the present disclosure is not limited to this. For example, the CPU 58 may acquire the current time provided from an external device (not shown) via the network 20 (for example, by using an SNTP and/or an NTP), or may acquire the current time from a built-in or connected GNSS device (for example, a GPS device).

The reception device 52 receives an instruction from a user or the like of the image processing apparatus 12. Examples of the reception device 52 include a touch panel, hard keys, and a mouse. The reception device 52 is connected to the bus 64 or the like, and the instruction received by the reception device 52 is acquired by the CPU 58.

The display 53 is connected to the bus 64 and displays various types of information under the control of the CPU 58. An example of the display 53 is a liquid crystal display. In addition to the liquid crystal display, another type of display such as an EL display (for example, an organic EL display or an inorganic EL display) may be employed as the display 53.

The first communication I/F 54 is connected to the LAN cable 30. The first communication I/F 54 is realized by, for example, a device having an FPGA. The first communication I/F 54 is connected to the bus 64 and controls the exchange of various types of information between the CPU 58 and the plurality of physical cameras 16. For example, the first communication I/F 54 controls the plurality of physical cameras 16 according to a request from the CPU 58. The first communication I/F 54 acquires the captured image 46B (refer to FIG. 2) obtained by being captured by each of the plurality of physical cameras 16, and outputs the acquired captured image 46B to the CPU 58. The first communication I/F 54 is exemplified as a wired communication I/F here, but may be a wireless communication I/F such as a high-speed wireless LAN.

The second communication I/F 56 is wirelessly communicatively connected to the network 20. The second communication I/F 56 is realized by, for example, a device having an FPGA. The second communication I/F 56 is connected to the bus 64. The second communication I/F 56 controls the exchange of various types of information between the CPU 58 and the user device 14 in a wireless communication method via the network 20.

At least one of the first communication I/F 54 or the second communication I/F 56 may be configured with a fixed circuit instead of the FPGA. At least one of the first communication I/F 54 or the second communication I/F 56 may be a circuit configured with an ASIC, an FPGA, and/or a PLD.

Figure 5:
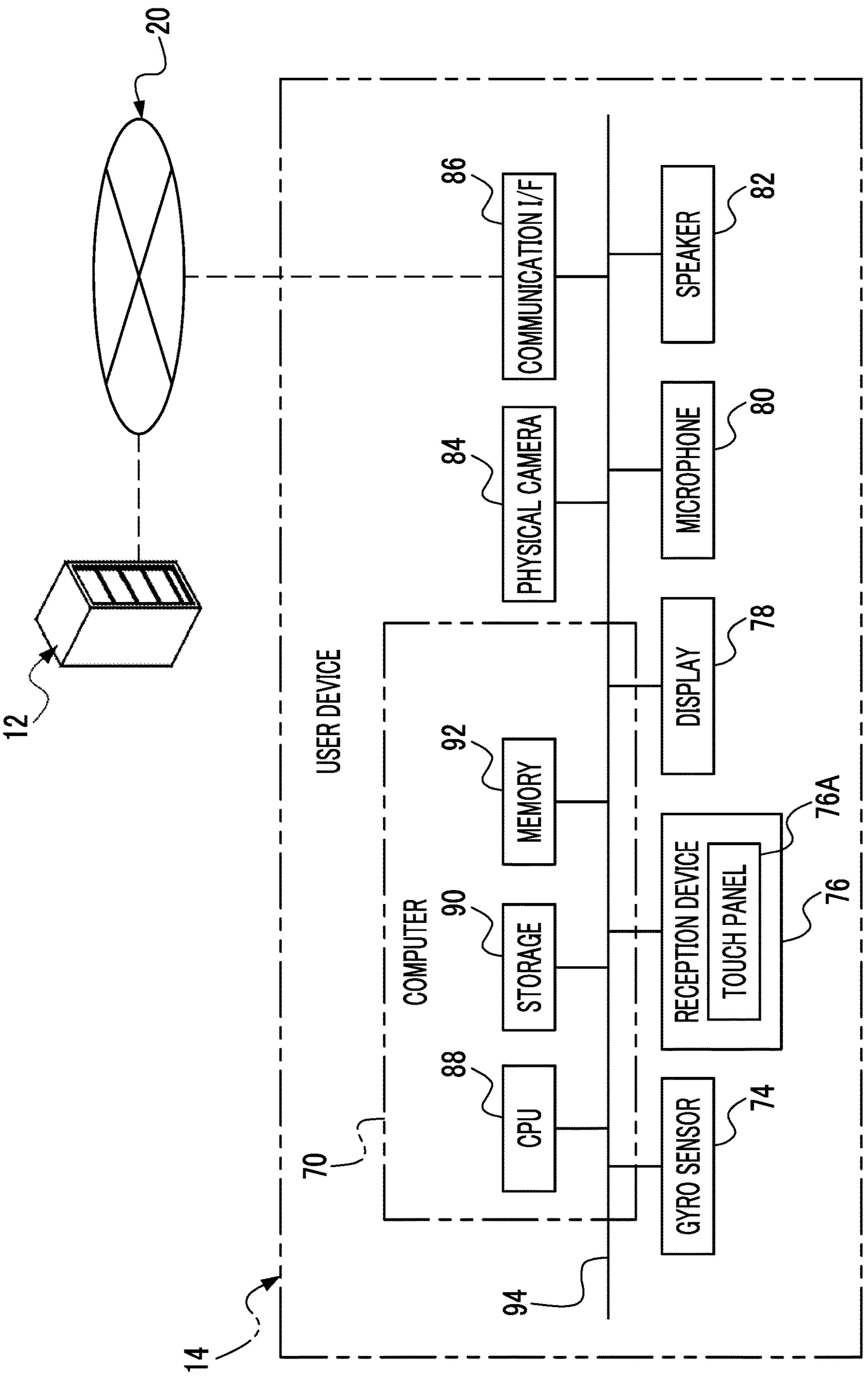
FIG. 5 is a block diagram showing an example of a hardware configuration of an electrical system of a user device according to the first and second embodiments.

As an example, as shown in FIG. 5, the user device 14 includes a computer 70, a gyro sensor 74, a reception device 76, a display 78, a microphone 80, a speaker 82, a physical camera 84, and a communication I/F 86. The computer 70 includes a CPU 88, a storage 90, and a memory 92, and the CPU 88, the storage 90, and the memory 92 are connected via a bus 94. In the example shown in FIG. 5, one bus is shown as the bus 94 for convenience of illustration, but the bus 94 may be configured with a serial bus, or may be configured to include a data bus, an address bus, a control bus, and the like.

The CPU 88 controls the entire user device 14. The storage 90 stores various parameters and various programs. The storage 90 is a non-volatile storage device. Here, an EEPROM is applied as an example of the storage 90. However, this is only an example, and may be an SSD, an HDD, or the like. Various types of information are temporarily stored in the memory 92, and the memory 92 is used as a work memory by the CPU 88. Here, a RAM is applied as an example of the memory 92. However, this is only an example, and other types of storage devices may be used.

The gyro sensor 74 measures an angle about the yaw axis of the user device 14 (hereinafter, also referred to as a "yaw angle"), an angle about the roll axis of the user device 14 (hereinafter, also referred to as a "roll angle"), and an angle about the pitch axis of the user device 14 (hereinafter, also referred to as a "pitch angle"). The gyro sensor 74 is connected to the bus 94, and angle information indicating the yaw angle, the roll angle, and the pitch angle measured by the gyro sensor 74 is acquired by the CPU 88 via the bus 94 or the like.

The reception device 76 receives an instruction from the user 18 (refer to FIGS. 1 and 2). Examples of the reception device 76 include a touch panel 76A and a hard key. The reception device 76 is connected to the bus 94, and the instruction received by the reception device 76 is acquired by the CPU 88.

The display 78 is connected to the bus 94 and displays various types of information under the control of the CPU 88. An example of the display 78 is a liquid crystal display. In addition to the liquid crystal display, another type of display such as an EL display (for example, an organic EL display or an inorganic EL display) may be employed as the display 78.

The user device 14 includes a touch panel display, and the touch panel display is implemented by the touch panel 76A and the display 78. That is, the touch panel display is formed by overlapping the touch panel 76A on a display region of the display 78, or by incorporating a touch panel function ("in-cell" type) inside the display 78. The "in-cell" type touch panel display is only an example, and an "out-cell" type or "on-cell" type touch panel display may be used.

The microphone 80 converts collected sound into an electrical signal. The microphone 80 is connected to the bus 94. The electrical signal obtained by converting the sound collected by the microphone 80 is acquired by the CPU 88 via the bus 94.

The speaker 82 converts an electrical signal into sound. The speaker 82 is connected to the bus 94. The speaker 82 receives the electrical signal output from the CPU 88 via the bus 94, converts the received electrical signal into sound, and outputs the sound obtained by converting the electrical signal to the outside of the user device 14.

The physical camera 84 acquires an image showing the subject by imaging the subject. The physical camera 84 is connected to the bus 94. The image obtained by imaging the subject in the physical camera 84 is acquired by the CPU 88 via the bus 94. The image obtained by being captured by the physical camera 84 may also be used together with the captured image 46B to generate the virtual viewpoint image 46C.

The communication I/F 86 is wirelessly communicatively connected to the network 20. The communication I/F 86 is realized by, for example, a device configured with circuits (for example, an ASIC, an FPGA, and/or a PLD). The communication I/F 86 is connected to the bus 94. The communication I/F 86 controls the exchange of various types of information between the CPU 88 and an external device in a wireless communication method via the network 20. Here, examples of the "external device" include the image processing apparatus 12.

Each of the plurality of physical cameras 16 (refer to FIGS. 1 to 4) generates a motion picture (hereinafter, also referred to as a "physical camera motion picture") showing the imaging region by imaging the imaging region. In the first embodiment, any one of the plurality of physical cameras 16 is used as a reference physical camera. The physical camera motion picture obtained by being captured by the reference physical camera (hereinafter, also referred to as a "reference physical camera motion picture") is distributed to the user device 14, and displayed on, for example, the display 78 of the user device 14. The user 18 views the reference physical camera motion picture displayed on the display 78.

Figure 6:
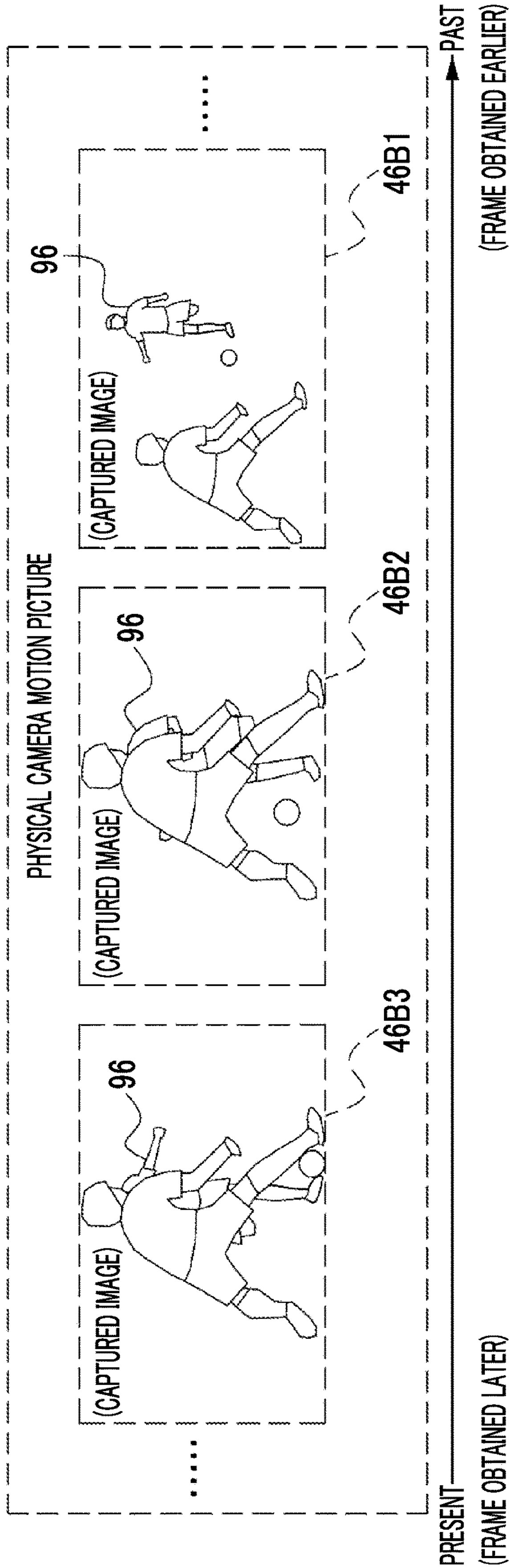
FIG. 6 is a conceptual diagram showing an example of a plurality of captured images 46B in a time series forming a physical camera motion picture generated and output by the image processing apparatus according to the first and second embodiments.

The physical camera motion picture is obtained by being captured by the physical camera 16 at a specific frame rate (for example, 60 fps). As an example, as shown in FIG. 6, the physical camera motion picture is a multi-frame image consisting of a plurality of frames obtained according to a specific frame rate. That is, the physical camera motion picture is configured by arranging a plurality of captured images 46B obtained at each timing defined at a specific frame rate in a time series.

In the example shown in FIG. 6, among the plurality of captured images 46B included in the motion picture of the physical camera, captured images 46B1 to 46B3 for three frames including a target person image 96 showing a target person are shown. Here, the target person is an example of a "target object" according to the technique of the present disclosure, and the target person image 96 is an example of a "target object image" according to the technique of the present disclosure.

The captured images 46B1 to 46B3 for three frames are roughly classified into the captured image 46B1 of the first frame, the captured image 46B2 of the second frame, and the captured image 46B3 of the third frame from the oldest frame to the latest frame. In the captured image 46B1 of the first frame, the entire target person image 96 appears at a position where the target person can be visually recognized including the facial expression of the target person.

However, in the captured image 46B2 of the second frame and the captured image 46B3 of the third frame, the target person in the target person image 96 is blocked to a level in which most of the region including the face of the target person cannot be visually recognized due to a person image showing a person other than the target person. In a case where the physical camera motion picture shown in FIG. 6 is displayed on the display 78 of the user device 14 as a reference physical camera motion picture, it is difficult for the user 18 to ascertain the whole aspect of the target person image 96 from at least the captured images 46B2 and 46B3 of the second and third frames. In particular, in a case where the user 18 wants to observe the facial expression of the target person, the facial expression of the target person cannot be observed from at least the captured images 46B2 and 46B3 of the second and third frames. As described above, in the example shown in FIG. 6, it is not possible to continuously provide the user 18 with an image from which the target person can be observed.

Figure 7:
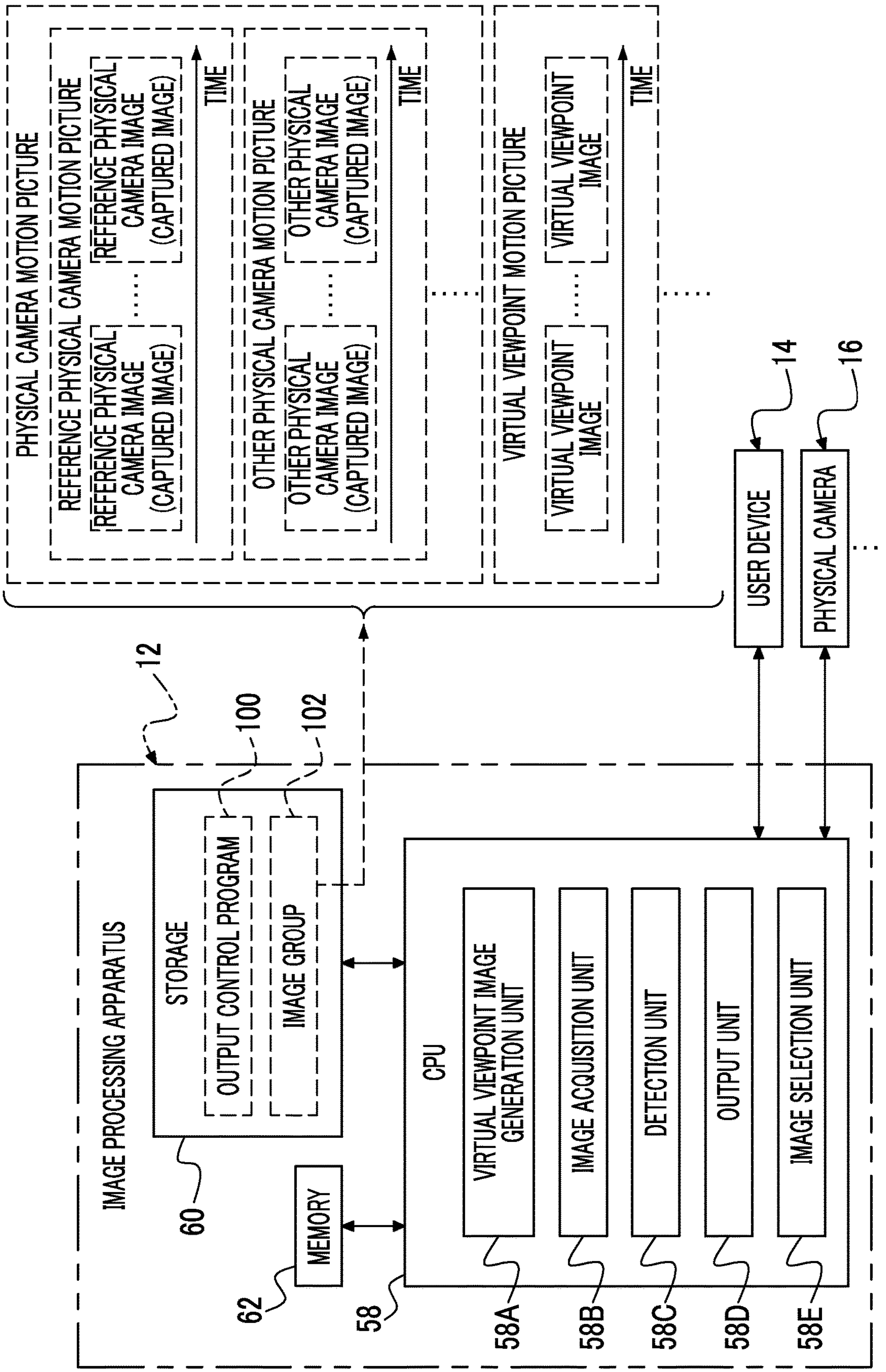
FIG. 7 is a block diagram showing an example of a main function of the image processing apparatus according to the first embodiment.

In view of such circumstances, as shown in FIG. 7 as an example, in the image processing apparatus 12, an output control program 100 is stored in the storage 60. The CPU 58 executes an output control process (FIGS. 14A and 14B) that will be described later according to the output control program 100.

The CPU 58 reads the output control program 100 from the storage 60 and executes the output control program 100 on the memory 62 to operate as a virtual viewpoint image generation unit 58A, an image acquisition unit 58B, a detection unit 58C, an output unit 58D, and an image selection unit 58E.

An image group 102 is stored in the storage 60. The image group 102 includes a physical camera motion picture and a virtual viewpoint motion picture. The physical camera motion picture is roughly classified into a reference physical camera motion picture and another physical camera motion picture obtained by being captured by the physical camera 16 (hereinafter, also referred to as "another physical camera") other than the reference physical camera. In the first embodiment, there are a plurality of other physical cameras. The reference physical camera motion picture includes a plurality of captured images 46B obtained by being captured by the reference physical camera as reference physical camera images in a time series. The other physical camera motion picture includes a plurality of captured images 46B obtained by being captured by the other physical cameras as other physical camera images in a time series.

The virtual viewpoint motion picture is obtained by being captured by the virtual camera 42 (refer to FIGS. 2 and 3) at a specific frame rate. As an example, as shown in FIG. 7, the virtual viewpoint motion picture is a multi-frame image consisting of a plurality of frames obtained according to a specific frame rate. That is, the virtual viewpoint motion picture is configured by arranging a plurality of virtual viewpoint images 46C obtained at each timing defined at a specific frame rate in a time series. In the first embodiment, as described above, a plurality of virtual cameras 42 exist, and a virtual viewpoint motion picture is obtained by each virtual camera 42 and stored in the storage 60.

In the following description, for convenience of the description, a camera image obtained by being captured by a camera other than the reference physical camera will be referred to as "another camera image". That is, the other camera image is a general term for the other physical camera image and the virtual viewpoint image.

In the first embodiment, the detection unit 58C performs a detection process. The detection process is a process of detecting the target person image 96 from each of a plurality of camera images obtained by being captured by a plurality of cameras having different positions. In the detection process, the target person image 96 is detected by detecting a face image showing the face of the target person. Examples of the detection process include a first detection process (refer to FIG. 11) that will be described later and a second detection process (refer to FIG. 12) that will be described later.

In the first embodiment, the output unit 58D outputs a reference physical camera image among a plurality of camera images. In a case where a state transitions from a detection state in which the target person image 96 is detected from the reference physical camera image through the detection process to a non-detection state in which the target person image 96 is not detected from the reference physical camera image through the detection process, the output unit 58D outputs the other camera image from which the target person image 96 is detected through the detection process among the plurality of camera images. For example, the output unit 58D switches from output of the reference physical camera image to output of the other camera image in a case where a state transitions from the detection state to the non-detection state under a situation in which the reference physical camera image is being output.

Here, the transition from the detection state to the non-detection state means that a reference physical camera image to be output by the output unit 58D switches from a reference physical camera image from which the target person is captured to a reference physical camera image from which the target person is not captured. In other words, the transition from the detection state to the non-detection state means that the target person is captured between frames that are temporally adjacent to each other among a plurality of reference physical camera images included in the reference physical camera motion picture. This means that the output target by the output unit 58D is switched from the existing frame to the frame in which the target person is not reflected. For example, in a case where the reference physical camera images the same imaging region, a state transitions from a state in which the target person image 96 can be detected to a state in which the target person image 96 is hidden by another person or the like and thus cannot be detected due to movement of an object (for example, a target person or an object around the target person) in the imaging region as in the captured images 46B1 to 46B2 shown in FIG. 6.

In the first embodiment, the camera image is an example of an “image” according to the technique of the present disclosure. The reference physical camera image is an example of a “first image” according to the technique of the present disclosure. The other camera image is an example of a “second image” according to the technique of the present disclosure.

Figure 8:
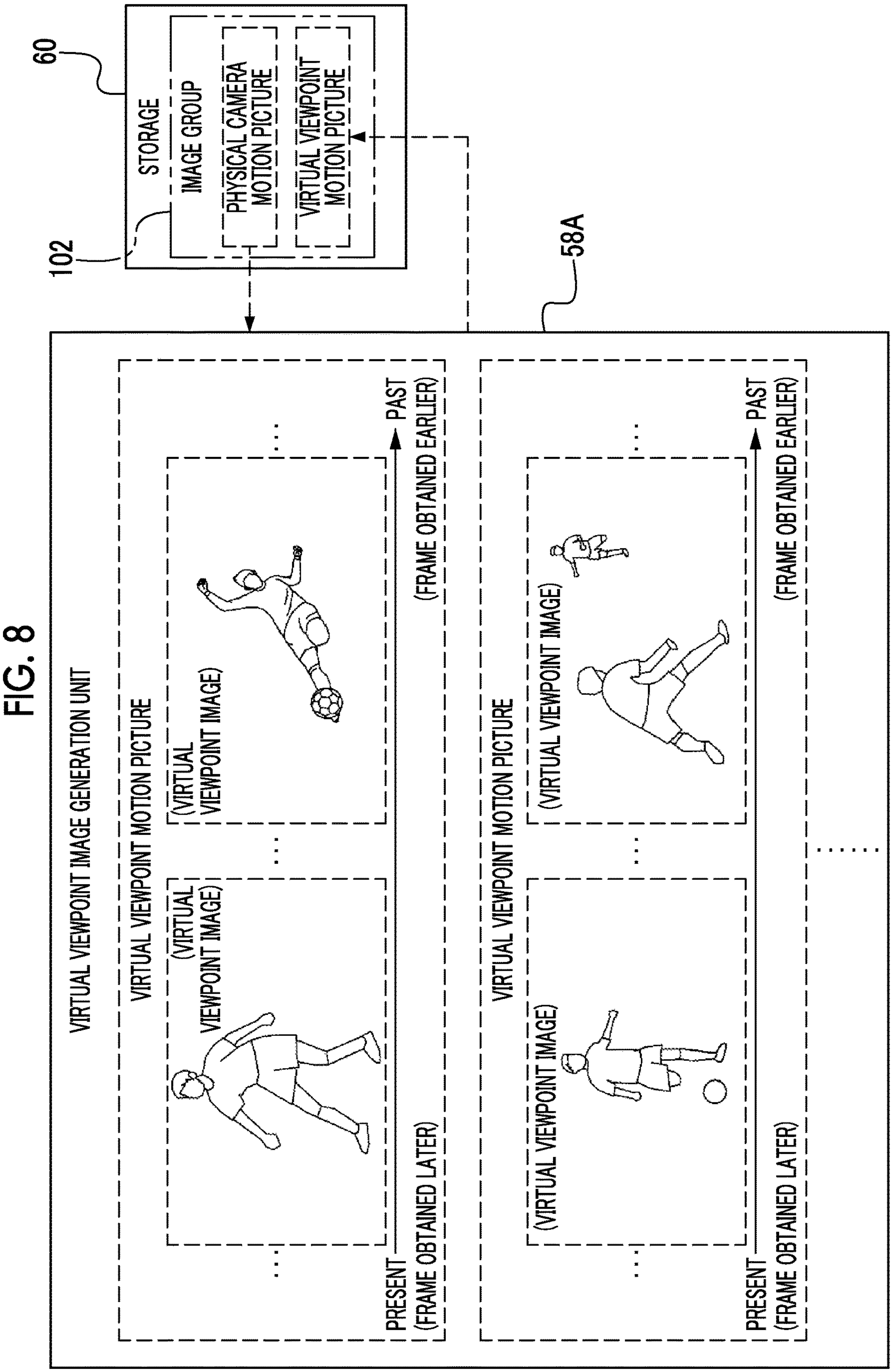
FIG. 8 is a conceptual diagram showing an example of processing details of a virtual viewpoint image generation unit of the image processing apparatus according to the first embodiment.

In the present embodiment, the virtual viewpoint image generation unit 58A generates a plurality of virtual viewpoint motion pictures by causing each of all the virtual cameras 42 to capture an image. As an example, as shown in FIG. 8, the virtual viewpoint image generation unit 58A acquires a physical camera motion picture from the storage 60. The virtual viewpoint image generation unit 58A generates a virtual viewpoint motion picture according to a virtual camera position, a virtual camera orientation, and an angle of view set at the present time for each virtual camera 42 on the basis of the physical camera motion picture acquired from the storage 60. The virtual viewpoint image generation unit 58A stores the generated virtual viewpoint motion picture in the storage 60 in units of the virtual cameras 42.

Here, the virtual viewpoint motion picture according to the virtual camera position, the virtual camera orientation, and the angle of view that are set at the present time means an image showing a region observed, for example, from the virtual camera position and the virtual camera orientation that are set at the present time at the angle of view that is set at the present time.

Here, a form example in which the virtual viewpoint image generation unit 58A generates a plurality of virtual viewpoint motion pictures by causing each of all virtual cameras 42 to perform imaging is described, but not all virtual viewpoint images are necessarily perform imaging, and some of the virtual cameras 42 do not have to generate virtual viewpoint motion pictures depending on, for example, the performance of a computer.

Figure 9:
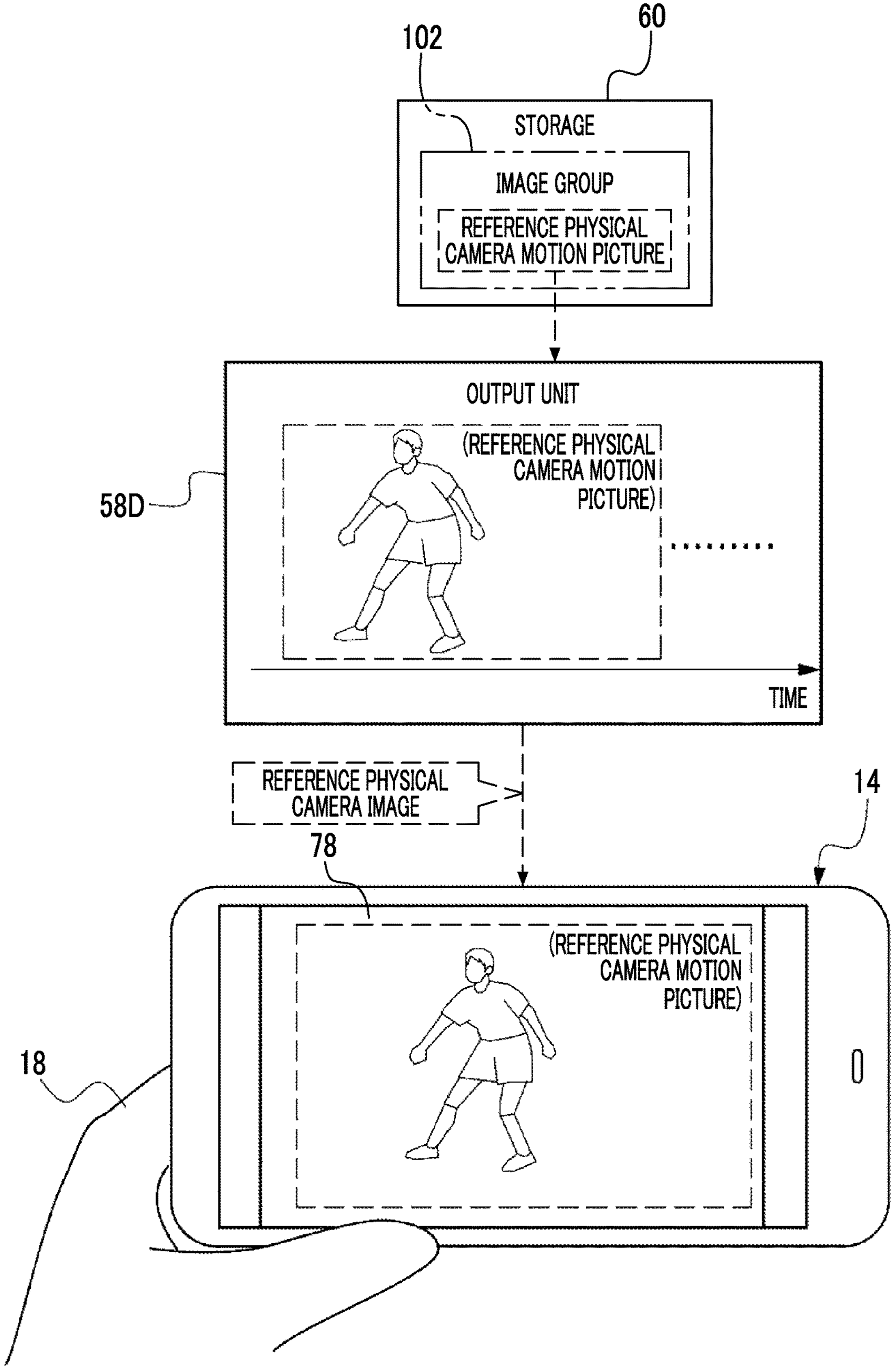
FIG. 9 is a conceptual diagram showing an example of processing details of an output unit of the image processing apparatus according to the first embodiment.

As an example, as shown in FIG. 9, the output unit 58D acquires a reference physical camera motion picture from the storage 60, and outputs the acquired reference physical camera motion picture to the user device 14. Consequently, the reference physical camera motion picture is displayed on the display 78 of the user device 14.

Figure 10:
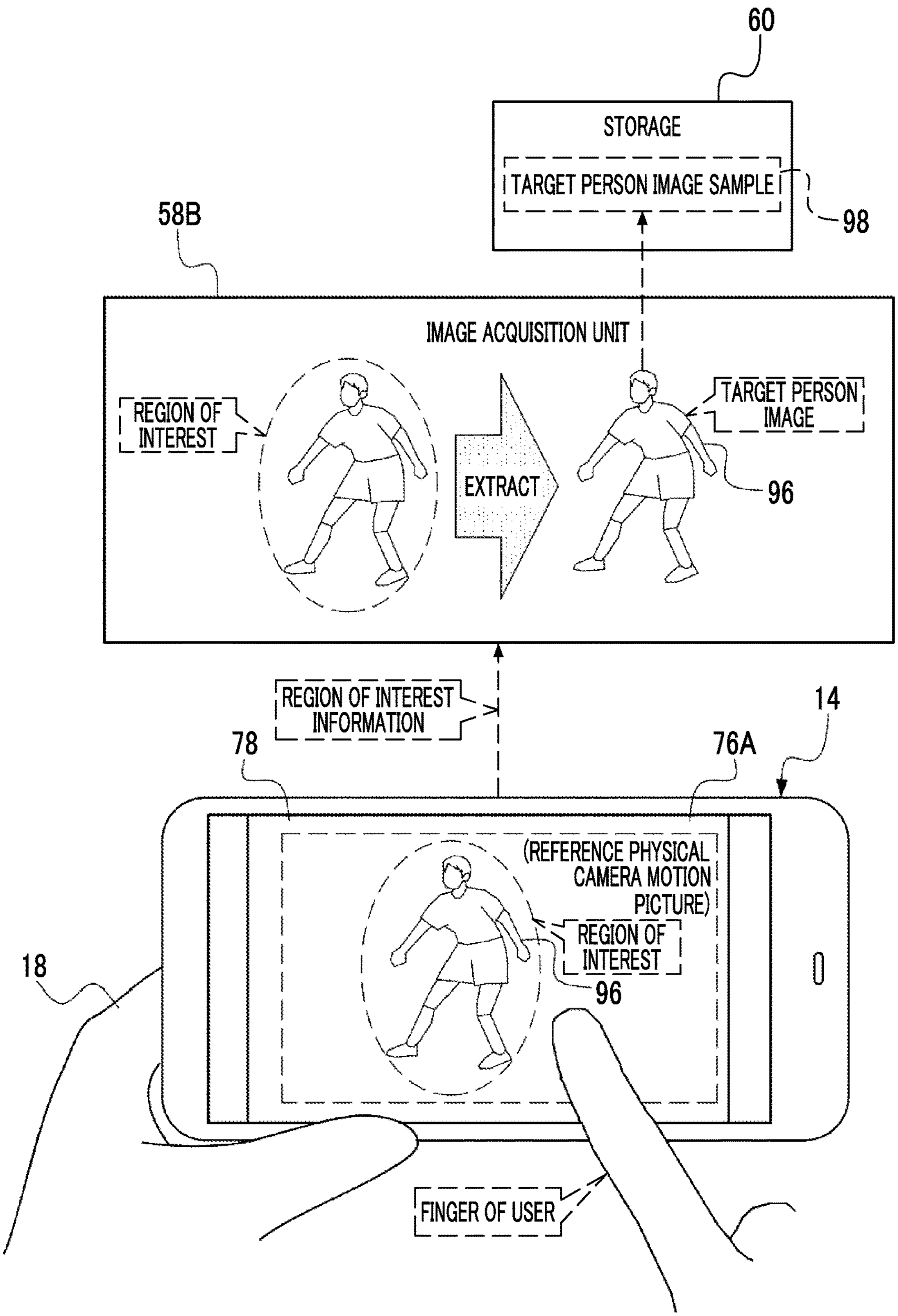
FIG. 10 is a conceptual diagram showing an example of processing details of an image acquisition unit of the image processing apparatus according to the first embodiment.

As an example, as shown in FIG. 10, in a state in which the reference physical camera motion picture is displayed on the display 78 of the user device 14, the user 18 designates a region that is of interest (hereinafter, also referred to as a “region of interest”) with the finger via the touch panel 76A. In the example shown in FIG. 10, the region of interest is a region including the target person image 96 in the reference physical camera motion picture displayed on the display 78.

The user device 14 transmits region of interest information indicating the region of interest in the reference physical camera motion picture to the image acquisition unit 58B. The image acquisition unit 58B receives the region of interest information transmitted from the user device 14. The image acquisition unit 58B performs image analysis (for example, image analysis using a cascade classifier and/or pattern matching) on the received region of interest information, and thus extracts the target person image 96 from the region of interest indicated by the region of interest information. The image acquisition unit 58B stores the target person image 96 extracted from the region of interest as the target person image sample 98 in the storage 60.

Figure 11:
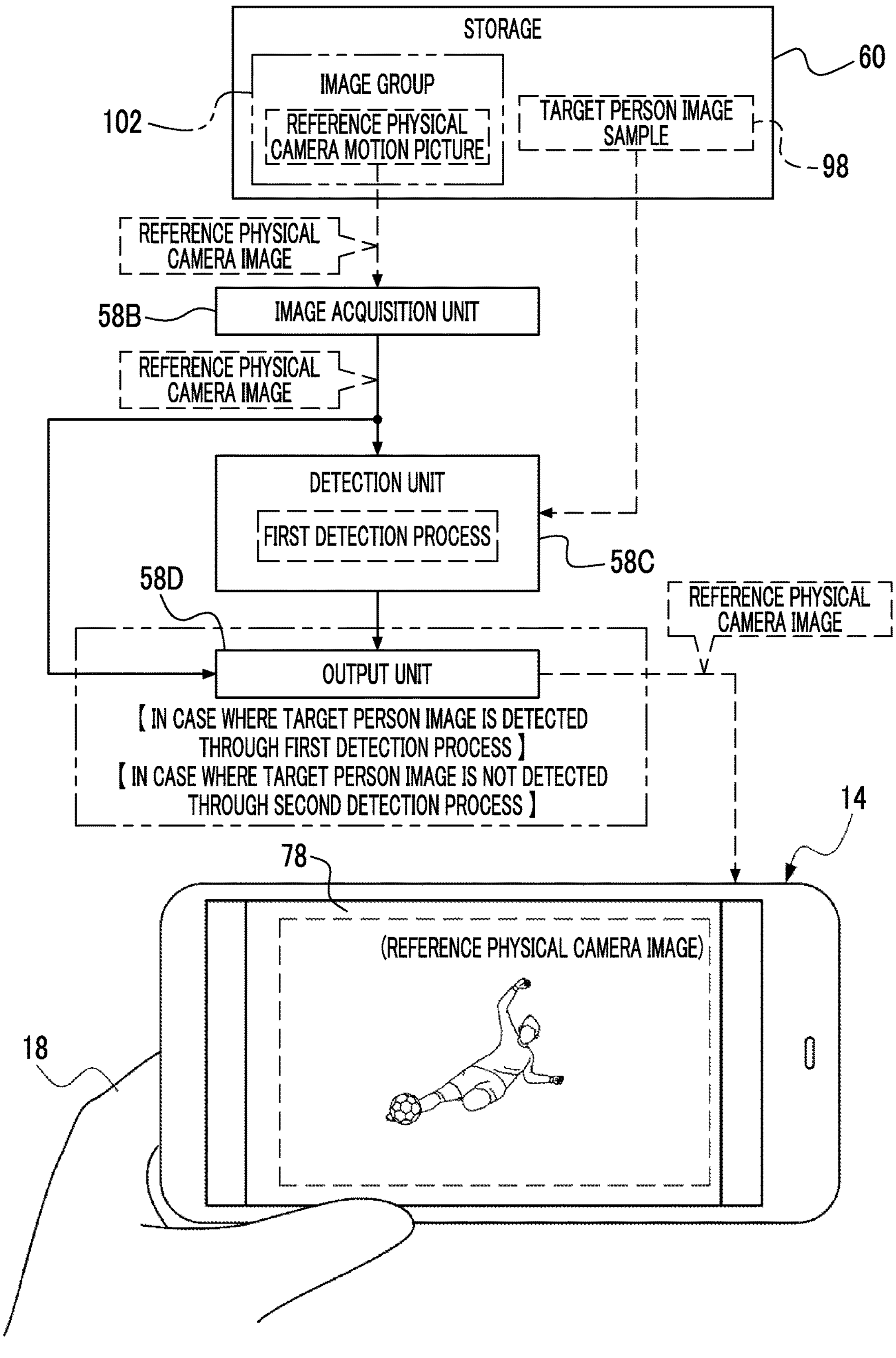
FIG. 11 is a conceptual diagram showing an example of an image acquisition unit, a detection unit, and an output unit of the image processing apparatus according to the first embodiment.

As an example, as shown in FIG. 11, the image acquisition unit 58B acquires a reference physical camera image from the reference physical camera motion pictures in the storage 60 in units of one frame. The detection unit 58C executes the first detection process. The first detection process is a process of detecting the target person image 96 from the reference physical camera image by performing image analysis on the reference physical camera image acquired by the image acquisition unit 58B by using a target person image sample 98 in the storage 60. Examples of the image analysis include image analysis using a cascade classifier and/or pattern matching.

The target person image 96 detected through the first detection process also includes an image showing a target person having an aspect different from that of the target person shown by the target person image 96 shown in FIG. 10. That is, the detection unit 58C determines whether or not the target person shown by the target person image sample

98 is captured in the reference physical camera image by executing the first detection process.

In a case where the target person image 96 is detected through the first detection process, the output unit 58D outputs the reference physical camera image that is a processing target in the first detection process, that is, the reference physical camera image including the target person image 96 to the user device 14. Consequently, the reference physical camera image including the target person image 96 is displayed on the display 78 of the user device 14.

Figure 12:
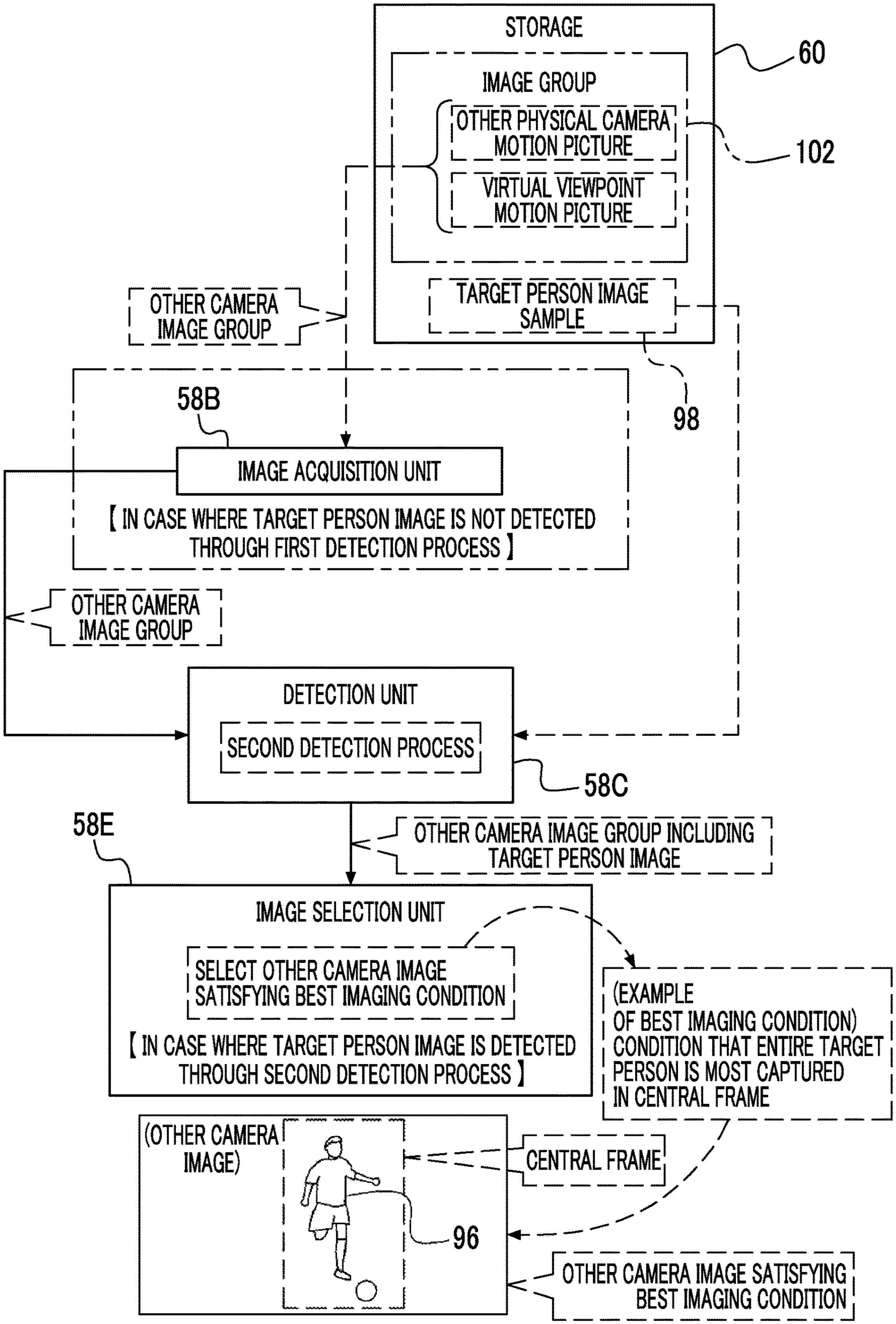
FIG. 12 is a conceptual diagram showing an example of an image acquisition unit, a detection unit, and an image selection unit of the image processing apparatus according to the first embodiment.

As an example, as shown in FIG. 12, in a case where the target person image 96 is not detected through the first detection process, the image acquisition unit 58B acquires a plurality of other camera images having the same imaging time as that of the reference physical camera image that is a processing target in the first detection process, from the storage 60. In the following description, for convenience of the description, a plurality of other camera images will also be referred to as "other camera image group".

The detection unit 58C executes the second detection process on each of the other camera images included in the other camera image group acquired by the image acquisition unit 58B. The second detection process differs from the first detection process in that another camera image is used as a processing target instead of the reference physical camera image.

In a case where there are a plurality of other camera images from which the target person image 96 is detected through the second detection process, the image selection unit 58E selects another captured image satisfying the best imaging condition from the other camera image group including the target person image 96 detected through the second detection process. The best imaging condition is a condition that, for example, a position of the target person image 96 in the other camera image is within a predetermined range and a size of the target person image 96 in the other camera image is equal to or larger than a predetermined size in the other camera image group. In the first embodiment, as an example of the best imaging condition, a condition that the entire target person shown by the target person image 96 is most captured in a predetermined central frame at a central portion of the frame is used. A shape and/or a size of the central frame may be fixed or may be changed according to a given instruction and/or condition. A frame is not limited to the central frame, and may be provided at another position.

Here, the condition that the entire target person is captured in the central frame is exemplified, but this is only an example, and a condition that a region of a predetermined ratio (for example, 80%) or more including the face of the target person in the central frame is captured may be used. The predetermined ratio may be a fixed value or a variable value that is changed according to a given instruction and/or condition.

Figure 13:
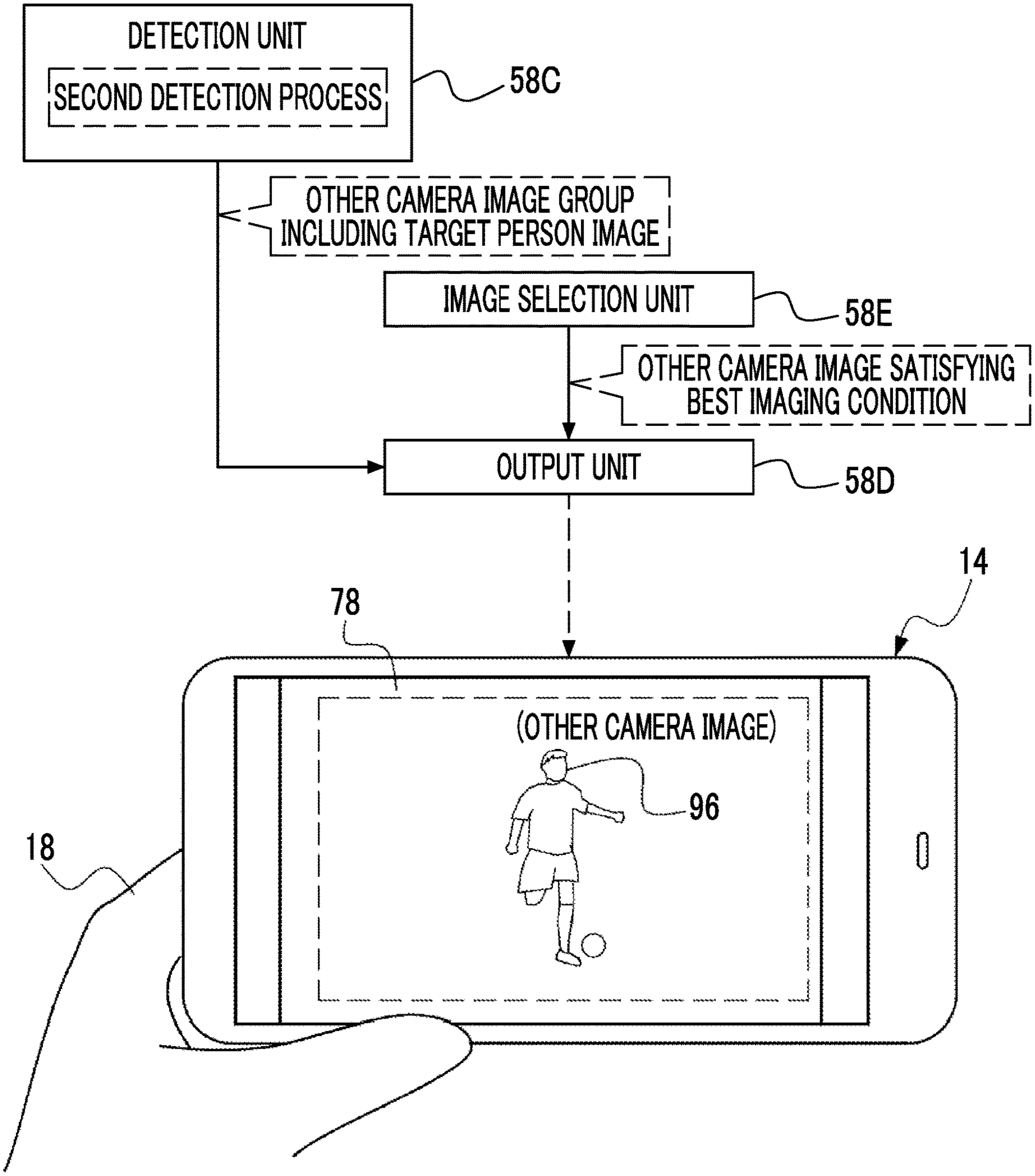
FIG. 13 is a conceptual diagram showing an example of a detection unit, an image selection unit, and an output unit of the image processing apparatus according to the first embodiment.

As an example, as shown in FIG. 13, the image selection unit 58E selects another camera image satisfying the best imaging condition from the other camera image group including the target person image 96 detected through the second detection process, and outputs the selected other camera image to the output unit 58D. In a case where there is one frame of the other camera image from which the target person image 96 is detected through the second detection process, the detection unit 58C outputs the other camera image from which the target person image 96 is detected to the output unit 58D.

The output unit 58D outputs the other camera image input from the detection unit 58C or the image selection unit 58E to the user device 14. Consequently, the other camera image including the target person image 96 is displayed on the display 78 of the user device 14.

On the other hand, in a case where the target person image 96 is not detected through the second detection process, as shown in FIG. 11 as an example, the output unit 58D outputs the reference physical camera image that is a processing target in the first detection process to the user device 14. In this case, the reference physical camera image from which the target person image 96 is not detected through the first detection process is output to the user device 14. Consequently, the display 78 of the user device 14 displays the reference physical camera image from which the target person image 96 is not detected through the first detection process.

Next, an operation of the image processing system 10 will be described with reference to FIGS. 14A and 14B.

Figure 14A:
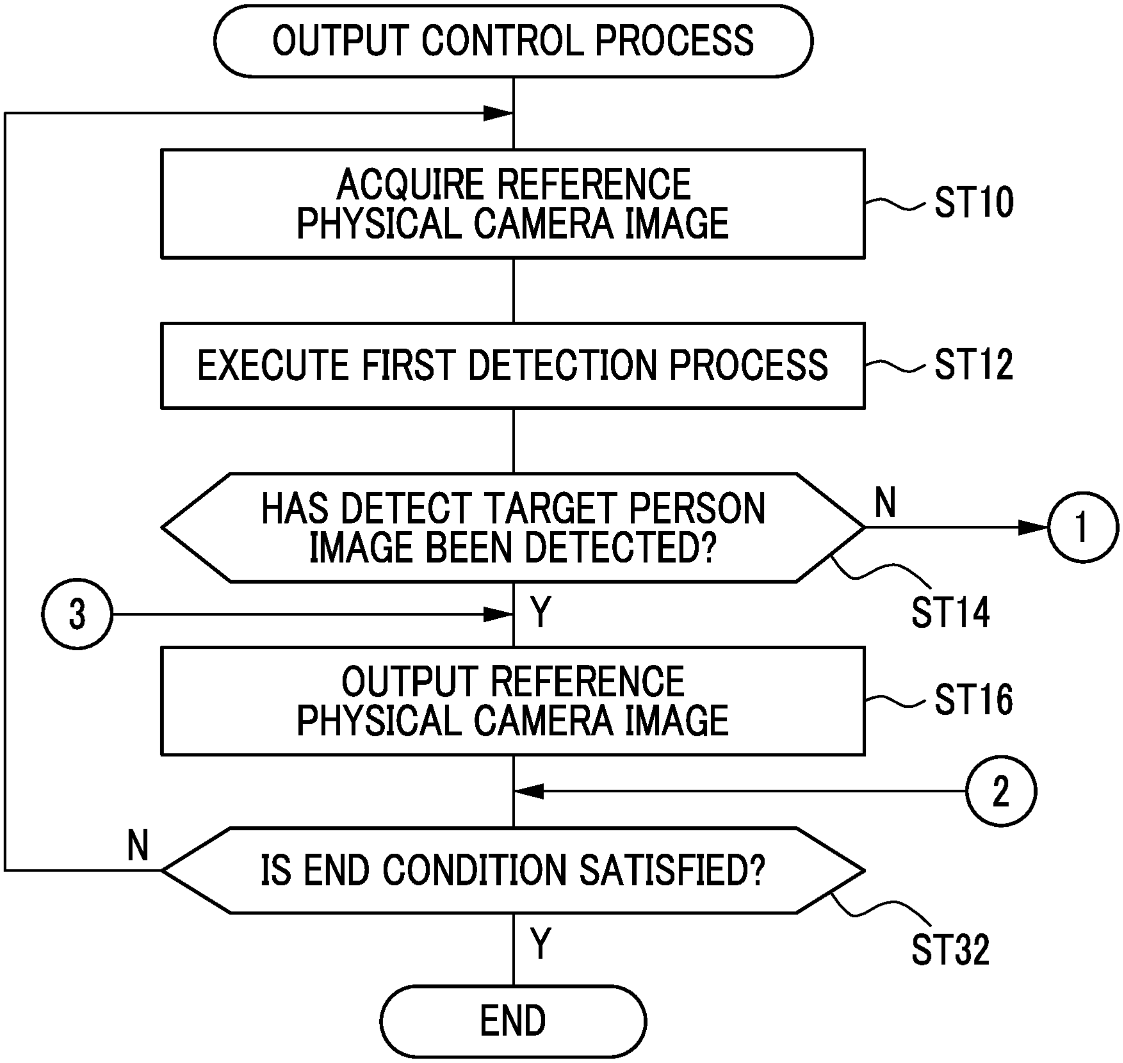
FIG. 14A is a flowchart showing an example of a flow of an output control process according to the first and second embodiments.
Figure 14B:
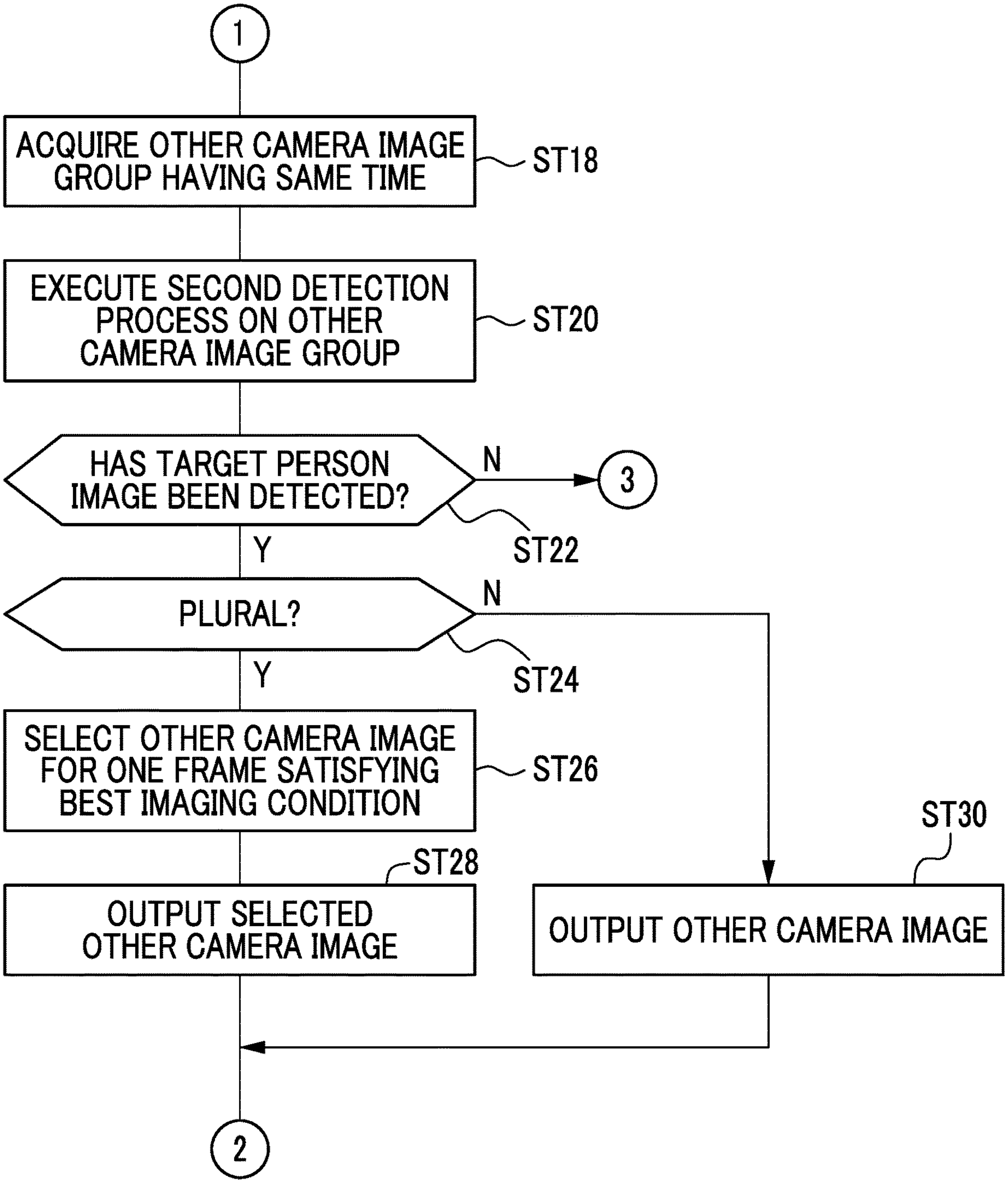
FIG. 14B is a flowchart showing an example of a flow of an output control process according to the first embodiment, and is a continuation of the flowchart of FIG. 14A.

FIGS. 14A and 14B show an example of a flow of an output control process executed by the CPU 58. The flow of the output control process shown in FIGS. 14A and 14B is an example of an "image processing method" according to the technique of the present disclosure. The following description of the output control process is based on the premise that the image group 102 is already stored in the storage 60 for convenience of description. The following description of the output control process is based on the premise that the target person image sample 98 is already stored in the storage 60 for convenience of description.

In the output control process shown in FIG. 14A, first, in step ST10, the image acquisition unit 58B acquires an unprocessed reference physical camera image for one frame from the reference physical camera motion picture in the storage 60, and then the output control process proceeds to step ST12. Here, the unprocessed reference physical camera image refers to a reference physical camera image that has not yet been subject to the process in step ST12.

In step ST12, the detection unit 58C executes the first detection process on the reference physical camera image acquired in step ST10, and then the output control process proceeds to step ST14.

In step ST14, the detection unit 58C determines whether or not the target person image 96 has been detected from the reference physical camera image through the first detection process. In step ST14, in a case where the target person image 96 is not detected from the reference physical camera image through the first detection process, a determination result is negative, and the output control process proceeds to step ST18 shown in FIG. 14B. In a case where the target person image 96 has been detected from the reference physical camera image through the first detection process in step ST14, a determination result is positive, and the output control process proceeds to step ST16.

In step ST16, the output unit 58D outputs the reference physical camera image that is a processing target in the first detection process in step ST14 to the user device 14, and then the output control process proceeds to step ST32. In a case where the reference physical camera image is output to the user device 14 by executing the process in step ST16, the reference physical camera image is displayed on the display 78 of the user device 14 (refer to FIG. 11).

In step ST18 shown in FIG. 14B, the image acquisition unit 58B acquires the other camera image group having the same imaging time as that of the reference physical camera image that is a processing target in the first detection process from the storage 60, and then the output control process proceeds to step ST20.

In step ST20, the detection unit 58C executes the second detection process on the other camera image group acquired in step ST18, and then the output control process proceeds to step ST22.

In step ST22, the detection unit 58C determines whether or not the target person image 96 has been detected from the other camera image group acquired in step ST18. In step ST22, in a case where the target person image 96 is not detected from the other camera image group acquired in step ST18, a determination result is negative, and the output control process proceeds to step ST16 shown in FIG. 14A. In step ST22, in a case where the target person image 96 is detected from the other camera image group acquired in step ST18, a determination result is positive, and the output control process proceeds to step ST24.

In step ST24, the detection unit 58C determines whether or not there are a plurality of other camera images from which the target person image 96 is detected through the second detection process. In step ST24, in a case where there are a plurality of other camera images from which the target person image 96 is detected through the second detection process, a determination result is positive, and the output control process proceeds to step ST26. In step ST24, in a case where the other camera image from which the target person image 96 is detected through the second detection process is one frame, a determination result is negative, and the output control process proceeds to step ST30.

In step ST26, the image selection unit 58E selects the other camera image satisfying the best imaging condition (refer to FIG. 12) from the other camera image group from which the target person image 96 is detected through the second detection process, and then the outputs control process proceeds to step ST28.

In step ST28, the output unit 58D outputs the other camera image selected in step ST26 to the user device 14, and then the output control process proceeds to step ST32 shown in FIG. 14A. In a case where the other camera image is output to the user device 14 by executing the process in step ST28, the other camera image is displayed on the display 78 of the user device 14 (refer to FIG. 13).

In step ST30, the output unit 58D outputs the other camera image from which the target person image 96 is detected through the second detection process to the user device 14, and then the output control process proceeds to step ST32 shown in FIG. 14A. In a case where the other camera image is output to the user device 14 by executing the process in step ST30, the other camera image is displayed on the display 78 of the user device 14 (refer to FIG. 13).

In step ST32 shown in FIG. 14A, the output unit 58D determines whether or not a condition for ending the output control process (hereinafter, also referred to as an "output control process end condition") is satisfied. As an example of the output control process end condition, there is a condition that the image processing apparatus 12 is instructed to end the output control process. The instruction for ending the output control process is received by, for example, the reception device 52 or 76. In a case where the output control process end condition is not satisfied in step ST32, a determination result is negative, and the output control process proceeds to step ST10. In a case where the output control process end condition is satisfied in step ST32, a determination result is positive, and the output control process is ended.

By executing the output control process as described above, the reference physical camera image from which the target person image 96 is not blocked by obstacles is output to the user device 14 by the output unit 58D. In a case where the target person image 96 is blocked by an obstacle in the reference physical camera image, the virtual viewpoint image 46C in which the entire target person image 96 is visually recognizable is output to the user device 14 by the output unit 58D instead of the reference physical camera image from which the target person image 96 is blocked by the obstacle. Consequently, it is possible to continuously provide the user 18 with a camera image from which a target person can be observed.

Figure 15:
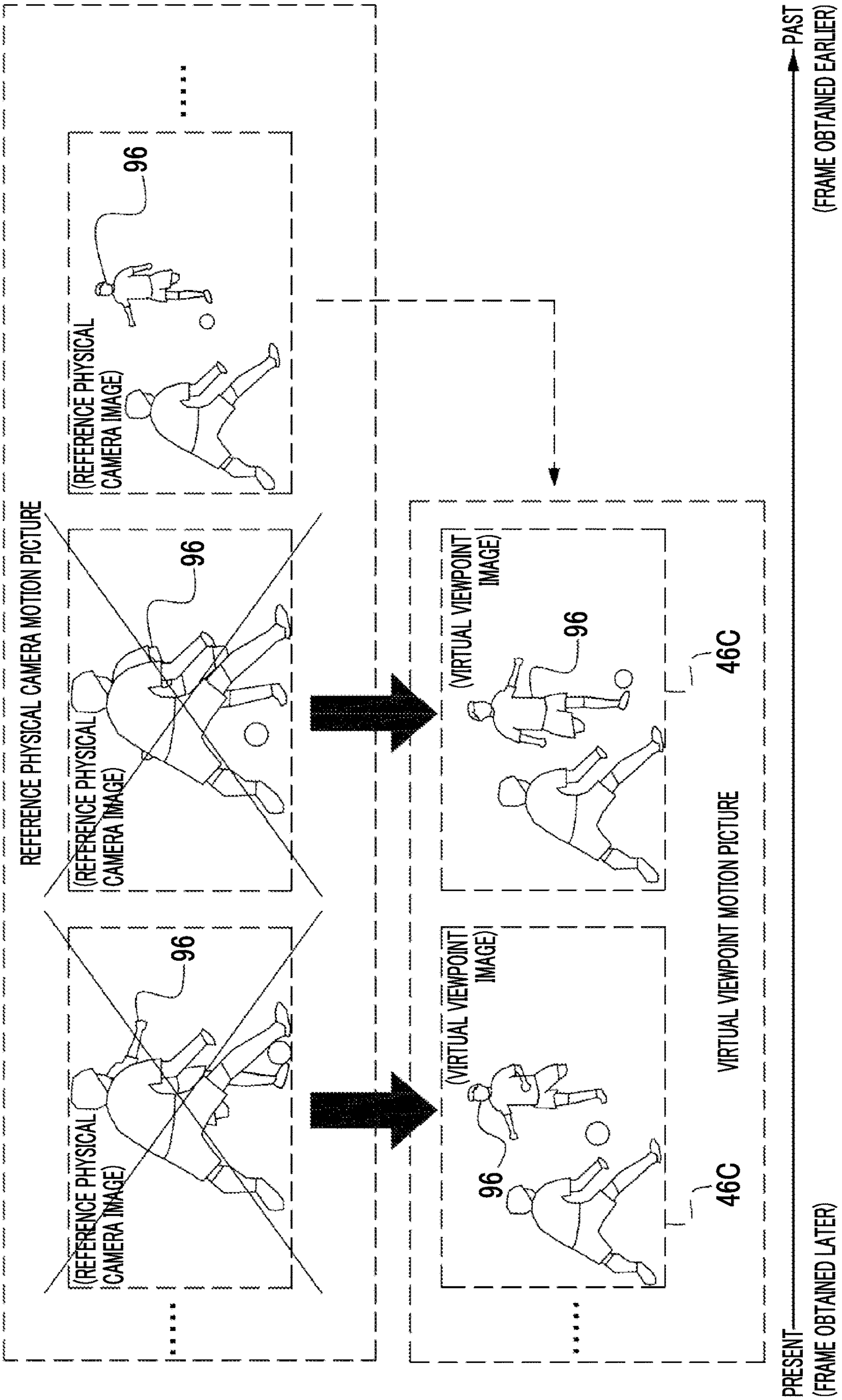
FIG. 15 is a conceptual diagram showing an example of a mode in which output of a reference physical camera image is switched to output of a virtual viewpoint image.

In a case where the output control process is executed, as shown in FIG. 15 as an example, output of the reference physical camera motion picture is switched to output of the virtual viewpoint motion picture in a case where a state transitions from a state in which the target person image 96 is not blocked by an obstacle in the reference physical camera image to a state in which the target person image 96 is blocked by the obstacle in the reference physical camera image under a situation in which the reference physical camera moving is being output. Consequently, it is possible to continuously provide the user 18 with a camera image from which a target person can be observed.

Figure 16:
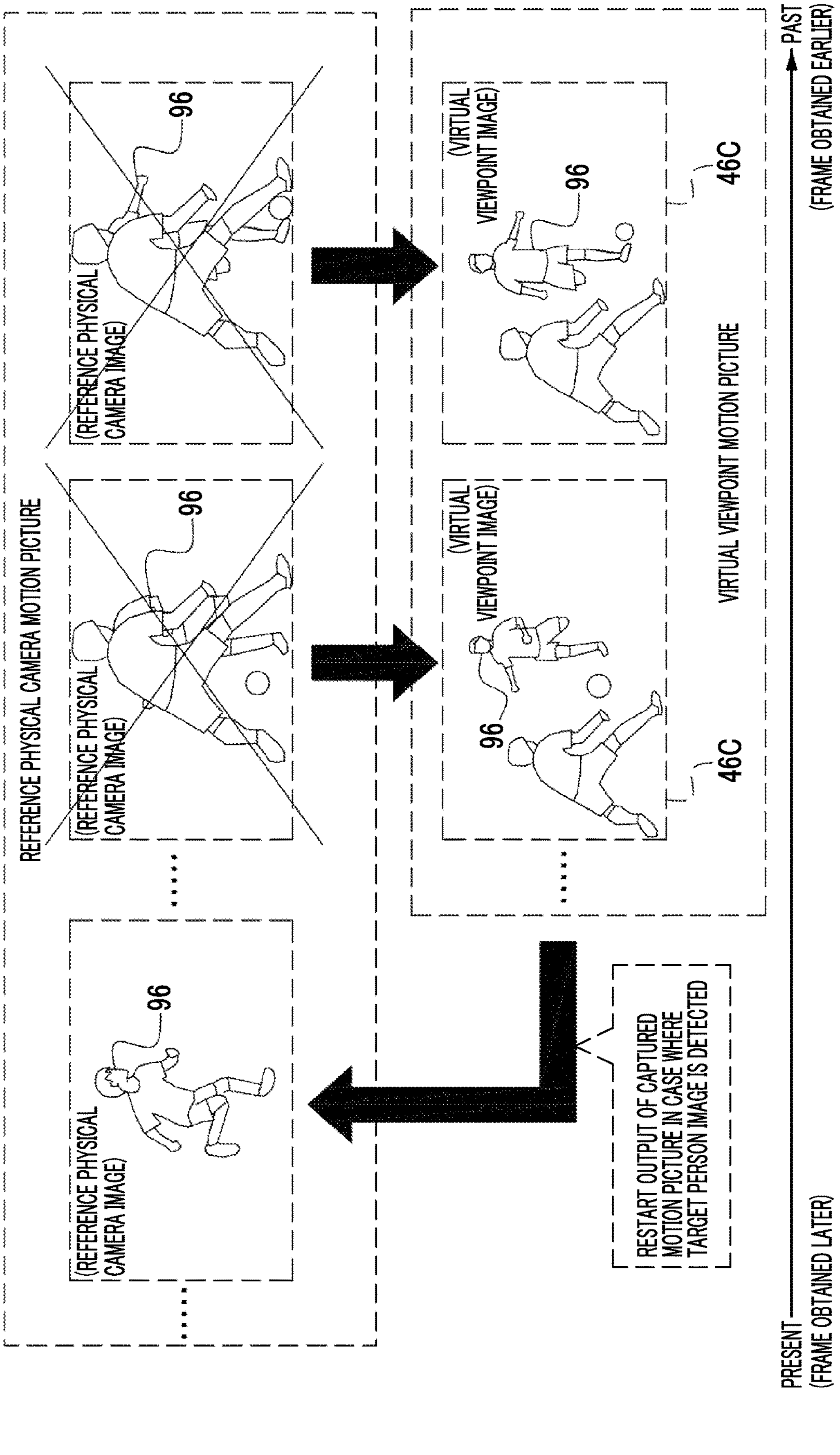
FIG. 16 is a conceptual diagram showing an example of a mode in which output of a virtual viewpoint image is switched to output of a reference physical camera image.

In a case where the output control process is executed, as shown in FIGS. 15 and 16 as an example, the output unit 58D switches from output of the reference physical camera motion picture to output of the virtual viewpoint motion picture at a timing of reaching the state in which the target person image 96 is blocked by the obstacle in the reference physical camera image. The output unit 58D ends the output of the virtual viewpoint motion picture at a timing after the timing of reaching the state in which the target person image 96 is blocked by the obstacle in the reference physical camera image. That is, the output of the virtual viewpoint motion picture is ended at a timing after the timing of reaching the state in which the target person image 96 is not detected through the first detection process. Consequently, it is possible to provide the user 18 with a virtual viewpoint motion picture from which the target person can be observed after reaching the state in which the target person image 96 is not detected through the first detection process.

In a case where the output control process is executed, as shown in FIG. 16 as an example, output unit 58D restarts the output of the reference physical camera motion picture on condition that the state returns to the state in which the target person image 96 is not blocked by the obstacle in the reference physical camera image from the state in which the target person image 96 is blocked by the obstacle in the reference physical camera image. That is, the output of the virtual viewpoint motion picture is switched to the output of the reference physical camera motion picture on condition that a state returns from a state in which the target person image 96 is not detected from the reference physical camera image through the first detection process to a state in which the target person image 96 is detected from the reference physical camera image through the first detection process. Consequently, it is possible to reduce the trouble of switching from the output of the virtual viewpoint motion picture to the output of the reference physical camera motion picture compared with a case where the output of the virtual viewpoint motion picture is continued regardless of returning to the state in which the target person image 96 is not blocked by the obstacle in the reference physical camera image from the state in which the target person image 96 is blocked by the obstacle in the reference physical camera image.

In a case where the output control process is executed, the other camera image satisfying the best imaging condition is selected by the image selection unit 58E (refer to step ST26 shown in FIG. 14B), and the selected other camera image is output to the user device 14 by the output unit 58D (refer to step ST28 shown in FIG. 14B). Consequently, the user 18 can easily find the target person image 96 in the other camera image compared with a case where the other camera image from which the target person image 96 is detected is simply output without considering the position and size of the target person image 96 in the other camera image.

In the output control process, the target person image 96 is detected by detecting a face image showing the face of the target person through the first detection process and the second detection process. Therefore, the target person image 96 can be detected with higher accuracy than in a case where the face image is not detected.

In a case where the output control process is executed, a multi-frame image consisting of a plurality of frames is output to the user device 14 by the output unit 58D. Examples of the multi-frame image include a reference physical camera motion picture and a virtual viewpoint motion picture as shown in FIGS. 15 and 16. Therefore, according to the present configuration, the user 18 who is viewing the reference physical camera motion picture and the virtual viewpoint motion picture can continuously observe the target person.

In the image processing system 10, the imaging region is imaged by the plurality of physical cameras 16, and the imaging region is also imaged by the plurality of virtual cameras 42. Therefore, compared with a case where the imaging region is imaged only by the physical camera 16 without using the virtual camera 42, the user 18 can observe the target person from various positions and directions. Here, the plurality of physical cameras 16 and the plurality of virtual cameras 42 are exemplified, but the technique of the present disclosure is not limited to this, and the number of physical cameras 16 may be one, or the number of virtual cameras 42 may be one.

In the first embodiment, a form example in which the output of the virtual viewpoint motion picture is ended at a timing after the timing of reaching a state in which the target person image 96 is not detected through the first detection process, but the technique of the present disclosure is not limited to this. For example, not only the output of the virtual viewpoint motion picture may be ended at a timing after the timing of reaching the state in which the target person image 96 is not detected through the first detection process, but also the output unit 58D may start output of the virtual viewpoint motion picture from a timing before the timing of reaching the state in which the target person image 96 is not detected through the first detection process. For example, in a case of a motion picture that has already been captured, the timing of reaching the state in which the target person image 96 is not detected in the reference physical camera motion picture can be recognized, and thus it is possible to output the virtual viewpoint motion picture before the timing of reaching the state in which the target person image 96 is not detected in the reference physical camera motion picture. Consequently, it is possible to provide the user 18 with the virtual viewpoint motion picture from which the target person can be observed before reaching the state in which the target person image 96 is not detected through the first detection process.

In the first embodiment, a form example has been in which, in a case where there are a plurality of other camera images from which the target person image 96 is detected through the second detection process, the other camera image satisfying the best imaging condition is output, but other camera images satisfying the best imaging condition do not necessarily have to be output. For example, in a case where any other camera image from which the target person image 96 is detected is output, the user 18 can visually recognize the target person image 96.

In the first embodiment, as an example of the best imaging condition, the condition that a position of the target person image 96 in the other camera image is within a predetermined range and a size of the target person image 96 in the other camera image is equal to or larger than a predetermined size in the other camera image group has been described, but the technique of the present disclosure is not limited to this. For example, the best imaging condition may be a condition that a position of the target person image 96 in the other camera image is within a predetermined range in the other camera image group, or a condition that a size of the target person image 96 in the other camera image is equal to or larger than a predetermined size.

Figure 17:
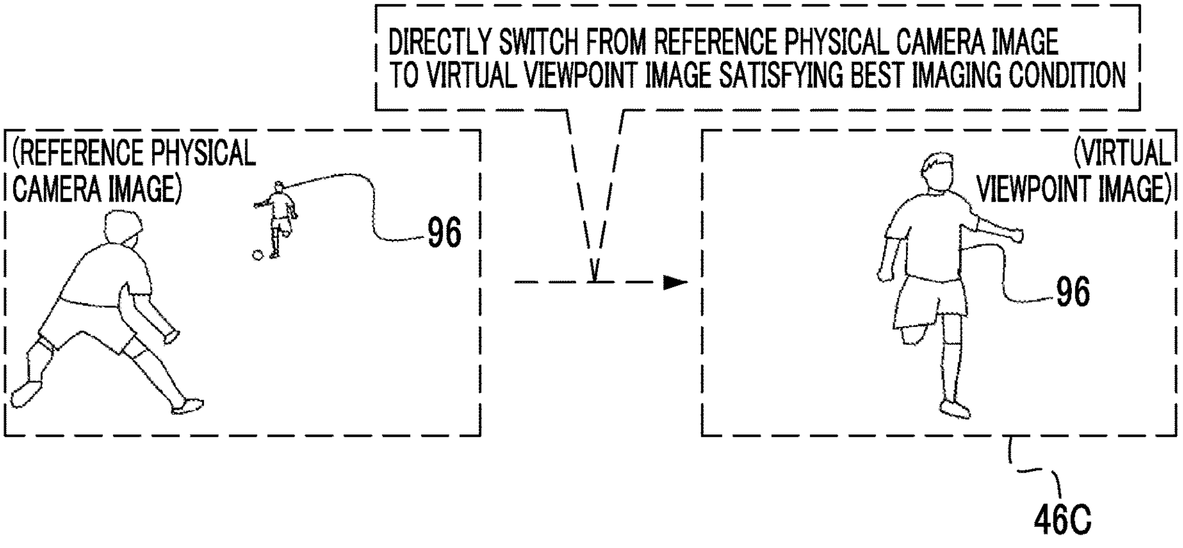
FIG. 17 is a conceptual diagram showing an example of a mode in which output of a reference physical camera image is directly switched to output of a virtual viewpoint image satisfying the best imaging condition.

In the first embodiment, as shown in FIG. 17, as an example, a form example in which output of the reference physical camera image is directly switched to output of the virtual viewpoint image 46C satisfying the best imaging condition has been described, but the technique of the present disclosure is not limited to this. In a case where the output of the reference physical camera image is directly switched to the output of the virtual viewpoint image 46C satisfying the best imaging condition, it may be difficult to ascertain a position of the target person before and after switching of the output.

Figure 18:
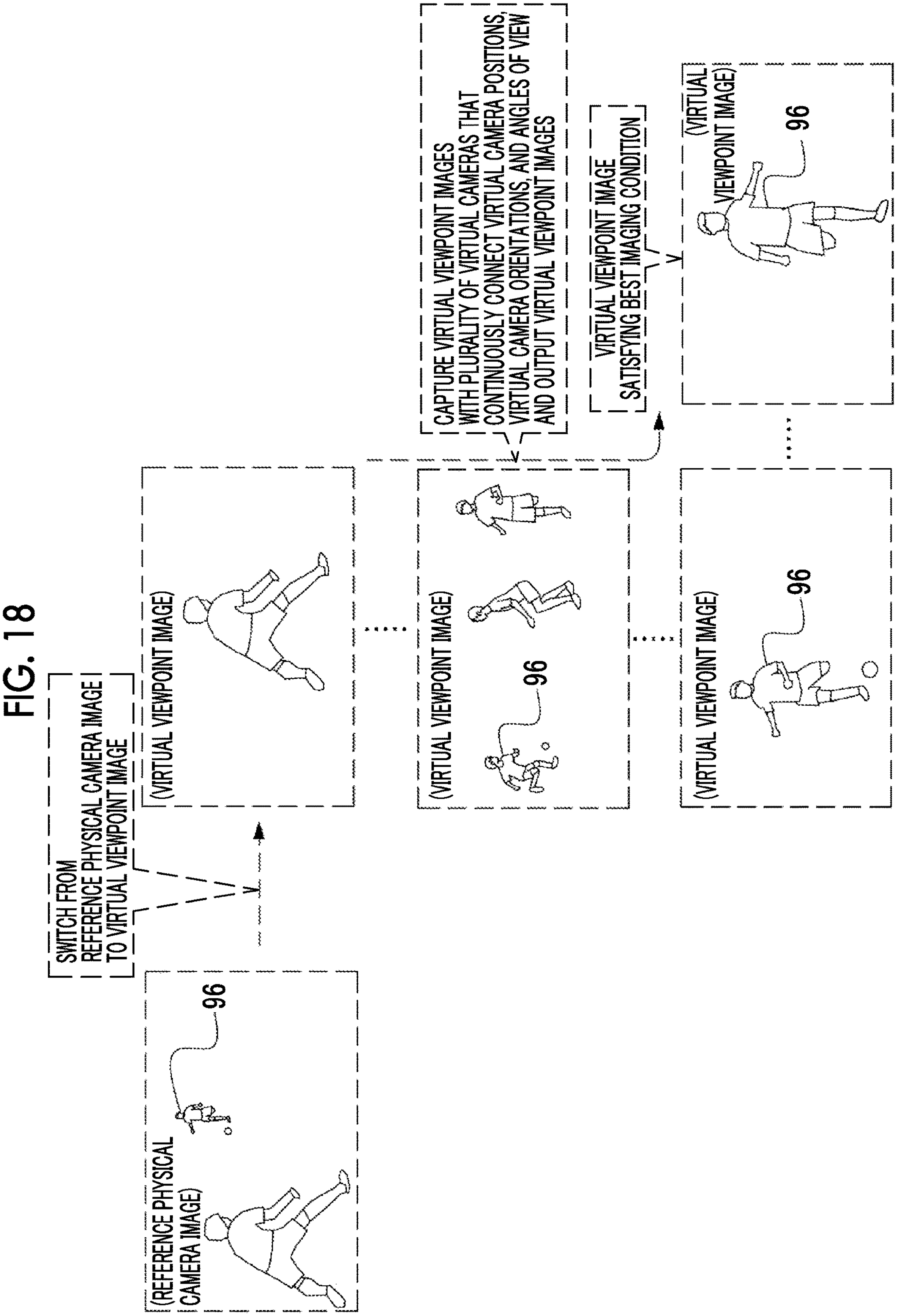
FIG. 18 is a conceptual diagram showing an example of a mode of sequentially outputting a plurality of virtual viewpoint images obtained by a plurality of virtual cameras that continuously connect a virtual camera position, a virtual camera orientation, and an angle of view in the process of switching from the output of a reference physical camera image to the output of a virtual viewpoint image satisfying the best imaging condition.

Therefore, as shown in FIG. 18 as an example, the output unit 58D outputs camera images obtained by being captured by a plurality of cameras of which positions, orientations, and angles of view are continuously connected during a period of switching from the output of the reference physical camera image to the output of the virtual viewpoint image 46C satisfying the best imaging condition. The camera images obtained by being captured by a plurality of cameras of which positions, orientations, and angles of view are continuously connected are, for example, a plurality of virtual viewpoint images 46C obtained by being captured by a plurality of virtual cameras 42 that continuously connect a virtual camera position, a virtual camera orientation, and an angle of view of the virtual camera 42 used in the imaging for obtaining the virtual viewpoint image 46C satisfying the best imaging condition from an imaging position, an imaging direction, and an angle of view of the reference physical camera. Consequently, it becomes easier for the user 18 to ascertain a position of the target person compared with the case where the output of the reference physical camera image is directly switched to the output of the virtual viewpoint image 46C.

In the first embodiment, a form example has been described in which, in a case where the target person image 96 is blocked by an obstacle in the reference physical camera image, the virtual viewpoint image 46C or another physical camera image from which the entire target person image 96 can be visually recognized can be output to the user device 14 by the output unit 58D instead of the reference physical camera image from which the target person image 96 is blocked by the obstacle. For example, in a case where the target person image 96 is blocked by an obstacle in the reference physical camera image, only the virtual viewpoint image 46C in which the entire target person image 96 can be visually recognized may be output instead of the reference physical camera image from which the target person image 96 is blocked by the obstacle. Consequently, in a case where the target person image 96 is not detected through the first detection process, the user 18 can continuously observe the target person by providing the virtual viewpoint motion picture.

It is not necessary to output the virtual viewpoint image 46C or another physical camera image from which the entire target person image 96 can be visually recognized, and for example, the virtual viewpoint image 46C or another physical camera image from which only a specific part such as the face shown by the target person image 96 can be visually recognized may be output. This specific part may be settable according to an instruction given by the user 18. For example, in a case where the face shown by the target person image 96 is set according to an instruction given by the user 18, the virtual viewpoint image 46C or another physical camera image from which the face of the target person can be visually recognized is output. For example, the virtual viewpoint image 46C or another physical camera image from which the target person image 96 can be visually recognized at a ratio larger than a ratio of the target person image 96 that can be visually recognized in the reference physical camera image may be output.

In a case where the virtual viewpoint image 46C is output, the image from which the target person image 96 is detected through the above detection process does not necessarily have to be output. For example, in a case where a three-dimensional position of each object in the imaging region is recognized by triangulation or the like and the target person image 96 is blocked by an obstacle in the reference physical camera image, the virtual viewpoint image 46C showing an aspect observed from a viewpoint position, a direction, and an angle of view at which the target person is estimated to be visible on the basis of a positional relationship among the target person, the obstacle, and other objects may be output. The detection process in the technique of the present disclosure also includes a process based on such estimation.

Figure 19:
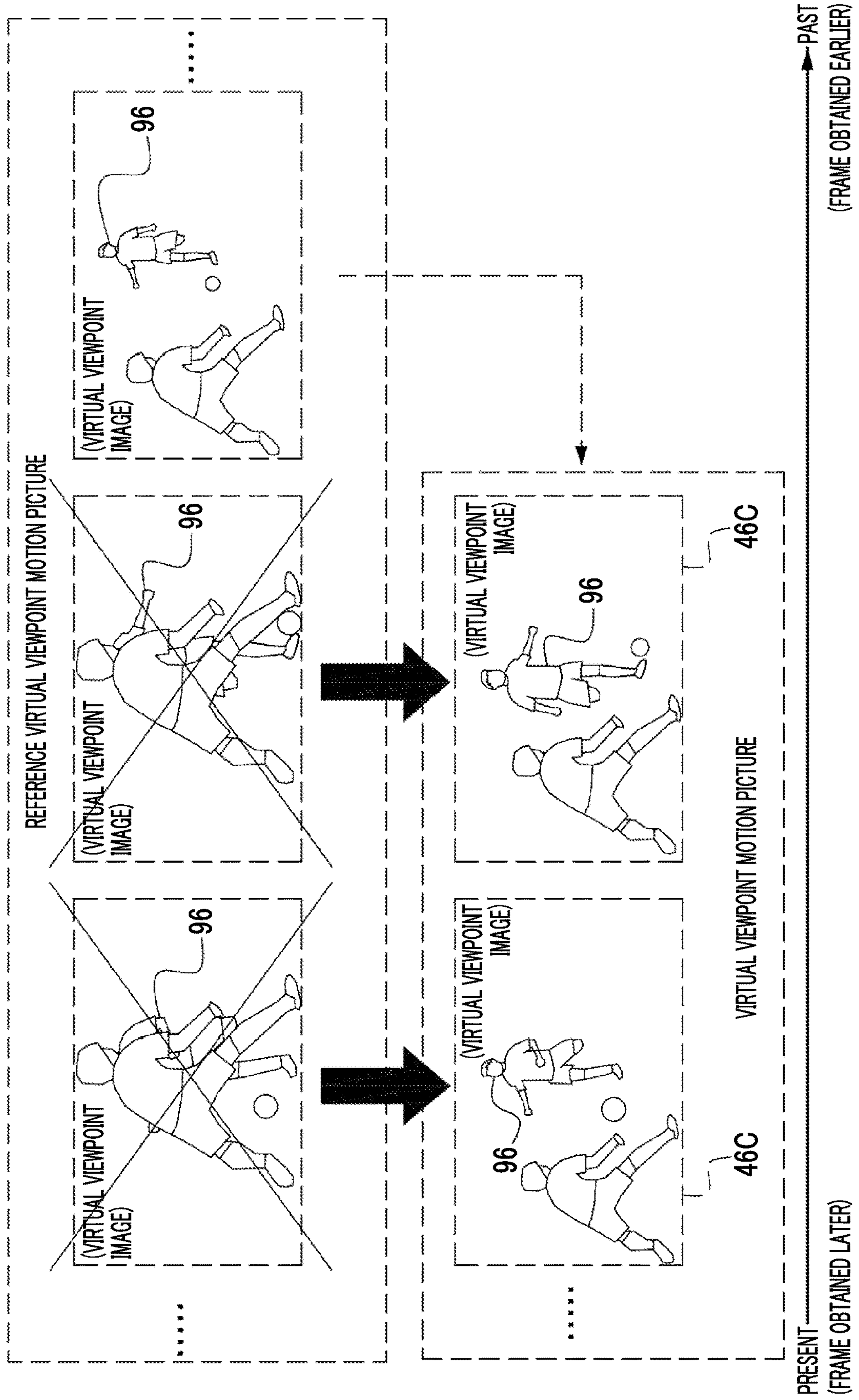
FIG. 19 a conceptual diagram showing an example of a mode in which a reference virtual viewpoint motion picture is output instead of a reference physical camera motion picture, and output of a virtual viewpoint image forming the reference virtual viewpoint motion picture is switched to output of the virtual viewpoint image as another camera image.

In the first embodiment, a from example in which the reference physical camera motion picture is output by the output unit 58D has been described, but the technique of the present disclosure is not limited to this. For example, as shown in FIG. 19, a reference virtual viewpoint motion picture configured with a plurality of time-series virtual viewpoint images 46C obtained by being captured by the specific virtual camera 42 may be output to the user device 14 by the output unit 58D instead of the reference physical camera motion picture. In this case, by executing the output control process, the output of the reference virtual viewpoint motion picture is switched to the output of another camera image (in the example shown in FIG. 19, a virtual viewpoint motion picture other than the reference virtual viewpoint motion picture). As described above, even in a case where the output of the reference virtual viewpoint motion picture can be switched to the output of the other camera image, the user 18 can continuously observe the target person similarly to the first embodiment.

In the first embodiment, a form example in which the physical camera image and the virtual viewpoint image 46C are selectively output by the output unit 58D has been described. However, as an example, as shown in FIG. 19, only the virtual viewpoint image 46C may be output by the output unit 58D before or after switching of the output. Also in this case, the user 18 can continuously observe the target person similarly to the first embodiment.

Figure 20:
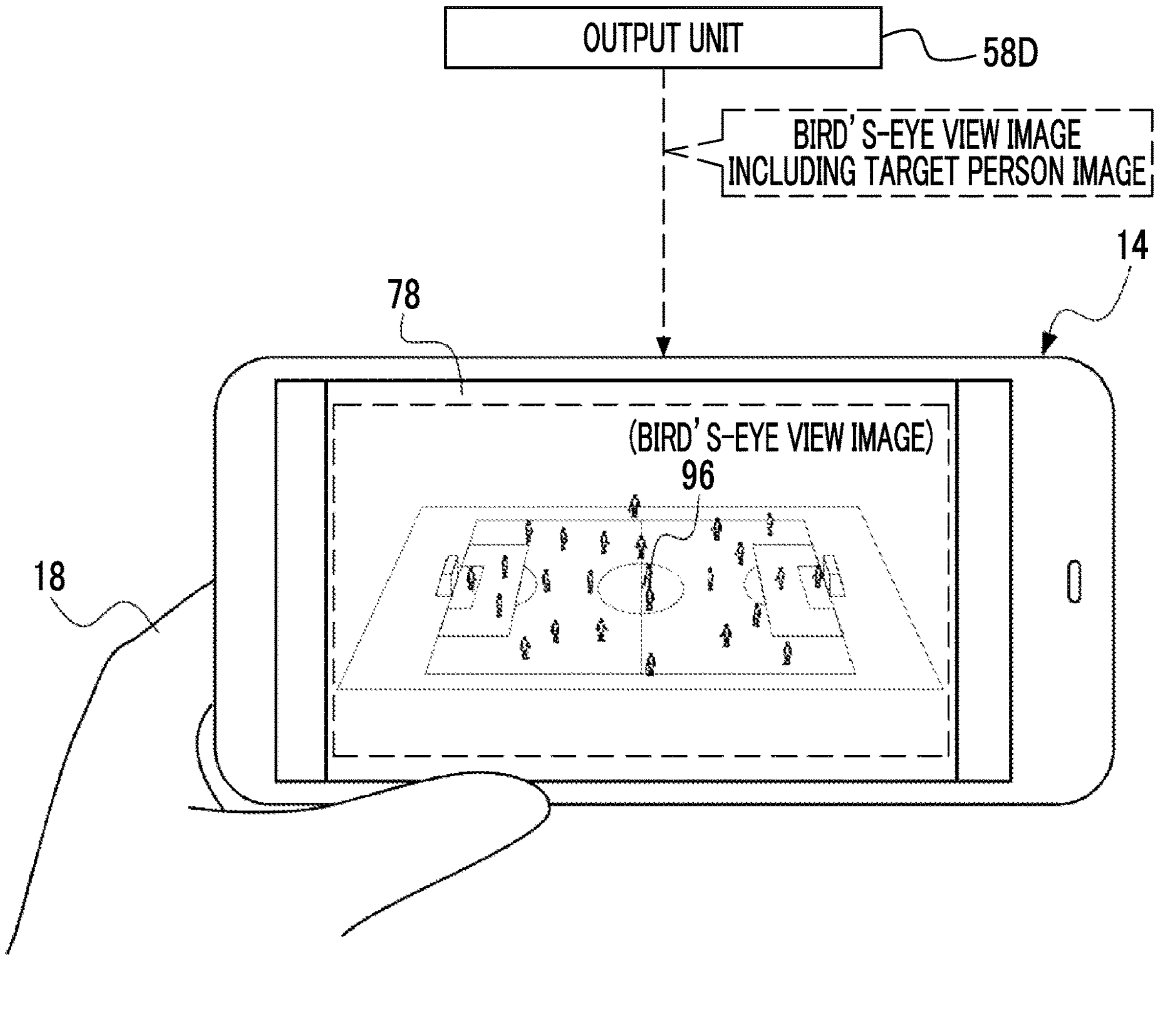
FIG. 20 is a conceptual diagram showing an example of a mode in which an output unit outputs a bird's-eye view image to a user device.

In the first embodiment, a form example in which the output of the reference physical camera image is switched to the output of another camera image by the output unit 58D has been described, but the technique of the present disclosure is not limited to this. For example, as shown in FIG. 20, a bird's-eye view image including the target person image 96 may be output to the user device 14 by the output unit 58D as another camera image. The bird's-eye view image is an image showing a bird's-eye view of the imaging region (in the example shown in FIG. 20, the entire soccer field 24). For example, in a case where the image selection unit 58E does not select another camera image satisfying the best imaging condition (in a case where there is no other camera image satisfying the best imaging condition), the output unit 58D may output a bird's-eye view image. Therefore, according to the form example in which the bird's-eye view image is output by the output unit 58D, a camera image from which the target person is likely to be captured can be provided to the user 18 compared with the case where a camera image obtained by capturing only a part of the imaging region is output.

In the first embodiment, a form example in which the reference physical camera motion picture is obtained by the reference physical camera has been described, but the reference physical camera motion picture may be an image for television broadcasting. Examples of the image for television broadcasting include a recorded motion picture or a motion picture for live broadcasting. The image is not limited to a motion picture, and may be a still image. For example, in a case where the user 18 is viewing a television broadcast video (for example, an image for television relay) with the user device 14, when the target person image 96 is blocked by an obstacle in the television broadcast image, a usage method is assumed in which the virtual viewpoint image 46C or another physical camera image from which the target person image 96 can be visually recognized is output to the user device 14 by using the technique described in the first embodiment. Therefore, according to the form example in which the image for television broadcasting is used as a reference physical camera motion picture, even in a case where the user 18 is viewing the image for television relay, the user 18 can continuously observe the target person.

In the first embodiment, an installation position of the reference physical camera is not particularly determined, but the reference physical camera is preferably the physical camera 16 that is installed at an observation position where the imaging region (for example, the soccer field 24) is observed or installed near the observation position among the plurality of physical cameras 16. In a case where the reference virtual viewpoint motion picture is output by the output unit 58D instead of the reference physical camera motion picture, the imaging region (for example, the soccer field 24) may be imaged by the virtual camera 42 installed at an observation position where the imaging region is observed or installed near the observation position. Examples of the observation position include a position of the user 18 seated in the spectator seat 26 shown in FIG. 1 can be mentioned. Examples of the camera installed near the observation position include a camera (for example, the physical camera 16 or the virtual camera 42) installed at the position closest to the user 18 seated in the spectator seat 26 shown in FIG. 1.

Therefore, according to the present configuration, even in a case where the user 18 views a camera image obtained by being captured by the camera installed at the observation position where the imaging region is observed or installed near the observation position among a plurality of cameras, the user 18 can continuously observe the target person. According to the present configuration, in a case where the user 18 is directly looking at the imaging region, the reference physical camera is imaging the same region as or close to the region that the user 18 is looking at. Therefore, in a case where the user 18 is directly looking at the imaging region (in a case where the user 18 is directly observing the imaging region in the real space), the target person who cannot be seen by the user 18 can be detected from the reference physical camera motion picture. Consequently, in a case where the target person cannot be seen directly from the user 18, the virtual viewpoint image 46C or another physical camera image from which the target person image 96 can be visually recognized can be output to the user device 14.

Figure 21:
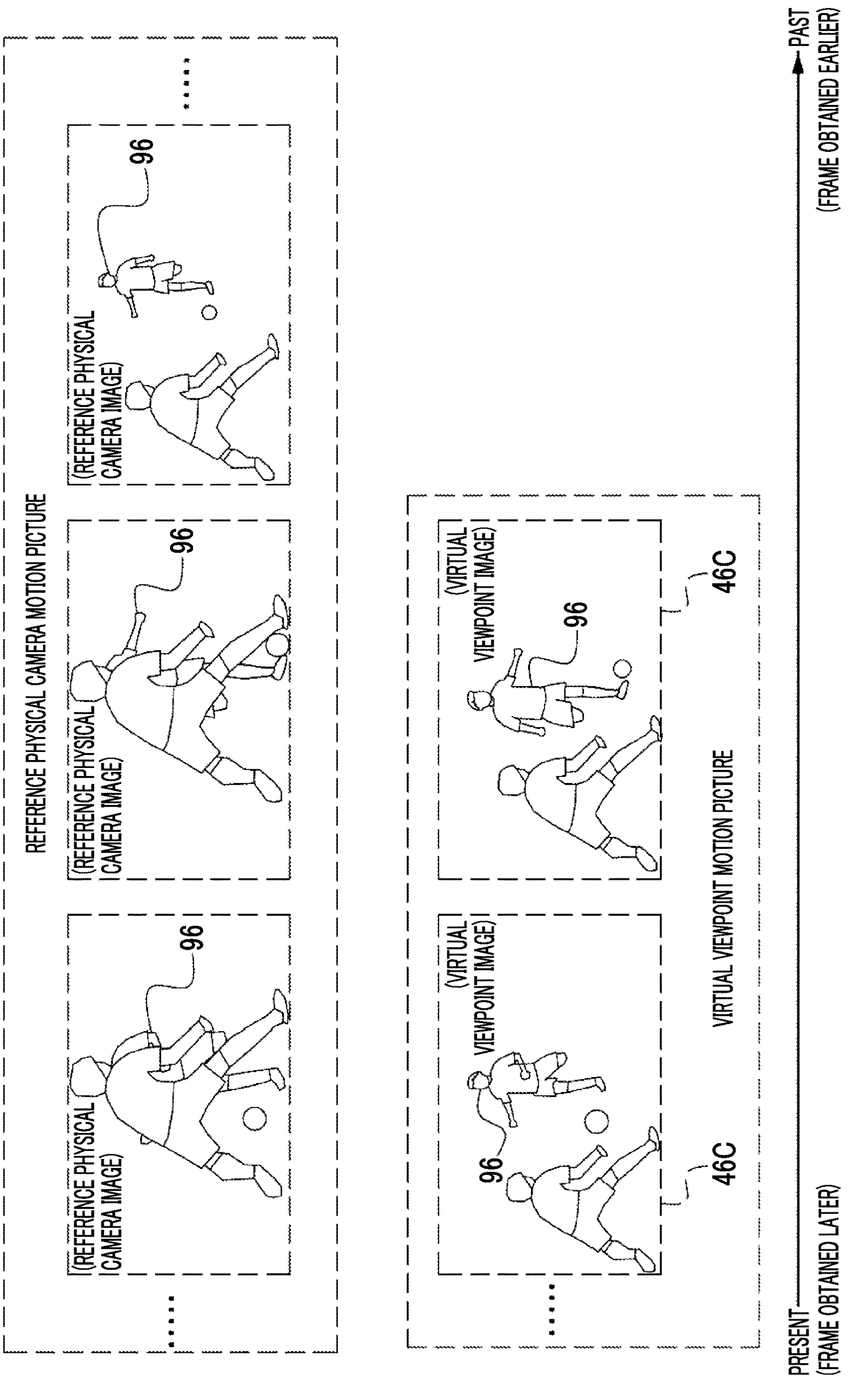
FIG. 21 is a conceptual diagram showing an example of a mode in which output of a reference physical camera motion picture and output of a virtual viewpoint motion picture as another camera motion picture are performed in parallel.
Figure 22:
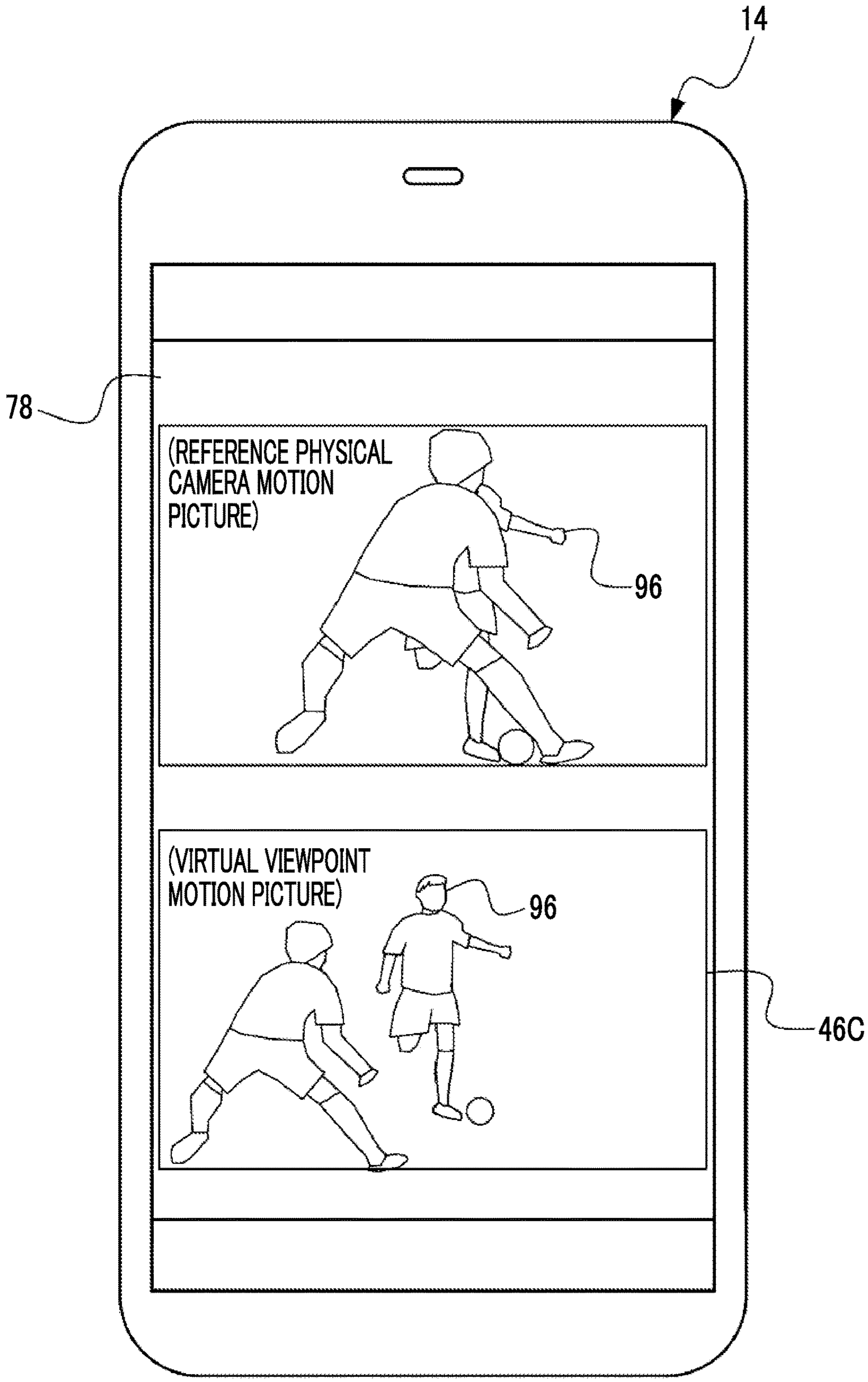
FIG. 22 is a screen view showing an example of modes of a reference physical camera motion picture and a virtual viewpoint motion picture displayed on a display of the user device in a case where the output shown in FIG. 21 is performed.

In the first embodiment, a form example has been in which, in a case where a state transitions from the state in which the target person image 96 is detected through the first detection process to the state in which the target person image 96 is not detected, the output of the reference physical camera motion picture is switched to the output of the virtual viewpoint motion picture from which the target person image 96 can be observed, but the technique of the present disclosure is not limited to this. For example, as shown in FIG. 21, even in a case where a state transitions from the state in which the target person image 96 is detected through the first detection process to the state in which the target person image 96 is not detected, the output unit 58D may continuously output the reference physical camera motion picture and also output the virtual viewpoint motion picture from which the target person image 96 can be observed in parallel. In this case, for example, as shown in FIG. 22, the reference physical camera motion picture and the virtual viewpoint motion picture are displayed in parallel on the display 78 of the user device 14 that is an output destination of the camera image in different screens. Consequently, the user 18 can continuously observe the target person from the reference physical camera motion picture and the virtual viewpoint motion picture while viewing the reference physical camera motion picture. Instead of the reference physical camera motion picture, the reference virtual viewpoint motion picture may be output to the user device 14 by the output unit 58D. Instead of the virtual viewpoint motion picture, another physical camera motion picture may be output to the user device 14 by the output unit 58D. For example, in a case where the user 18 has a plurality of user devices 14, for example, the reference physical camera motion picture and the virtual viewpoint motion picture are output to separate user devices 14 (one device is not shown).

In the first embodiment, the target person image 96 has been exemplified, but the technique of the present disclosure is not limited to this, and an image showing a non-person (an object other than a human) may be used. Examples of the non-person include a robot (for example, a robot that imitates a living thing such as a person, an animal, or an insect) equipped with a device (for example, a device including a physical camera and a computer connected to the physical camera) capable of recognizing an object, an animal, and an insect.

Second Embodiment

In the first embodiment, a form example in which the other camera image including the target person image 96 is output by the output unit 58D has been described, but, in the second embodiment, a form example in which the other camera image not including the target person image 96 is also output by the output unit 58D depending on conditions will be described. In the second embodiment, the same constituents as those in the first embodiment are denoted by the same reference numerals, and the description thereof will be omitted. In the second embodiment, portions different from the first embodiment will be described. In the following description, for convenience of the description, in a case where it is not necessary to distinguish between another physical camera motion picture and a virtual viewpoint motion picture, the motion pictures will be referred to as another camera motion picture.

In the second embodiment, any one camera other than the reference physical camera among a plurality of cameras (for example, all the cameras shown in FIG. 3) is a specific camera, and cameras other than the reference physical camera and the specific camera among the plurality of cameras are non-specific cameras. An example of the specific camera is a camera used in imaging for obtaining the other camera image output by the output unit 58D by executing the process in step ST28 or step ST30 shown in FIG. 14B. Here, the specific camera is an example of a "second image camera" according to the technique of the present disclosure.

In the second embodiment, as a detection process, in addition to the above first detection process and second detection process, a third detection process and a fourth detection process are performed.

The third detection process is a process of detecting the target person image 96 from a specific camera image that is another camera image obtained by being captured by the specific camera. The specific camera image is an example of a "second image" according to the technique of the present disclosure. Also in the third detection process, in the same manner as in the first and second detection processes, the target person image 96 is detected by detecting a face image showing the face of the target person. The other camera image that is a detection target of the face image is a specific camera image.

The types of a plurality of frames forming the other camera motion picture obtained by being captured by the specific camera are roughly classified into a detection frame in which the target person image 96 is detected through the third detection process and a non-detection frame in which the target person image 96 is not detected through the third detection process. In the following description, for convenience of the description, another camera motion picture obtained by being captured by a specific camera will also be referred to as a "specific camera motion picture".

The fourth detection process is a process of detecting the target person image 96 from a non-specific camera image that is another camera image obtained by being captured by a non-specific camera. Among non-specific camera images, a non-specific camera image from which the target person image 96 is detected through the fourth detection process is an example of a "third image" according to the technique of the present disclosure. The non-specific camera used in the imaging for obtaining the non-specific camera image from which the target person image 96 is detected through the fourth detection process is an example of a "third image camera" according to the technique of the present disclosure. Also in the fourth detection process, in the same manner as in the first to third detection processes, the target person image 96 is detected by detecting a face image showing the face of the target person. The camera image that is a detection target of the face image is a non-specific camera image.

In the second embodiment, in a case where the specific camera motion picture includes a detection frame and a non-detection frame, the CPU 58 selectively outputs the non-detection frame and the non-specific camera image according to a distance between a position of the specific camera and a position of the non-specific camera, and the time of the non-detection state described in the first embodiment.

For example, in a case where a non-detection frame output condition that the distance between the position of the specific camera and the position of the non-specific camera exceeds a threshold value and the time of the non-detection state is less than a predetermined time is satisfied, the CPU 58 outputs a non-detection frame, and in a case where the non-detection frame output condition is not satisfied, the CPU 58 outputs a non-specific camera image instead of the non-detection frame. Hereinafter, the present configuration will be described in detail.

Figure 23:
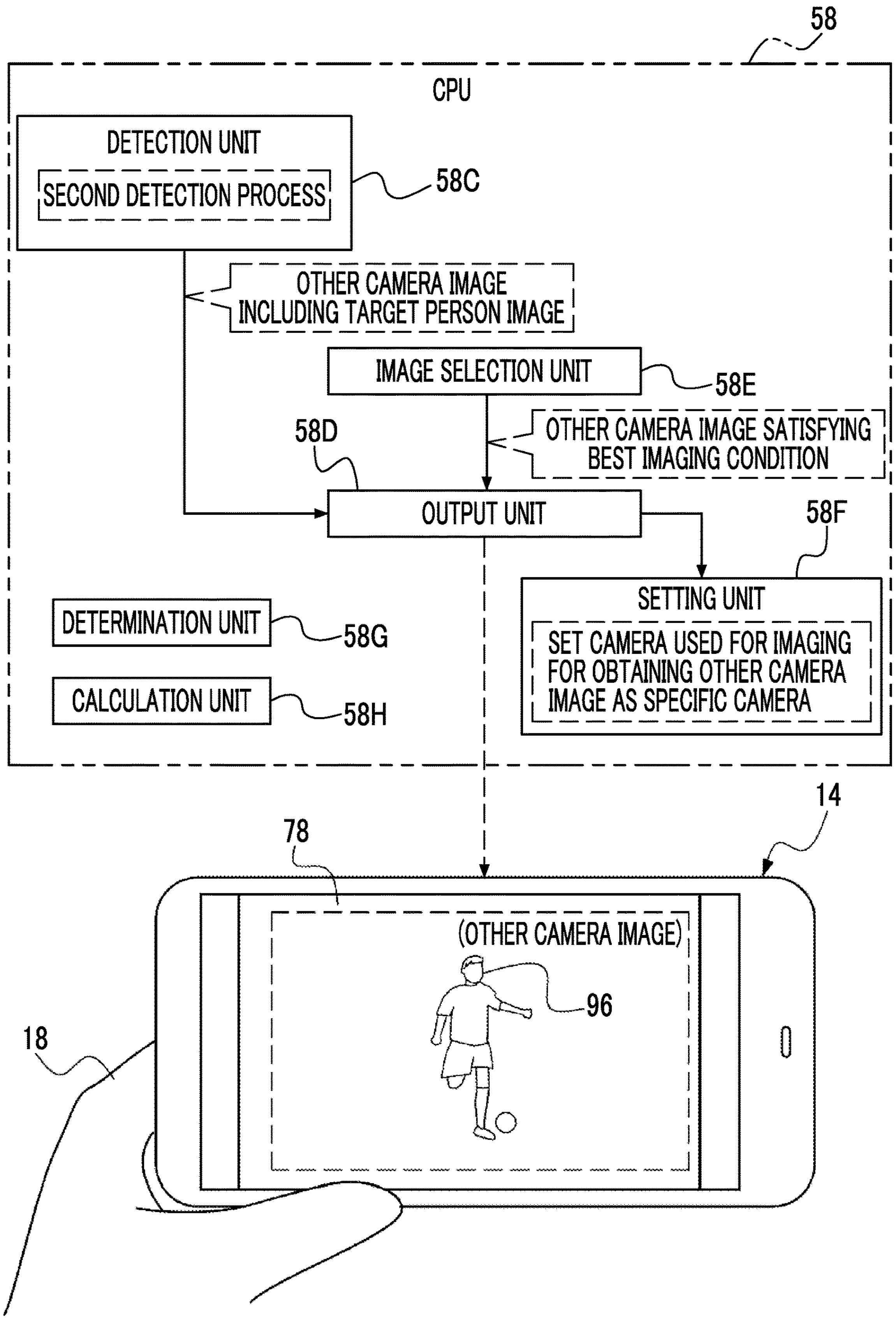
FIG. 23 is a conceptual diagram showing an example of a main function of an image processing apparatus according to a second embodiment.

As shown in FIG. 23 as an example, the CPU 58 of the image processing apparatus 12 according to the second embodiment is different from the CPU 58 of the image processing apparatus 12 described in the first embodiment in that the CPU 58 further operates as a setting unit 58F, a determination unit 58G, and a calculation unit 58H.

In a case where the other camera image that is a detection target in the second detection process or the other camera image selected by the image selection unit 58E is output by the output unit 58D, the setting unit 58F sets a camera used for imaging for obtaining the camera image output by the output unit 58D as a specific camera. The setting unit 58F acquires camera specifying information from the other camera image output by the output unit 58D. The setting unit 58F stores the camera specifying information acquired from the other camera image as specific camera identification information that can identify the specific camera.

Figure 24:
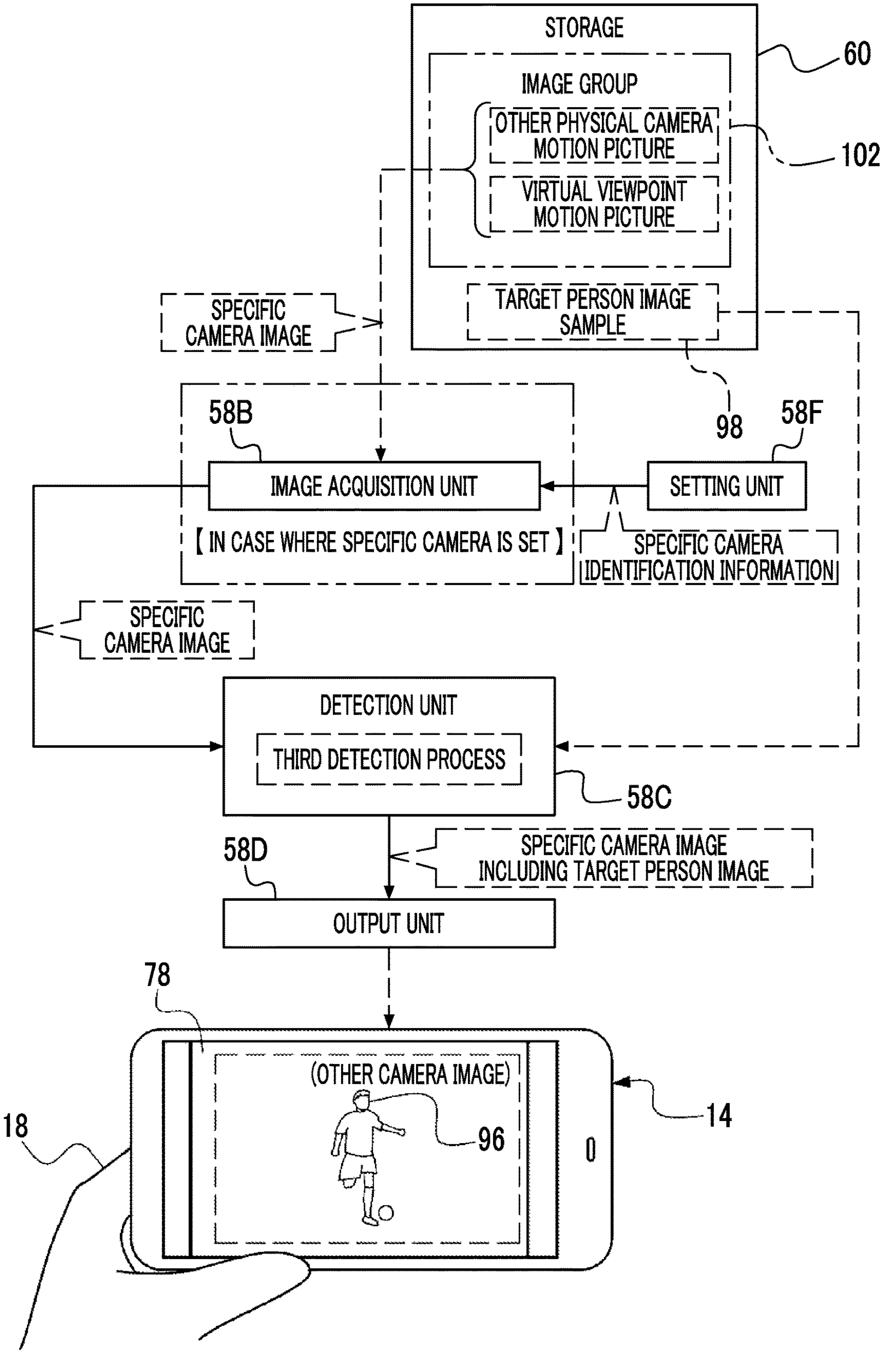
FIG. 24 is a conceptual diagram showing an example of processing details of an image acquisition unit, a detection unit, an output unit, and a setting unit of the image processing apparatus according to the second embodiment.

As an example, as shown in FIG. 24, in a case where the specific camera is set by the setting unit 58F, the image acquisition unit 58B acquires the specific camera identification information from the setting unit 58F. The image acquisition unit 58B acquires a specific camera image at the same imaging time as that of the reference physical camera image that is a processing target in the first detection process from the specific camera motion picture obtained by being captured by the specific camera that is specified on the basis of the specific camera identification information.

The detection unit 58C executes the third detection process on the specific camera image acquired by the image acquisition unit 58B by using the target person image sample 98 in the same manner as in the first and second detection processes. In a case where the target person image 96 is detected from the specific camera image through the third detection process, the output unit 58D outputs the specific camera image including the target person image 96 detected through the third detection process to the user device 14. Consequently, the specific camera image including the target person image 96 detected through the third detection process is displayed on the display 78 of the user device 14.

Figure 25:
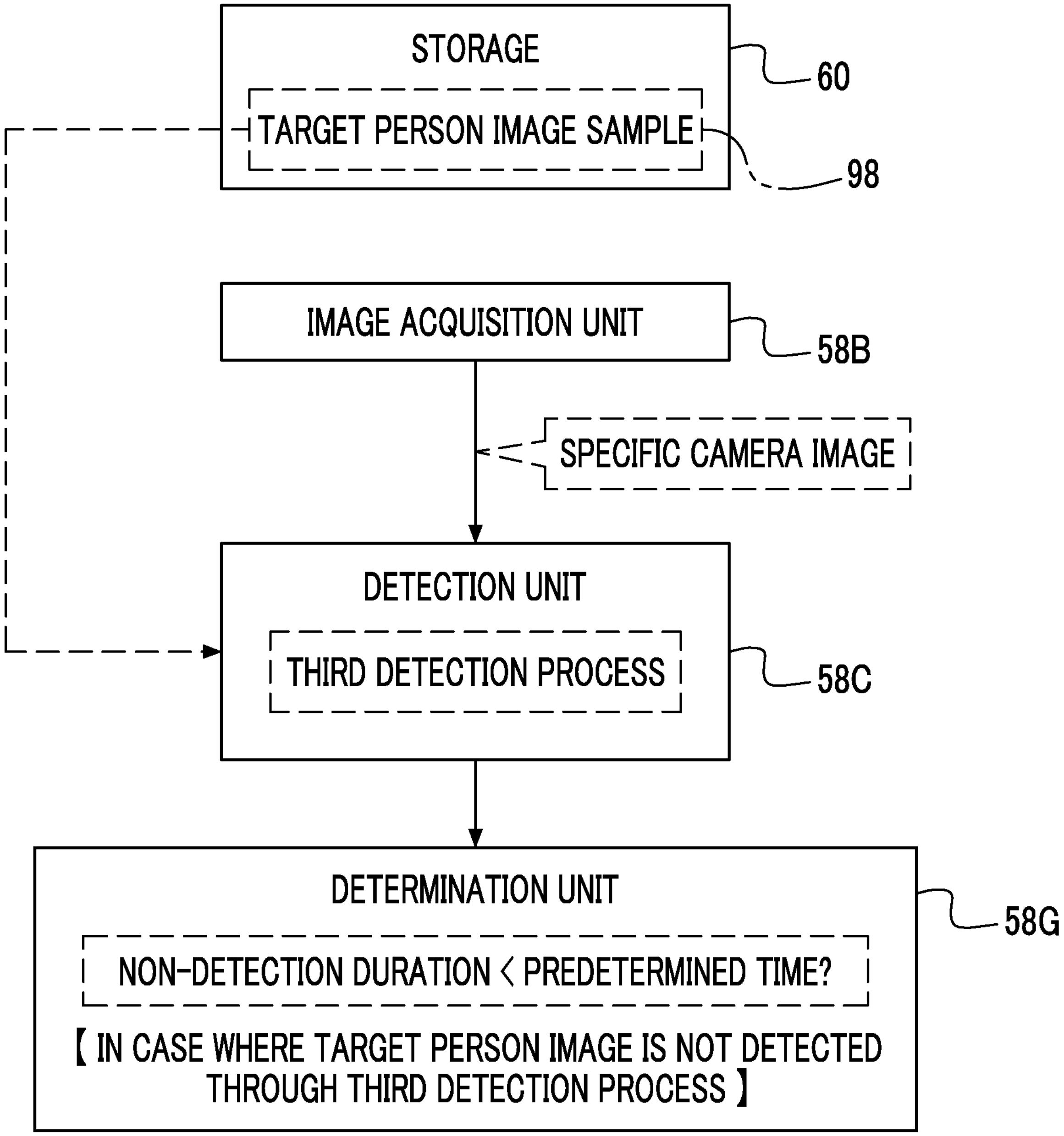
FIG. 25 is a block diagram showing an example of processing details of an image acquisition unit, a detection unit, and a determination unit of the image processing apparatus according to the second embodiment.

As an example, as shown in FIG. 25, in a case where the target person image 96 is not detected from the specific camera image through the third detection process, the determination unit 58G determines whether or not non-detection duration is less than a predetermined time (for example, 3 seconds). Here, the non-detection duration refers to the time of the non-detection state, that is, the time during which the non-detection state continues. The predetermined time may be a fixed time or a variable time that is changed according to a given instruction and/or condition.

Figure 26:
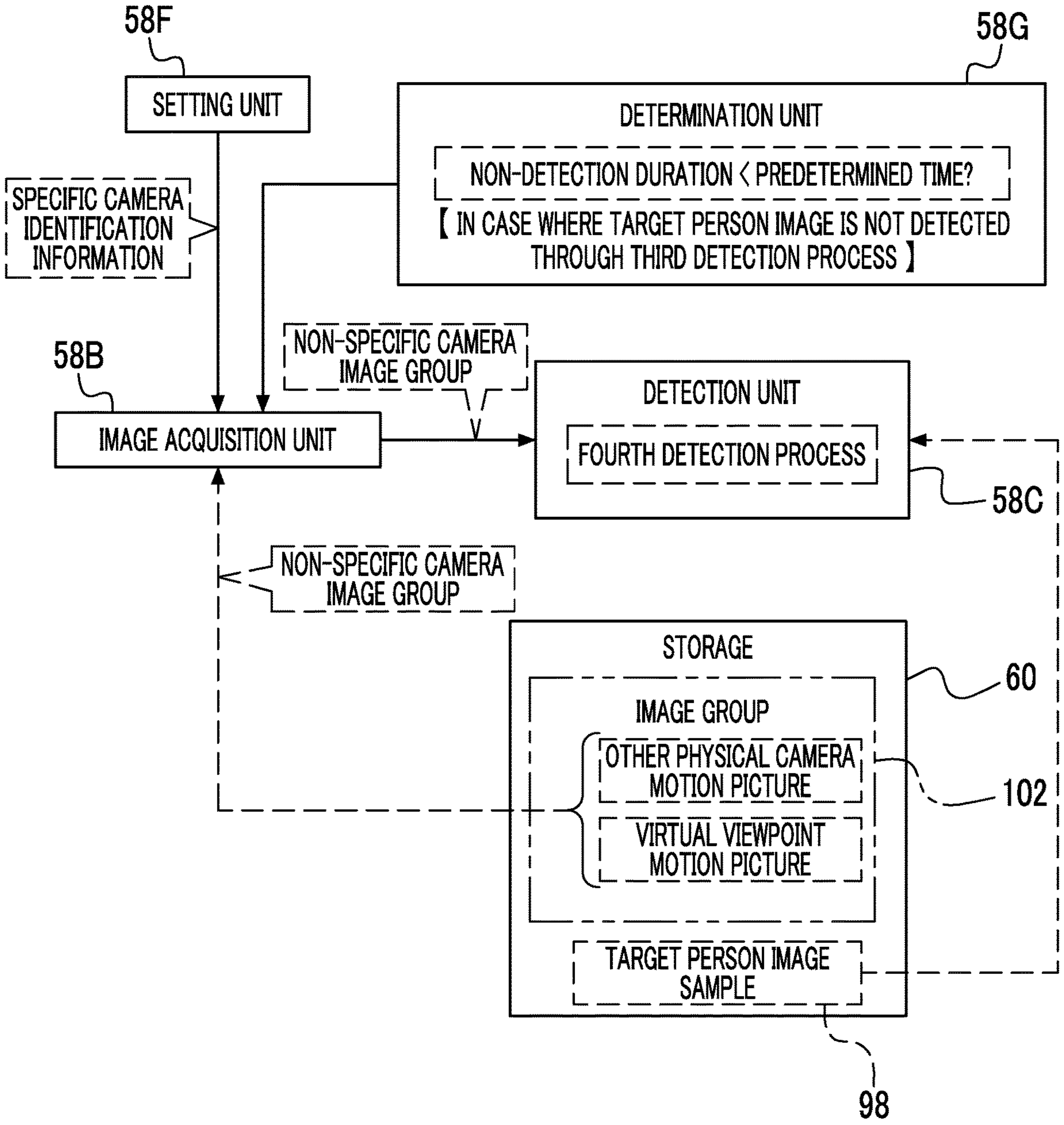
FIG. 26 is a block diagram showing an example of processing details of an image acquisition unit, a detection unit, a setting unit, and a determination unit of the image processing apparatus according to the second embodiment.

As an example, as shown in FIG. 26, in a situation in which a specific camera is set by the setting unit 58F, after the determination unit 58G determines whether or not the non-detection duration is less than the predetermined time, the image acquisition unit 58B acquires the specific camera identification information from the setting unit 58F. The image acquisition unit 58B uses the specific camera identification information to acquire, from the image group 102, all non-specific camera images (hereinafter, also referred to as a "non-specific camera image group") other than the specific camera image among a plurality of other camera images having the same imaging time as that of the reference physical camera image that is a processing target in the first detection process. The detection unit 58C executes the fourth detection process on the non-specific camera image group acquired by the image acquisition unit 58B by using the target person image sample 98 in the same manner as in the first to third detection processes.

Figure 27:
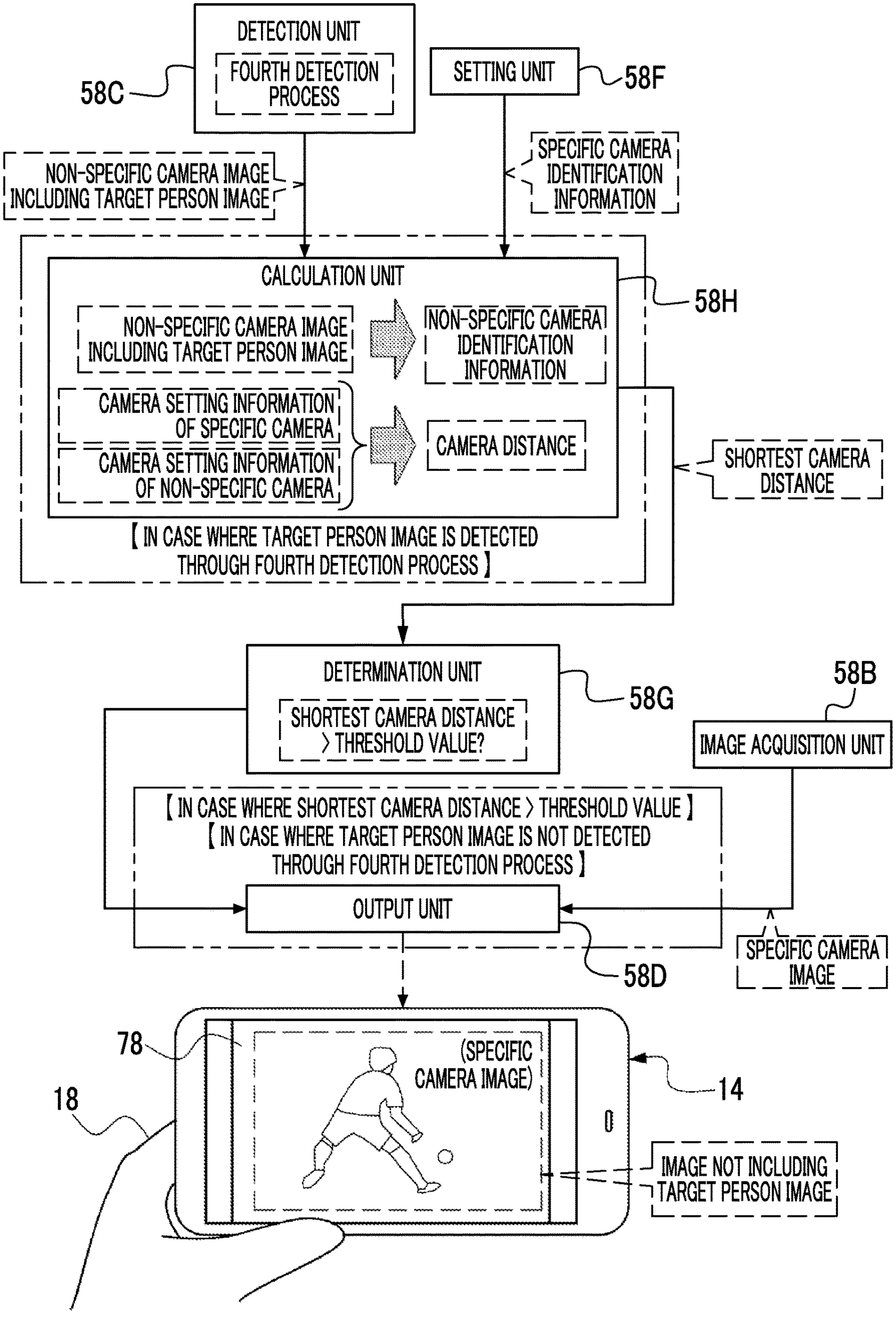
FIG. 27 is a conceptual diagram showing an example of processing details of an image acquisition unit, a detection unit, an output unit, a setting unit, a determination unit, and a calculation unit of the image processing apparatus according to the second embodiment.

As shown in FIG. 27 as an example, in a case where the target person image 96 is detected through the fourth detection process, the calculation unit 58H acquires the camera specifying information added to the non-specific camera image from which the target person image 96 is detected through the fourth detection process as non-specific camera identification information that can identify the non-specific camera used in the imaging for obtaining the non-specific camera image.

The calculation unit 58H calculates a distance between the specific camera and the non-specific camera (hereinafter, also referred to as a "camera distance") by using camera installation position information regarding the specific camera specified by the specific camera identification information stored in the setting unit 58F and camera installation position information regarding the non-specific camera specified by the non-specific camera identification information. The calculation unit 58H calculates the camera distance for each piece of non-specific camera identification information, that is, for each non-specific camera image from which the target person image 96 is detected through the fourth detection process.

The determination unit 58G acquires the shortest camera distance (hereinafter, also referred to as a "shortest camera distance") among the camera distances calculated by the calculation unit 58H. The determination unit 58G determines whether or not the shortest camera distance exceeds a threshold value. The threshold may be a fixed value or a variable value that is changed according to a given instruction and/or condition.

In a case where the determination unit 58G determines that the shortest camera distance exceeds the threshold value, the output unit 58D outputs the specific camera image acquired by the image acquisition unit 58B, that is, the specific camera image from which the target person image 96 is not detected through the third detection process to the user device 14. Also in a case where the target person image 96 is not detected from the non-specific camera image group through the fourth detection process, the output unit 58D outputs the specific camera image acquired by the image acquisition unit 58B, that is, the specific camera image from which the target person image 96 is not detected through the third detection process to the user device 14. Consequently, the specific camera image that does not include the target person image 96 is displayed on the display 78 of the user device 14.

Figure 28:
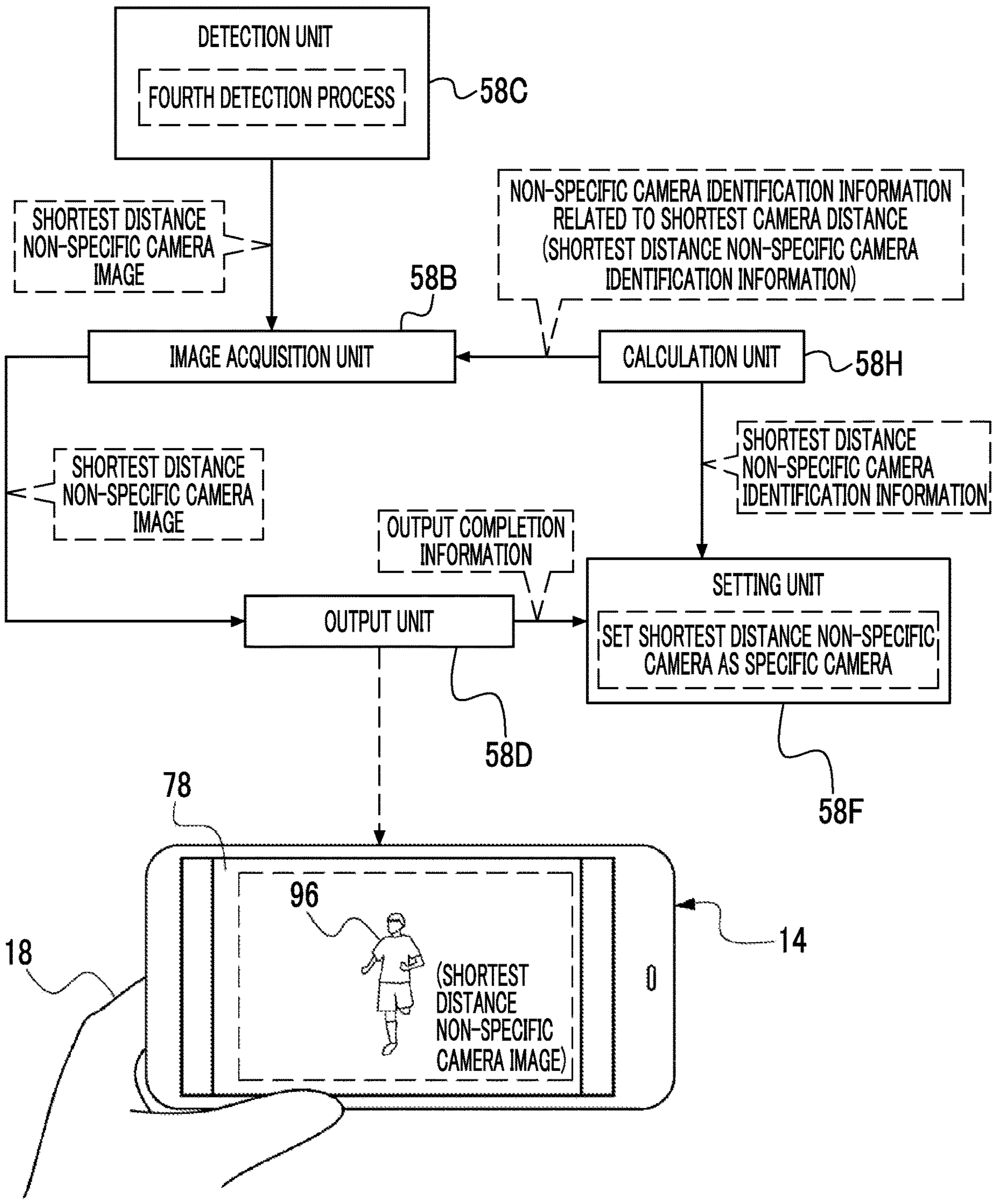
FIG. 28 is a conceptual diagram showing an example of processing details of an image acquisition unit, a detection unit, an output unit, a setting unit, and a calculation unit of the image processing apparatus according to the second embodiment.

FIG. 28 shows an example of processing details of the CPU 58 in a case where the determination unit 58G determines that the shortest camera distance is equal to or less than the threshold value, and in a case where the non-detection duration is equal to or more than the predetermined time, and the target person image 96 is detected through the fourth detection process. In the example shown in FIG. 28, the calculation unit 58H outputs shortest distance non-specific camera identification information to the image acquisition unit 58B and the setting unit 58F. The shortest distance non-specific camera identification information refers to non-specific camera identification information that can identify the non-specific camera that is a calculation target having the shortest camera distance calculated by the calculation unit 58H. The image acquisition unit 58 acquires a shortest distance non-specific camera image that is a non-specific camera image obtained by being captured by a non-specific camera specified by the non-specific camera identification information among the non-specific camera images in which the target person image 96 is detected through the fourth detection process.

The output unit 58D outputs the shortest distance non-specific camera image acquired by the image acquisition unit 58B to the user device 14. Consequently, the shortest distance non-specific camera image is displayed on the display 78 of the user device 14. Since the target person image 96 is included in the shortest distance non-specific camera image, the user 18 can observe the target person via the display 78.

In a case where the output of the shortest distance non-specific camera image is completed, the output unit 58D outputs output completion information to the setting unit 58F. In a case where the output completion information is input from the output unit 58D, the setting unit 58F sets, as a specific camera, the non-specific camera (hereinafter, also referred to as a "shortest distance non-specific camera") specified from the shortest distance non-specific camera identification information input from the calculation unit 58H instead of the specific camera that is set at the present time.

Figure 29A:
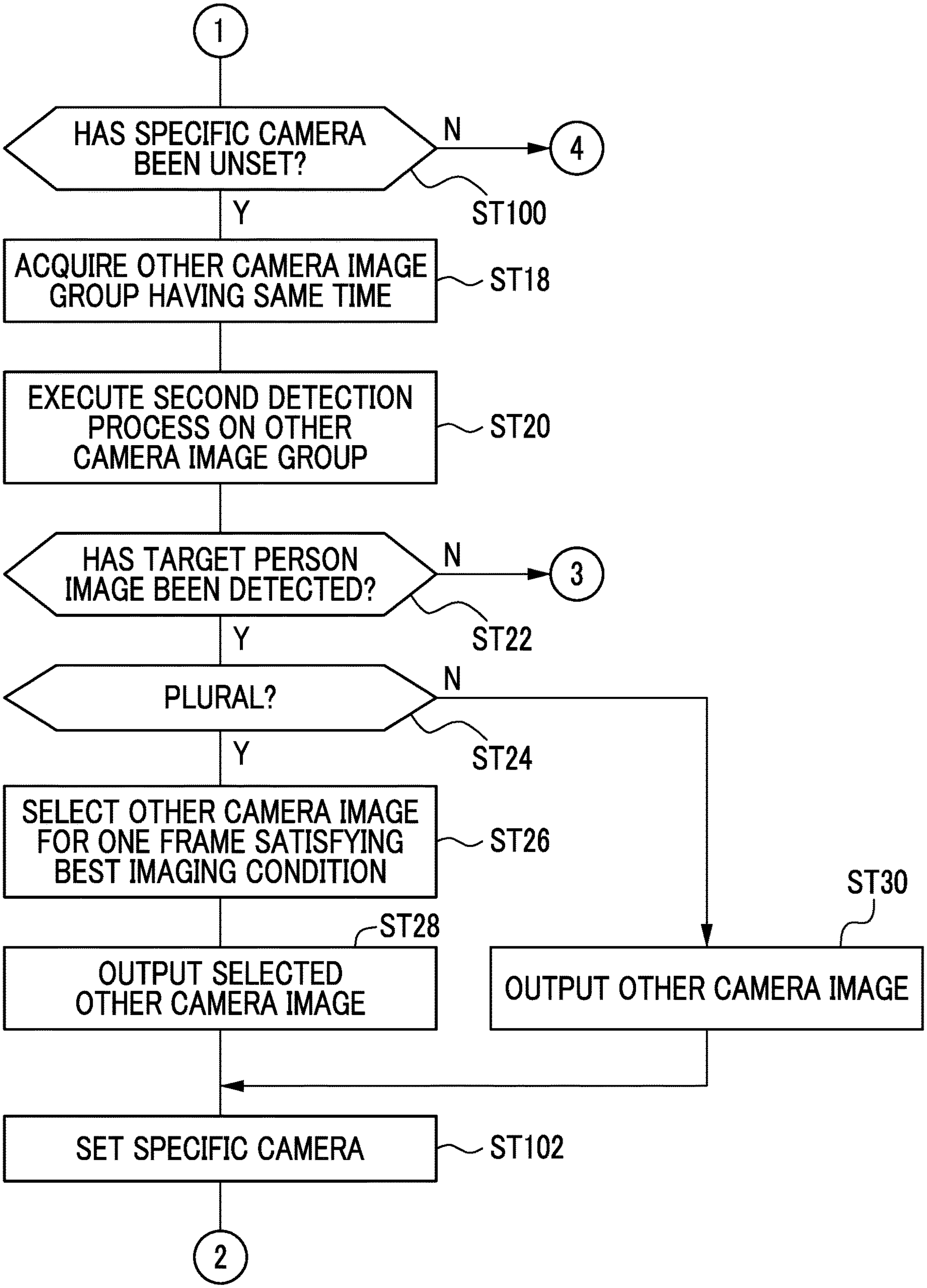
FIG. 29A is a flowchart showing an example of a flow of an output control process according to the second embodiment, and is a continuation of the flowchart of FIG. 14A.
Figure 29B:
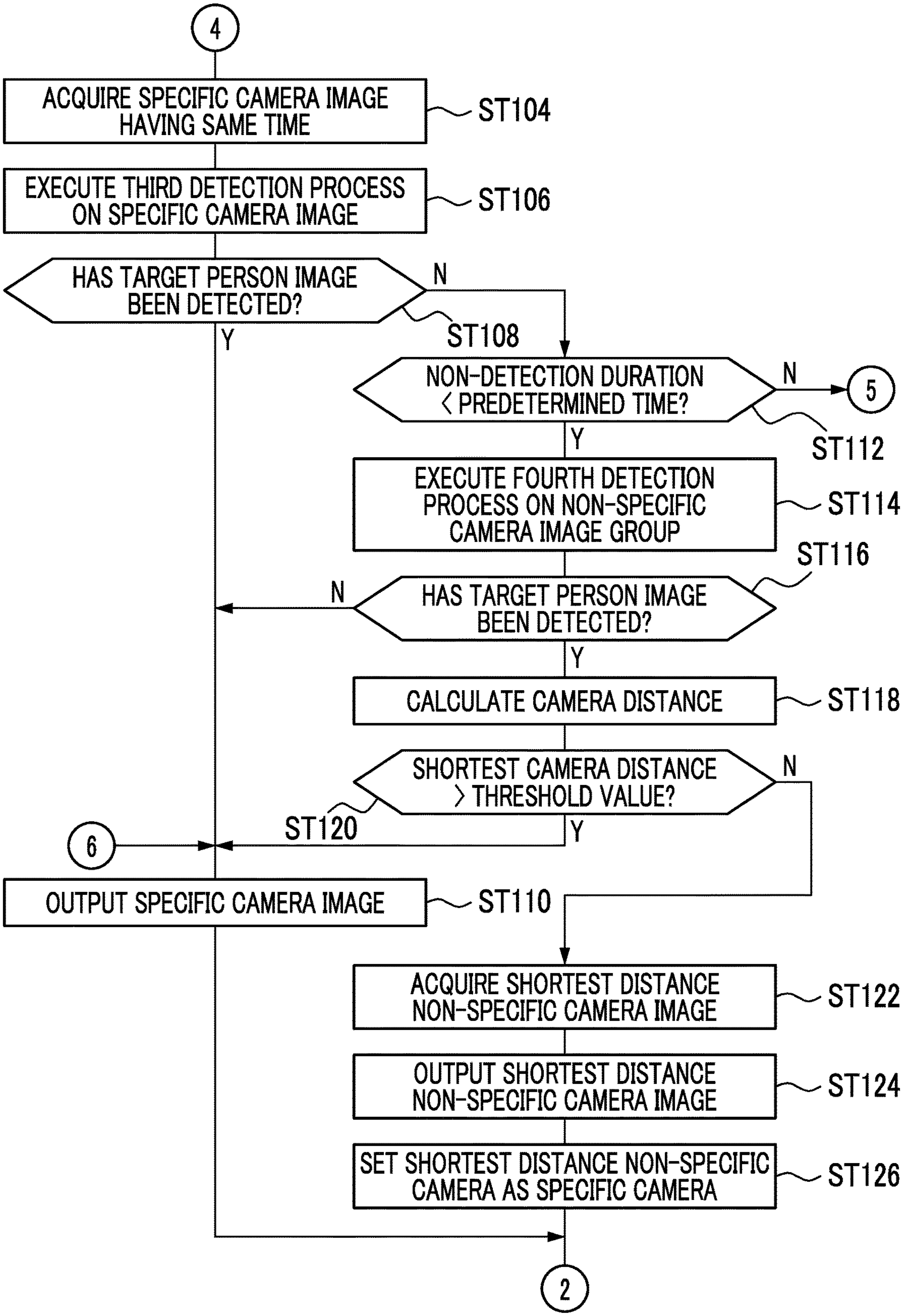
FIG. 29B is a continuation of the flowchart of FIG. 29A.
Figure 29C:
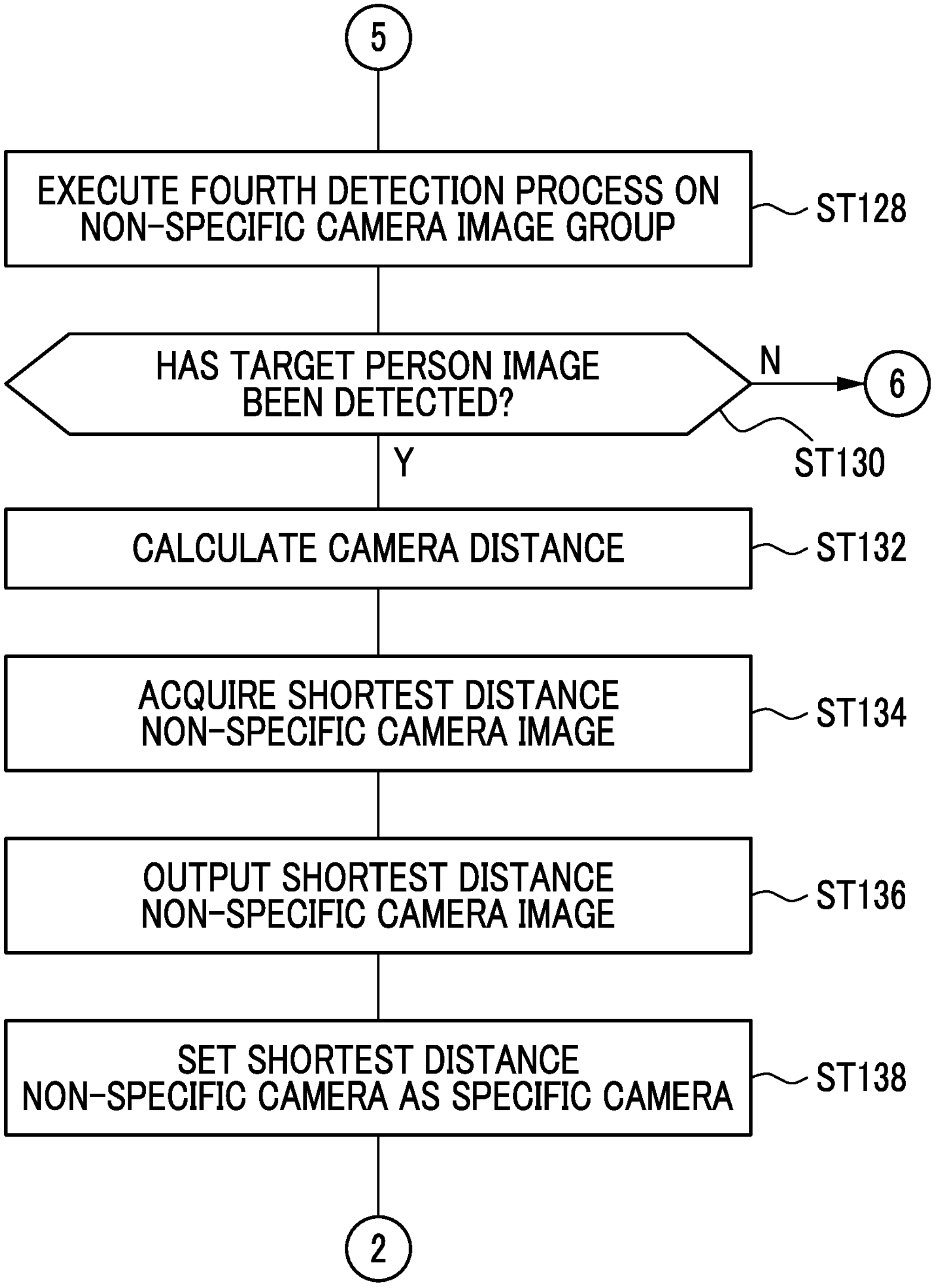
FIG. 29C is a continuation of the flowchart of FIG. 29B.

Next, an example of a flow of an output control process according to the second embodiment will be described with reference to FIGS. 29A to 29C. The flowcharts of FIGS. 29A to 29C are different from the flowcharts of FIGS. 14A and 14B in that steps ST100 to ST138 are provided. Hereinafter, differences from the flowcharts of FIGS. 14A and 14B will be described.

In a case where a determination result is negative in step ST14 shown in FIG. 14A, the output control process proceeds to step ST100 shown in FIG. 29A. In step ST100, the detection unit 58C determines whether or not the specific camera has been unset. For example, here, the detection unit 58C determines that the specific camera has been unset in a case where the setting unit 58F does not store the specific camera identification information, and determines that the specific camera has not been unset (the specific camera has been set) in a case where the setting unit 58F stores the specific camera identification information.

In a case where the specific camera has been unset in step ST100, a determination result is positive, and the output control process proceeds to step ST18. In a case where the specific camera is not unset in step ST100, a determination result is negative, and the output control process proceeds to step ST104 shown in FIG. 29B.

In step ST102, the setting unit 58F sets the camera used for imaging for obtaining the other camera image output in step ST28 or step ST30 as the specific camera, and then the output control process proceeds to step ST32 shown in FIG. 14A.

In step ST104 shown in FIG. 29B, a specific camera image having the same imaging time as that of the reference physical camera image that is a processing target in the first detection process is acquired from the specific camera motion picture obtained by being captured by the specific camera, and then the output control process proceeds to step ST106.

In step ST106, the detection unit 58C executes the third detection process on the specific camera image acquired in step ST104 by using the target person image sample 98, and then the output control process proceeds to step ST108.

In step ST108, the detection unit 58C determines whether or not the target person image 96 has been detected from the specific camera image through the third detection process. In step ST108, in a case where the target person image 96 has not been detected from the specific camera image through the third detection process, a determination result is negative, and the output control process proceeds to step ST112. In step ST108, in a case where the target person image 96 has been detected from the specific camera image through the third detection process, a determination result is positive, and the output control process proceeds to step ST110.

In step ST110, the output unit 58D outputs the specific camera image that is a detection target in the third detection process to the user device 14, and then the output control process proceeds to step ST32 shown in FIG. 14A.

In step ST112, the determination unit 58G determines whether or not the non-detection duration is less than a predetermined time. In step ST112, in a case where the non-detection duration is equal to or more than the predetermined time, a determination result is negative, and the output control process proceeds to step ST128 shown in FIG. 29C. In step ST112, in a case where the non-detection duration is less than the predetermined time, a determination result is positive, and the output control process proceeds to step ST114.

In step ST114, the detection unit 58C executes the fourth detection process on the non-specific camera image group by using the target person image sample 98, and then the output control process proceeds to step ST116.

In step ST116, the detection unit 58C determines whether or not the target person image 96 has been detected from the non-specific camera image group through the fourth detection process. In step ST116, in a case where the target person image 96 has not been detected from the non-specific camera image group through the fourth detection process, a determination result is negative, and the output control process proceeds to step ST110. In step ST116, in a case where the target person image 96 is detected from the non-specific camera image group through the fourth detection process, a determination result is positive, and the output control process proceeds to step ST118.

In step ST118, first, the calculation unit 58H acquires the camera specifying information added to the non-specific camera image from which the target person image 96 is detected through the fourth detection process in step ST114 as non-specific camera identification information that can identify the non-specific camera used in the imaging for obtaining the non-specific camera image. Next, the calculation unit 58H calculates a camera distance by using the camera installation position information regarding the specific camera specified by the specific camera identification information stored in the setting unit 58F, and the camera installation position information regarding the non-specific camera specified by the non-specific camera identification information. The camera distance is calculated for each non-specific camera image from which the target person image 96 is detected through the fourth detection process in step ST114. After the process in step ST118 is executed, the output control process proceeds to step ST120.

In step ST120, the determination unit 58G determines whether or not the shortest camera distance among the camera distances calculated in step ST118 exceeds a threshold value. In step ST120, in a case where the shortest camera distance is equal to or less than the threshold value, a determination result is negative, and the output control process proceeds to step ST122. In step ST120, in a case where the shortest camera distance exceeds the threshold value, a determination result is positive, and the output control process proceeds to step ST110.

In step ST122, first, the image acquisition unit 58B acquires the shortest distance non-specific camera identification information from the calculation unit 58H. The image acquisition unit 58B acquires the shortest distance non-specific camera image obtained by being captured by the non-specific camera specified by the shortest distance non-specific camera identification information from a non-specific camera for at least one frame from which the target person image 96 is detected through the fourth detection process in step ST114. After the process in step ST122 is executed, the output control process proceeds to step ST124.

In step ST124, the output unit 58D outputs the shortest distance non-specific camera image acquired in step ST122 to the user device 14, and then the output control process proceeds to step ST126.

In step ST126, the setting unit 58F acquires the shortest distance non-specific camera identification information from the calculation unit 58H. The setting unit 58F sets the shortest distance non-specific camera specified by the shortest distance non-specific camera identification information as a specific camera instead of the specific camera that is set at the present time, and then the output control process proceeds to step ST32 shown in 14A.

In step ST128 shown in FIG. 29C, the detection unit 58C executes the fourth detection process on the non-specific camera image group by using the target person image sample 98, and then the output control process proceeds to step ST130.

In step ST130, the detection unit 58C determines whether or not the target person image 96 has been detected from the non-specific camera image group through the fourth detection process in step ST128. In step ST130, in a case where the target person image 96 has not been detected from the non-specific camera image group through the fourth detection process in step ST128, a determination result is negative, and the output control process proceeds to step ST110 shown in FIG. 29B. In step ST130, in a case where the target person image 96 has been detected from the non-specific camera image group through the fourth detection process in step ST128, a determination result is positive, and the output control process proceeds to step ST132.

In step ST132, first, the calculation unit 58H acquires the camera specifying information added to the non-specific camera image from which the target person image 96 is detected through the fourth detection process in step ST128 as the non-specific camera identification information that can identify the non-specific camera used in the imaging for obtaining the non-specific camera image. Next, the calculation unit 58H calculates a camera distance by using the camera installation position information regarding the specific camera specified by the specific camera identification information stored in the setting unit 58F, and the camera installation position information regarding the non-specific camera specified by the non-specific camera identification information. The camera distance is calculated for each non-specific camera image from which the target person image 96 is detected through the fourth detection process in step ST128. After the process in step ST132 is executed, the output control process proceeds to step ST134.

In step ST134, first, the image acquisition unit 58B acquires the shortest distance non-specific camera identification information from the calculation unit 58H. The image acquisition unit 58B acquires the shortest distance non-specific camera image obtained by being captured by the non-specific camera specified by the shortest distance non-specific camera identification information from the non-specific camera image for at least one frame from which the target person image 96 is detected through the fourth detection process in step ST128. After the process in step ST134 is executed, the output control process proceeds to step ST136.

In step ST136, the output unit 58D outputs the shortest distance non-specific camera image acquired in step ST134 to the user device 14, and then the output control process proceeds to step ST138.

In step ST138, the setting unit 58F acquires the shortest distance non-specific camera identification information from the calculation unit 58H. The setting unit 58F sets the shortest distance non-specific camera specified by the shortest distance non-specific camera identification information as a specific camera instead of the specific camera that is set at the present time, and then the output control process proceeds to step ST32 shown in 14A.

As described above, in a case where the specific camera motion picture obtained by being captured by the specific camera includes a frame including the target person image 96 and a frame not including the target person image 96, the output unit 58D selectively outputs a frame not including the target person image 96 in the specific camera motion picture and a non-specific camera image including the target person image 96 according to a camera distance and non-detection duration. Therefore, according to the present configuration, during a period in which the target person image 96 is not detected, it is possible to suppress discomfort given by a steep change of the other camera image to a user compared with a case where the non-specific camera image including the target person image 96 is output at all times.

In a case where the output control process according to the second embodiment is executed, and the condition that the shortest camera distance exceeds the threshold value and the non-detection duration is less than the predetermined time is satisfied, a frame not including the target person image 96 in the specific camera motion picture is output. In a case where the condition that the shortest camera distance exceeds the threshold value and the non-detection duration is less than the predetermined time is not satisfied, a non-specific camera image including a person image 96 is output instead of the frame not including the target person image 96 in the specific camera motion picture. Therefore, according to the present configuration, during a period in which the target person image 96 is not detected, it is possible to suppress discomfort given by a steep change of the other camera image to a user compared with a case where the non-specific camera image including the target person image 96 is output at all times.

In the second embodiment, the condition that the shortest camera distance exceeds the threshold value and the non-detection duration is less than the predetermined time has been exemplified, but the technique of the present disclosure is not limited to this, and for example, a condition that the shortest camera distance is equal to the threshold value and the non-detection duration is less than the predetermined time may be employed. A condition that the shortest camera distance exceeds the threshold value and the non-detection duration reaches the predetermined time may be employed. A condition that the shortest camera distance is equal to the threshold value and the non-detection duration reaches the predetermined time may be employed.

The various form examples described in the first embodiment can be appropriately applied to the image processing apparatus 12 described in the second embodiment.

Figure 30:
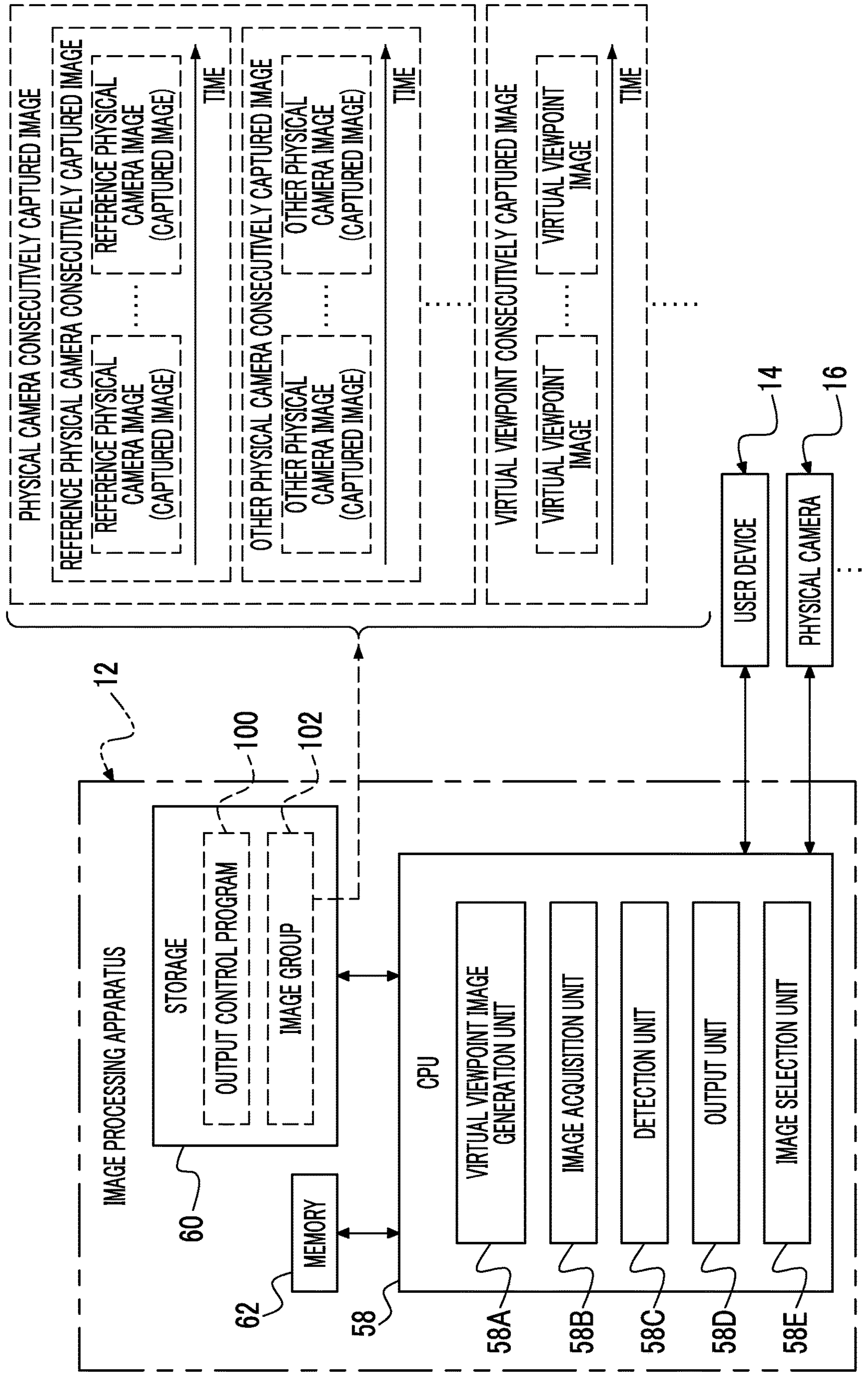
FIG. 30 is a block diagram showing an example of a mode in which physical camera consecutively captured images and preliminary virtual viewpoint consecutively captured images are stored in a storage as an image group.
Figure 31:
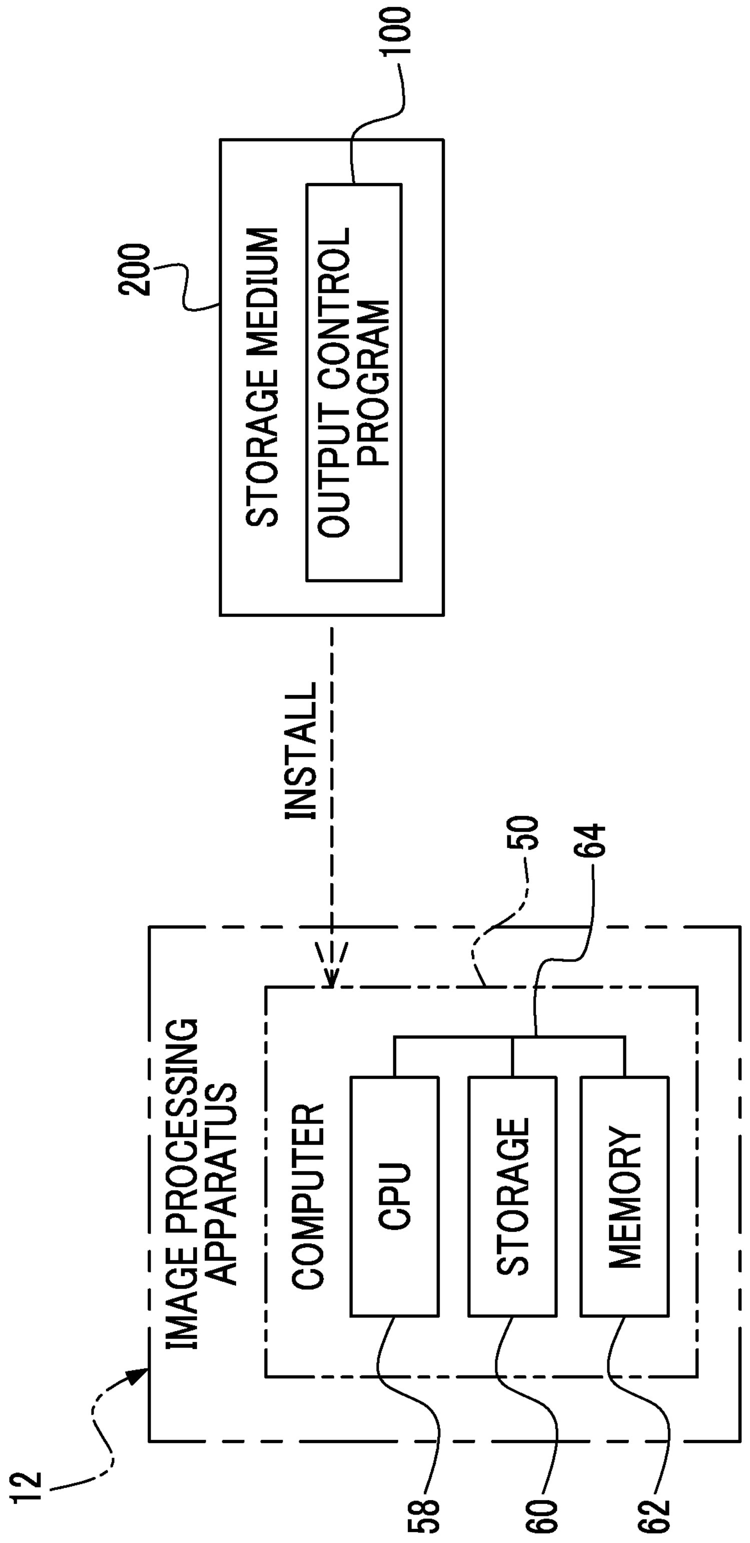
FIG. 31 is a block diagram showing an example of a mode in which an output control program is installed in a computer of the image processing apparatus from a storage medium in which the output control program is stored.

In each of the above embodiments, a form example in which a motion picture as an example of a multi-frame image consisting of a plurality of frames is output to the user device 14 by the output unit 58D has been described, but the technique of the present disclosure is not limited to this, consecutively captured images may be output by the output unit 58D instead of the motion picture. In this case, as shown in FIG. 30 as an example, reference physical camera consecutively captured images may be stored instead of the reference physical camera motion picture, other physical camera consecutively captured images may be stored instead of the other physical camera motion picture, and virtual viewpoint consecutively captured image may be stored instead of the virtual viewpoint motion picture, in the storage 60 as the image group 102. As described above, even in a case where the consecutively captured images are output to the user device 14, the user 18 can continuously observe the target person.

In each of the above embodiments, a form example in which the motion picture is displayed on the display 78 of the user device 14 has been described, but among a plurality of time-series camera images forming a motion picture displayed on the display 78, a camera image intended by the user 18 may be selectively displayed on the display 78 by the user 18 performing a flick operation and/or a swipe operation on the touch panel 76A.

In each of the above embodiments, the soccer stadium 22 has been exemplified, but this is only an example, and any place may be used as long as a plurality of physical cameras 16 can be installed, such as a baseball field, a rugby field, a curling field, an athletic field, a swimming pool, a concert hall, an outdoor music field, and a theatrical play venue.

In each of the above embodiments, the computers 50 and 70 have been exemplified, but the technique of the present disclosure is not limited to this. For example, instead of the computers 50 and/or 70, devices including ASICs, FPGAs, and/or PLDs may be applied. Instead of the computer 50 and/or 70, a combination of hardware configuration and software configuration may be used.

In each of the above embodiments, a form example in which the output control process is executed by the CPU 58 of the image processing apparatus 12 has been described, but the technique of the present disclosure is not limited to this. Some of the processes included in the output control process may be executed by the CPU 88 of the user device 14. Instead of the CPU 88, a GPU may be employed, or a plurality of CPUs may be employed, and various processes may be executed by one processor or a plurality of physically separated processors.

In each of the above embodiments, the output control program 100 is stored in the storage 60, but the technique of the present disclosure is not limited to this, and as shown in FIG. 29 as an example, and the output control program 100 may be stored in any portable storage medium 200. The storage medium 200 is a non-transitory storage medium. Examples of the storage medium 200 include an SSD and a USB memory. The output control program 100 stored in the storage medium 200 is installed in the computer 50, and the CPU 58 executes the output control process according to the output control program 100.

The output control program 100 may be stored in a program memory of another computer, a server device, or the like connected to the computer 50 via a communication network (not shown), and the output control program may be downloaded to the image processing apparatus 12 in response to a request from the image processing apparatus 12. In this case, the output control process based on the downloaded output control program 100 is executed by the CPU 58 of the computer 50.

As a hardware resource for executing the output control process, the following various processors may be used. Examples of the processor include, as described above, a CPU that is a general-purpose processor that functions as a hardware resource that executes the output control process according to software, that is, a program.

As another processor, for example, a dedicated electric circuit which is a processor such as an FPGA, a PLD, or an ASIC having a circuit configuration specially designed for executing a specific process may be used. A memory is built in or connected to each processor, and each processor executes the output control process by using the memory.

The hardware resource that executes the output control process may be configured with one of these various processors, or a combination of two or more processors of the same type or different types (for example, a combination of a plurality of FPGAs, or a combination of a CPU and an FPGA). The hardware resource that executes the output control process may be one processor.

As an example of configuring a hardware resource with one processor, first, there is a form in which one processor is configured by a combination of one or more CPUs and software, as typified by a computer used for a client or a server, and this processor functions as the hardware resource that executes the output control process. Second, as typified by system on chip (SoC), there is a form in which a processor that realizes functions of the entire system including a plurality of hardware resources with one integrated circuit (IC) chip is used. As described above, the output control process is realized by using one or more of the above various processors as hardware resources.

As a hardware structure of these various processors, more specifically, an electric circuit in which circuit elements such as semiconductor elements are combined may be used.

The output control process described above is only an example. Therefore, needless to say, unnecessary steps may be deleted, new steps may be added, or the processing order may be changed within the scope without departing from the spirit.

The content described and exemplified above are detailed descriptions of the portions related to the technique of the present disclosure, and are only an example of the technique of the present disclosure. For example, the above description of the configuration, the function, the operation, and the effect is an example of the configuration, the function, the operation, and the effect of the portions of the technique of the present disclosure. Therefore, needless to say, unnecessary portions may be deleted, new elements may be added, or replacements may be made to the described content and illustrated content shown above within the scope without departing from the spirit of the technique of the present disclosure. In order to avoid complications and facilitate understanding of the portions related to the technique of the present disclosure, in the description content and the illustrated content shown above require special description, description of common technical knowledge or the like that does not require particular description in order to enable the implementation of the technique of the present disclosure is omitted.

In the present specification, "A and/or B" is synonymous with "at least one of A or B." That is, "A and/or B" means that it may be only A, only B, or a combination of A and B. In the present specification, in a case where three or more matters are connected and expressed by "and/or", the same concept as "A and/or B" is applied.

All the documents, the patent applications, and the technical standards disclosed in the present specification are incorporated by reference in the present specification to the same extent as in a case where the individual documents, patent applications, and technical standards are specifically and individually stated to be incorporated by reference.

What is claimed is:

1. An image processing apparatus comprising:

a processor; and a memory built in or connected to the processor, and configured to store at least a reference camera motion picture and a virtual view point motion picture, wherein the processor is configured to:

output, to a display of a user terminal device in a live broadcasting event, a plurality of images which were obtained by imaging an imaging region with a first physical camera of a plurality of physical cameras each imaging a different position and are output from the reference camera motion picture captured by the plurality of physical cameras and having been stored in memory, perform a detection process of detecting a target object image showing a target object from the plurality of images, switch a first image of the plurality of images from the reference camera motion picture to be outputted to the user terminal device during the live broadcasting event with a second image from the virtual view point motion picture stored in memory in response to a state transitions from a detection state in which the target object of the target object image is detected from the first image through the detection process to a non-detection state in which the target object of the target object image is no longer detected in the first image through the detection process, and output, to the display of the user terminal device, the second image instead of the first image among the plurality of images, wherein the target object of the target object image in the second image have been determined to be in the detection state through the detection process.

2. The image processing apparatus according to claim 1, wherein the plurality of images is a multi-frame image consisting of a plurality of frames.

3. The image processing apparatus according to claim 2, wherein the multi-frame image is a motion picture obtained from the reference camera motion picture and the virtual view point motion picture.

4. The image processing apparatus according to claim 2, wherein the multi-frame image is a consecutively captured image.

5. The image processing apparatus according to claim 2, wherein the processor is further configured to:

start to output a third image to the user terminal device at a timing before a timing of reaching the non-detection state.

6. The image processing apparatus according to claim 5, wherein the processor is further configured to:

end the output of the third image to the user terminal device at a timing after a timing of reaching the non-detection state.

7. The image processing apparatus according to claim 6, in a case where the second image is a non-detection frame in which the target object image is not detected through the detection process, the processor is configured to selectively output either the second image or the third image according to a distance between a position of a second image camera used in imaging for obtaining the second image among the plurality of cameras and a position of a third physical camera used for imaging for obtaining the third image among the plurality of physical cameras, and a time of the non-detection state.

8. The image processing apparatus according to claim 7, wherein the processor is configured to output the second image in a case where a non-detection frame output condition that the distance exceeds a threshold value and the time of the non-detection state is less than a predetermined time is satisfied, and outputs the third image instead of the non-detection frame in a case where the non-detection frame output condition is not satisfied.

9. The image processing apparatus according to claim 8, wherein the non-detection frame output condition further includes a face of a person which is the target object not being detected in an image of the face of the person which is the target object image.

10. The image processing apparatus according to claim 1, wherein the processor is configured to keep outputting images from the reference camera motion picture on a condition that the non-detection state returns to the detection state.

11. The image processing apparatus according to claim 1, wherein, during a period of switching from the output of the first image to the output of the second image, the processor outputs a plurality of virtual viewpoint images obtained by being captured by a plurality of virtual cameras that continuously connect a position, an orientation, and an angle of view of the camera used for imaging for obtaining the first image to a position, an orientation, and an angle of view of the camera used for imaging for obtaining the second image.

12. The image processing apparatus according to any claim 1, wherein the target object is a person.

13. The image processing apparatus according to claim 12, wherein the processor is configured to detect the target object image by detecting a face image showing a face of the person as the target object is the face of a person and the target object image is an image of the face of the person.

14. The image processing apparatus according to claim 1, wherein, among the plurality of images, the processor outputs an image in which at least one of a position or a size of the target object image satisfies a predetermined condition and from which the target object image is detected through the detection process.

15. The image processing apparatus according to claim 1, wherein the second image is a bird's-eye view image showing an aspect of a bird's-eye view of the imaging region.

16. The image processing apparatus according to claim 1, wherein the first image is an image during the live broadcasting event for television broadcasting.

17. The image processing apparatus according to claim 1, wherein the first image is an image obtained by being captured by a camera installed at an observation position where the imaging region is observed or installed near the observation position among the plurality of physical cameras.

18. The image processing apparatus of claim 1, wherein the non-detection state includes the target object image being blocked by another object in the first image captured by the first physical camera.

19. An image processing method used by an imaging processing apparatus which includes a processor and a memory built in or connected to the processor and configured to store at least a reference camera motion picture and a virtual view point motion picture, the method executed by the processor comprising:

outputting, to a display of a user terminal device in a live broadcasting event, a plurality of images which were obtained by imaging an imaging region with a first physical camera of a plurality of physical cameras each imaging a different position and are output from the reference camera motion picture captured by the plurality of physical cameras and having been stored in memory;

performing a detection process of detecting a target object image showing a target object from the plurality of images;

switching a first image of the plurality of images from the reference camera motion picture to be outputted to the user terminal device during the live broadcasting event with a second image from the virtual view point motion picture stored in memory in response to a state transitions from a detection state in which the target object of the target object image is detected from the first image through the detection process to a non-detection state in which the target object of the target object image is no longer detected in the first image through the detection process; and outputting, to the display of the user terminal device, the second image instead of the first image among the plurality of images, wherein the target object of the target object image in the second image have been determined to be in the detection state through the detection process.

20. A non-transitory computer-readable storage medium storing a program executable by a computer to perform a process implemented by an imaging processing apparatus which includes a processor and a memory built in or connected to the processor and configured to store at least a reference camera motion picture and a virtual view point motion picture, the process executed by the processor comprising:

outputting, to a display of a user terminal device in a live broadcasting event, a plurality of images which were obtained by imaging an imaging region with a first physical camera of a plurality of physical cameras each imaging a different position and are output from the reference camera motion picture captured by the plurality of physical cameras and having been stored in memory;

performing a detection process of detecting a target object image showing a target object from the plurality of images;

switching a first image of the plurality of images from the reference camera motion picture to be outputted to the user terminal device during the live broadcasting event with a second image from the virtual view point motion picture stored in memory in response to a state transitions from a detection state in which the target object of the target object image is detected from the first image through the detection process to a non-detection state in which the target object of the target object image is no longer detected in the first image through the detection process; and outputting, to the display of the user terminal device, the second image instead of the first image among the plurality of images, wherein the target object of the target object image in the second image have been determined to be in the detection state through the detection process.

* * * * *